United States Patent
Chun et al.

(10) Patent No.: US 12,010,202 B2
(45) Date of Patent: Jun. 11, 2024

(54) DATA UNIT IN WIRELESS SYSTEM

(71) Applicant: Ofinno, LLC, Reston, VA (US)

(72) Inventors: Sungduck Chun, Fairfax, VA (US);
Kyungmin Park, Vienna, VA (US);
Esmael Hejazi Dinan, McLean, VA (US); Peyman Talebi Fard, Vienna, VA (US); Weihua Qiao, Herndon, VA (US); Damian Ruiz Coll, Reston, VA (US); Vinod Kumar Malamal Vadakital, Tampere (FI); Vasily Alexeevich Rufitskiy, Vladimir (RU)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/388,378

(22) Filed: Nov. 9, 2023

(65) Prior Publication Data
US 2024/0073302 A1    Feb. 29, 2024

Related U.S. Application Data

(63) Continuation of application No. PCT/US2022/053820, filed on Dec. 22, 2022.
(Continued)

(51) Int. Cl.
*H04L 69/22* (2022.01)
*H04L 45/302* (2022.01)

(52) U.S. Cl.
CPC ............ *H04L 69/22* (2013.01); *H04L 45/306* (2013.01)

(58) Field of Classification Search
None
See application file for complete search history.

(56) References Cited

U.S. PATENT DOCUMENTS 5,974,106 A * 10/1999 Dupont ................. H04L 1/0009
                                                                375/259
8,259,732 B2    9/2012 Torsner
(Continued)

FOREIGN PATENT DOCUMENTS

EP         4 145 802 A1    3/2023
WO      2022/154725 A1    7/2022
(Continued)

OTHER PUBLICATIONS

3GPP TS 23.501 V17.2.0 (Sep. 2021); Technical Specification; 3rd Generation Partnership Project; Technical Specification Group Services and System Aspects; System architecture for the 5G System (5GS); Stage 2; (Release 17).
(Continued)

*Primary Examiner* — Xavier S Wong
(74) *Attorney, Agent, or Firm* — Sachin Kandhari; Kavon Nasabzadeh; Philip R. Smith

(57) ABSTRACT

A user plane function UPF receives, from a SMF, a DU identification information for identifying a plurality of packets for one or more DUs of an application. The UPF receives a first plurality of packets, of the plurality of packets, of a first DU of the application; and a second plurality of packets, of the plurality of packets, of a second DU of the application. The UPF sends, to an access node and using the DU identification information a first GTP container comprising a first GTP header comprising a first number identifying the first plurality of packets, and a second GTP container comprising a second GTP header comprising a second number identifying the second plurality of packets.

20 Claims, 33 Drawing Sheets

Related U.S. Application Data

(60) Provisional application No. 63/294,713, filed on Dec. 29, 2021.

(56) References Cited

U.S. PATENT DOCUMENTS

| | | | |
|---|---|---|---|
| 8,855,047 | B2 | 10/2014 | Sammour et al. |
| 2015/0036687 | A1 | 2/2015 | Belling |
| 2015/0215218 | A1 | 7/2015 | Kanamarlapudi et al. |
| 2019/0053326 | A1 | 2/2019 | Lee et al. |
| 2022/0141176 | A1* | 5/2022 | Padebettu ............. H04L 61/103 370/389 |
| 2023/0070882 | A1 | 3/2023 | Youn et al. |
| 2023/0117359 | A1* | 4/2023 | Kadiri ................. H04W 56/001 370/503 |

FOREIGN PATENT DOCUMENTS

| | | |
|---|---|---|
| WO | 2022/266994 A1 | 12/2022 |
| WO | 2023/017052 A1 | 2/2023 |
| WO | 2023/060406 A1 | 4/2023 |
| WO | 2023/096724 A1 | 6/2023 |

OTHER PUBLICATIONS

3GPP TS 23.502 V17.2.1 (Sep. 2021); Technical Specification; 3rd Generation Partnership Project; Technical Specification Group Services and System Aspects; Procedures for the 5G System (5GS); Stage 2; (Release 17).
3GPP TR 26.928 V16.1.0 (Dec. 2020); Technical Report; 3rd Generation Partnership Project; Technical Specification Group Services and System Aspects; Extended Reality (XR) in 5G; (Release 16).
3GPP TS 29.060 V16.0.0 (Mar. 2020); Technical Specification; 3rd Generation Partnership Project; Technical Specification Group Core Network and Terminals; General Packet Radio Service (GPRS); GPRS Tunnelling Protocol (GTP) across the GN and GP interface; (Release 16).
3GPP TS 29.122 V17.3.0 (Sep. 2021); Technical Specification; 3rd Generation Partnership Project; Technical Specification Group Core Network and Terminals; T8 reference point for Northbound APIs; (Release 17).
3GPP TS 29.212 V17.1.0 (Sep. 2021); Technical Specification; 3rd Generation Partnership Project; Technical Specification Group Core Network and Terminals; Policy and Charging Control (PCC); Reference points (Release 17).
3GPP TS 29.281 V16.2.0 (Mar. 2021); Technical Specification; 3rd Generation Partnership Project; Technical Specification Group Core Network and Terminals; General Packet Radio System (GPRS) Tunnelling Protocol User Plane (GTPv1-U); (Release 16).
3GPP TS 29.522 V17.3.0 (Sep. 2021); Technical Specification; 3rd Generation Partnership Project; Technical Specification Group Core Network and Terminals; 5G System; Network Exposure Function Northbound APIs; Stage 3; (Release 17).
3GPP TS 36.322 V16.0.0 (Jul. 2020); Technical Specification; 3rd Generation Partnership Project; Technical Specification Group Radio Access Network; Evolved Universal Terrestrial Radio Access (E-UTRA); Radio Link Control (RLC) protocol specification; (Release 16).
3GPP TS 37.324 V16.3.0 (Jun. 20216); Technical Specification; 3rd Generation Partnership Project; Technical Specification Group Radio Access Network; E-UTRA and NR; Service Data Adaptation Protocol (SDAP) specification; (Release 16).
3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).
3GPP TS 38.322 V16.2.0 (Dec. 2020); Technical Specification; 3rd Generation Partnership Project; Technical Specification Group Radio Access Network; NR; Radio Link Control (RLC) protocol specification; (Release 16).
3GPP TS 38.323 V16.4.0 (Jun. 2021); Technical Specification; 3rd Generation Partnership Project; Technical Specification Group Radio Access Network; NR; Packet Data Convergence Protocol (PDCP) specification; (Release 16).
3GPP TS 38.331 V16.5.0 (Jun. 2021); Technical Specification; 3rd Generation Partnership Project; Technical Specification Group Radio Access Network; NR; Radio Resource Control (RRC) protocol specification; (Release 16).
3GPP TS 38.413 V16.7.0 (Oct. 2021); Technical Specification; 3rd Generation Partnership Project; Technical Specification Group Radio Access Network; NG-RAN; NG Application Protocol (NGAP); (Release 16).
3GPP TS 38.415 V16.5.0 (Jul. 2021); Technical Specification; 3rd Generation Partnership Project; Technical Specification Group Radio Access Network; NG-RAN; PDU Session User Plane Protocol; (Release 16).
R2-163775; 3GPP TSG-RAN WG2 Meeting #93b; Dubrovnik, Croatia, Apr. 11-15, 2016; (Update of R2-162241); Agenda Item: 9.4.3 (Protocol Architecture); Source: Fujitsu; Title: Radio Bearer Handling and Challenges for 5G; Document for: Discussion.
R2-166571; 3GPP TSG-RAN WG2 Meeting #95bis; Kaohsiung, Taiwan, Oct. 10-14, 2016; Title: Throughput prediction and network assisted DASH; Source: Qualcomm Incorporated; Agenda item: 8.16; Document for: Discussion and Approval.
R2-166574; 3GPP TSG-RAN WG2 Meeting #95bis; Kaohsiung, Taiwan, Oct. 10-14, 2016; Title: Radio-aware TCP optimization; Source: Qualcomm Incorporated, CMCC, Huawei; Agenda item: 8.16; Document for: Discussion and Approval.
R2-166576; 3GPP TSG-RAN WG2 Meeting #95bis; Kaohsiung, Taiwan, Oct. 10-14, 2016; Title: Text proposal for radio-aware TCP optimization; Source: Qualcomm Incorporated, CMCC, Huawei; Agenda item: 8.16; Document for: pCR.
R2-166583; 3GPP TSG RAN WG2 Meeting #95bis; Kaohsiung, Oct. 10-14, 2016; Agenda item: 8.16; Source: Intel Corporation; Title: Impact analysis of critical data discard on UL Video transmission; Document for: Discussion and decision.
R2-166585; 3GPP TSG-RAN WG2 Meeting #95bis; Kaohsiung, Taiwan, Oct. 10-14, 2016; Title: Text proposal for service information acquisition and UE assisted local cache; Source: Qualcomm Incorporated, CMCC; Agenda item: 8.16; Document for: pCR.
R2-166597; 3GPP TSG-RAN2 Meeting #95bis; Kaohsiung, Oct. 10-14, 2016; Title: Discussion on the solution on video optimization; Source: Huawei, HiSilicon, Qualcomm Incorporated, CMCC; Agenda item: 8.16 SI: Study on Context Aware Service Delivery in RAN for LTE; Document for: Discussion.
R2-166642; 3GPP TSG-RAN WG2 Meeting #95bis; Kaohsiung, Taiwan, Oct. 10-14, 2016; Agenda item: 8.16; Source: Nokia, Alcatel-Lucent Shanghai Bell; Title: Considerations on CASD issues; WID/SID: FS_LTE_context—Release 14; Document for: Discussion and Decision.
R2-1700191; 3GPP TSG-RAN WG2 NR Tdoc; Spokane, USA, Jan. 17-19, 2017; Agenda Item: 3.2.1.5; Souce: MediaTek Inc.; Title: User Plane Enhancements for TCP Performance; Document for: Discussion and decision.
R2-1703311; 3GPP TSG-RAN WG2 #97bis; Apr. 3-7, 2017; Revision of R2-1700377; Spokane, USA; Source: NTT Docomo, Inc., Fujitsu; Title: Potential hurdle in maximising DL TCP throughput; Document for: Discussion and decision; Agenda Item: 10.3.3.2.
R2-1703524; 3GPP TSG-RAN WG2 #97bis; Spokane, USA, Apr. 3-7, 2017; Revision of R2-1701686; Agenda Item: 10.2.2.4; Source: MediaTek Inc.; Title: Impact of blockage on TCP performance in high frequency scenarios; Document for: Discussion and Decision.
R2-1704060; 3GPP TSG-RAN2 #98; Hangzhou, China, May 15-19, 2017; Agenda Item: 9.5.2; Source: OPPO; Title: Discussion on open issues of eVideo; Document for: Discussion and Decision.
R2-1704757; 3GPP TSG RAN WG2 Meeting #98; Hangzhou, China, May 15-19, 2017; Agenda item: 9.5.2; Source: Intel Corporation; Title: Enhancements to critical data discard on video; Document for: Discussion and decision.

(56) References Cited

OTHER PUBLICATIONS

R2-1707777; 3GPP TSG-RAN2 #99; Berlin, Germany, Aug. 21-25, 2017; Agenda Item: 9.5.3; Source: OPPO; Title: Discussion on open issues of eVideo; Document for: Discussion and Decision.
R3-162790; 3GPP TSG RAN WG3 Meeting #94; Reno, USA, Nov. 14-18, 2016; Agenda item: 28.3; Source: Intel Corporation; Title: Impact analysis of critical data discard on UL Video transmission and TP to address solutions for issue 4; Document for: Discussion and decision.
RP-213587; 3GPP TSG RAN Meeting #94e; Electronic Meeting, Dec. 6-17, 2021; (revision of RP-213558); Source: Nokia (Email discussion moderator); Title: New SID "Study on XR Enhancements for NR"; Document for: Approval; Agenda Item: 8A.2.
S2-2105434; 3GPP TSG-TSA2 Meeting # 146E; E-meeting, Aug. 16- 27, 2021; Change Request; 23.501; CR Draft; rev —; Current version: 1x.x.x.
S2-2109360; SA WG2 Meeting #S2-148E; Nov. 15-22, 2021, Electronic meeting(revision of S2-2108416r07); Source: China Mobile, Huawei, Hisilicon, Tencent, Xiaomi; Title: New SID on Study on architecture enhancement for XR and media services; Document for: Approval; Agenda Item: 9.1.5.
S4-210612; 3GPP TSG SA WG4 #113e; E-meeting, Apr. 6-14, 2021; revision of S4-210468; Agenda item: 11.8 1; Source: Qualcomm Incorporated; Title: [FS_XRTraffic] SA4 and RAN1 Collaboration Proposal; Document for Discussion and Agreement.
S4-210640; F3GPP TSG SA WG4113-e; Apr. 6-14, 2021; revision of S4-210634; Pseudo Change Request; 26.804; CR <CR#>; rev -; Current version: 0.1.1.
RP-180346; 3GPP RAN#79, Chennai, Mar. 19-22, 2018; Source: Mediatek; Title: Study on NR Enhancements for TCP Motivation.
S1-202120; Title: Motivation for R18 5G multi-media enhancements SID; Source: Huawei; May 8, 2020.
S1-203149; 3GPP TSG-SA WG1 Meeting #91-e; e-meeting, Aug. 24-Sep. 2, 2020; Title: Motivation for network efficiency for wideband media services; Source: Huawei.
SP-210620; 3GPP SA Rel. 18 Workshop, Sep. 9-10, 2021; Title: System Architecture (SA2), Rel 18 priorities; Source: Qualcomm.
International Search Report and Written Opinion of the International Searching Authority dated Jun. 20, 2023, in International Application No. PCT/US2022/053820.
R1-2111903; 3GPP TSG RAN WG1 #107-e; e-Meeting, Nov. 11-19, 2021; Agenda Item: 8.14.2; Source: Apple Inc.; Title: Views on enhancements for XR in Rel-18; Document for: Discussion/Decision.

* cited by examiner

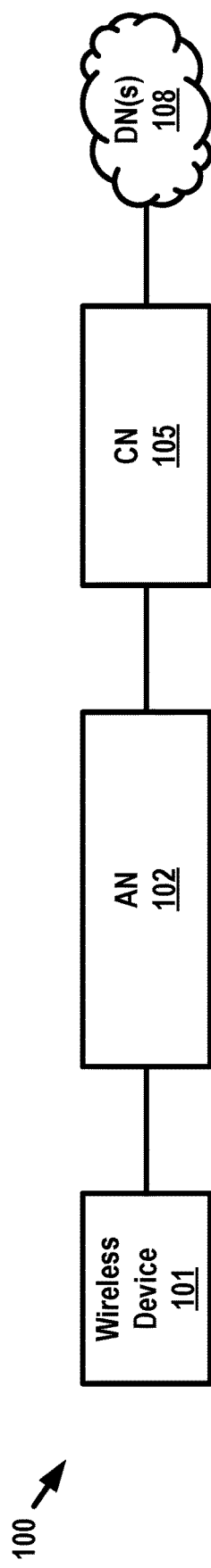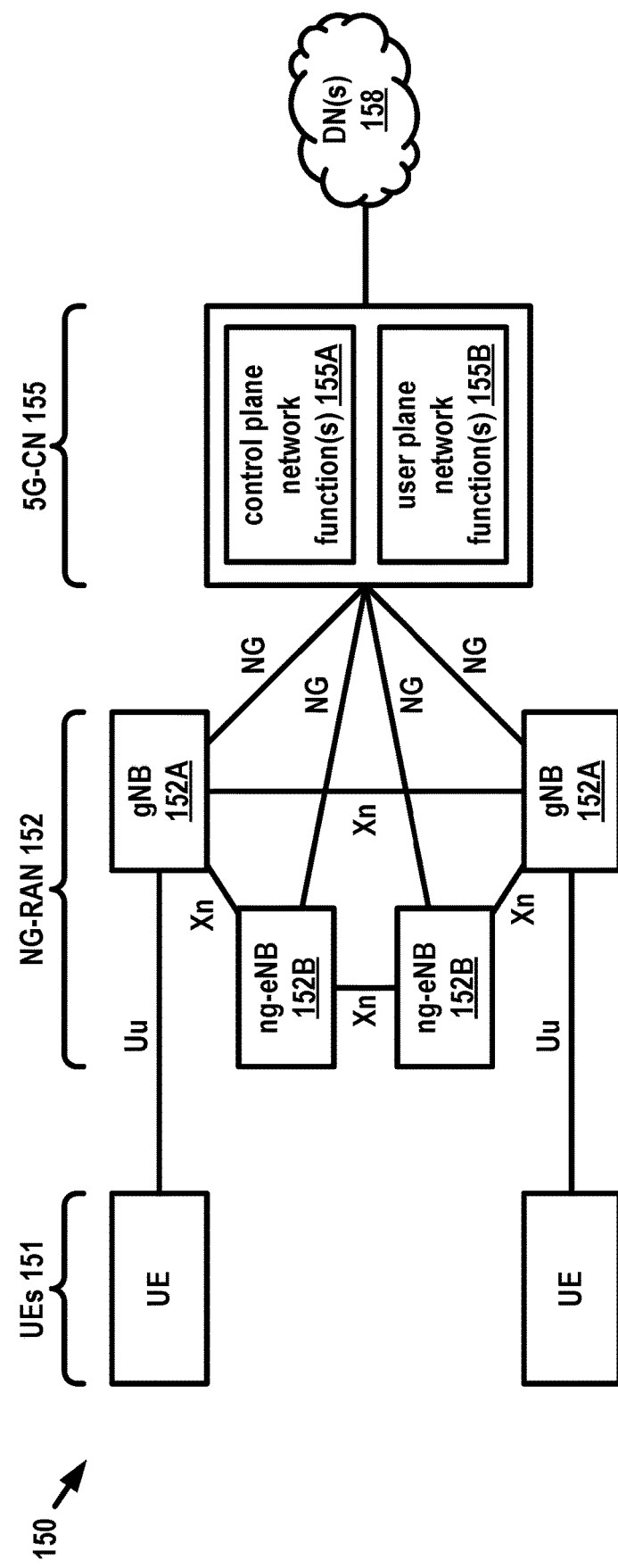

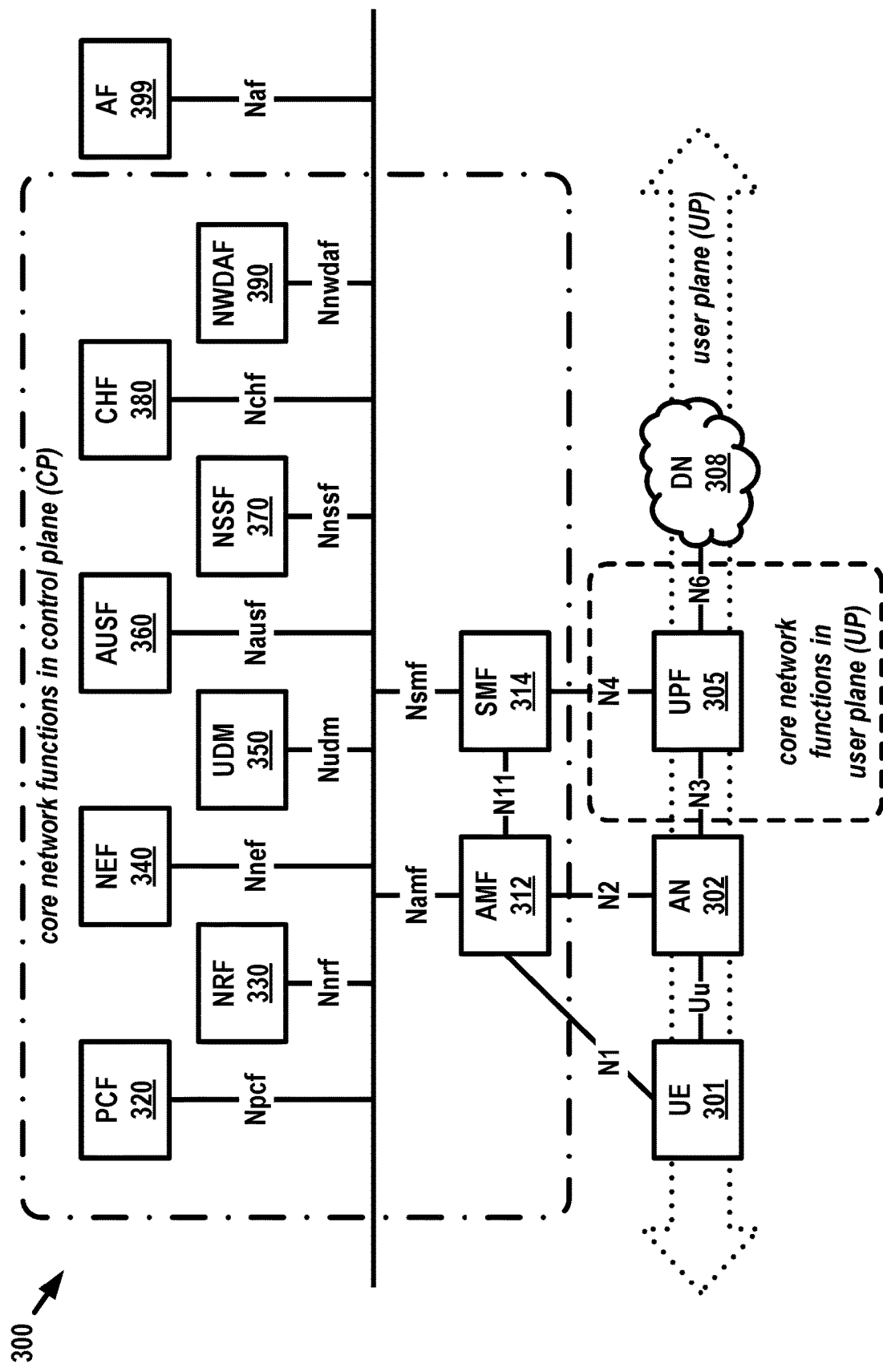

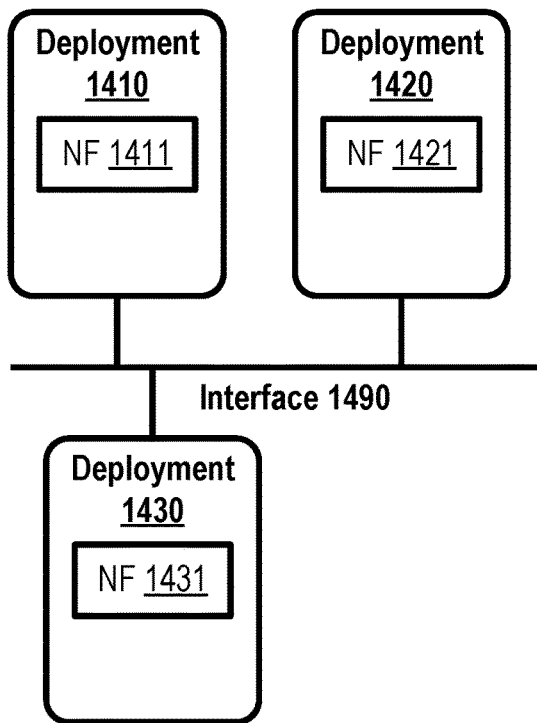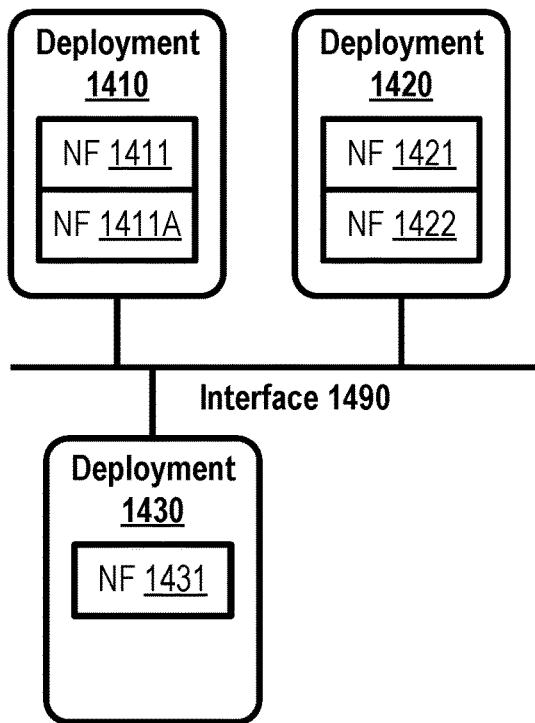
FIG. 14A  FIG. 14B
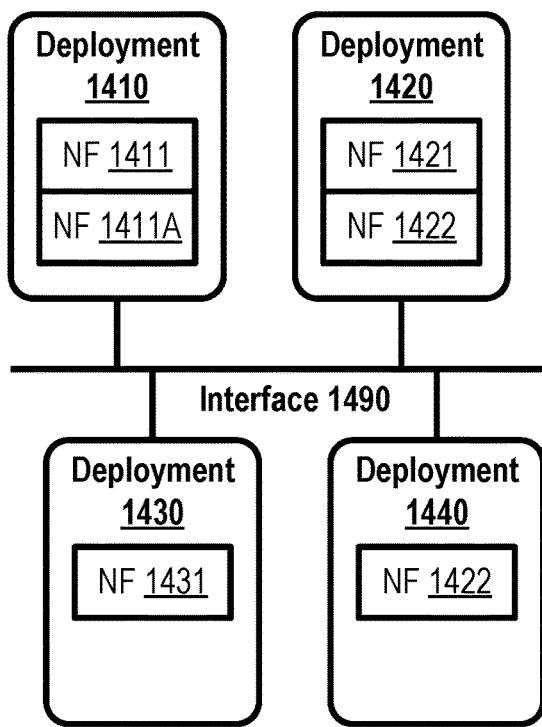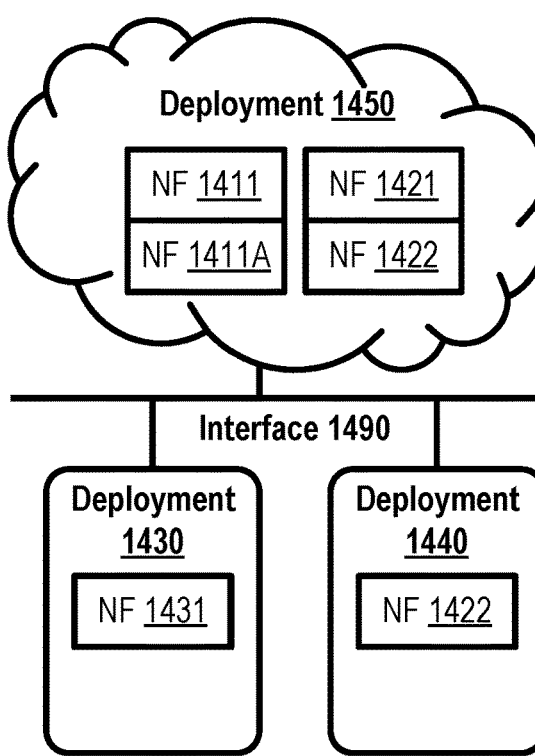
FIG. 14C  FIG. 14D

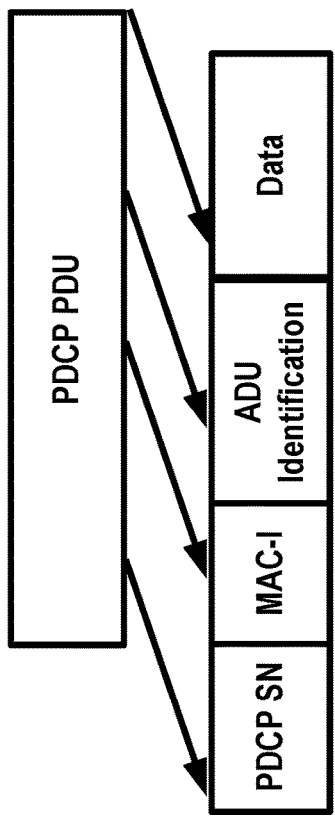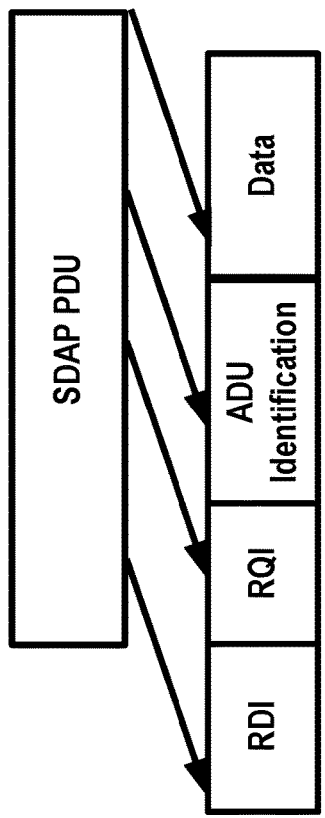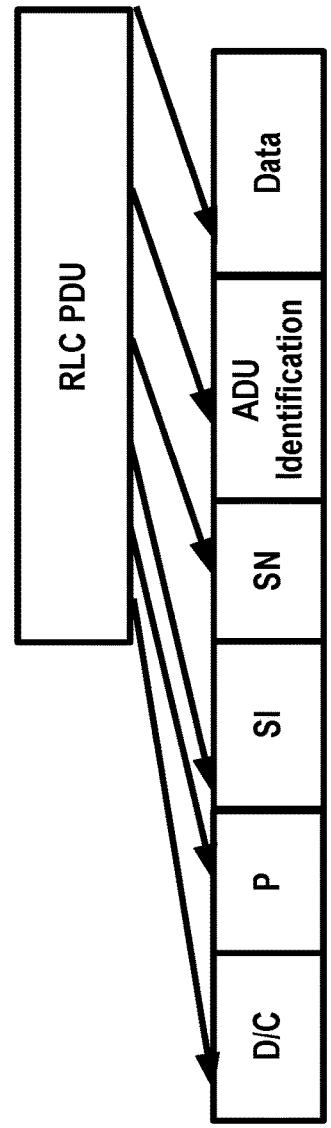

DATA UNIT IN WIRELESS SYSTEM

CROSS-REFERENCE TO RELATED APPLICATIONS

This application is a continuation of International Application No. PCT/US2022/053820, filed Dec. 22, 2022, which claims the benefit of U.S. Provisional Application No. 63/294,713, filed Dec. 29, 2021, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example communication networks including an access network and a core network.

FIG. 3 illustrates an example communication network including core network functions.

FIG. 14A, FIG. 14B, FIG. 14C, and FIG. 14D illustrate various examples of physical core network deployments, each having one or more network functions or portions thereof.

FIG. 29A, FIG. 29B and FIG. 29C are diagrams of an aspect of an example embodiment of the present disclosure.

DETAILED DESCRIPTION

Figure 2A:
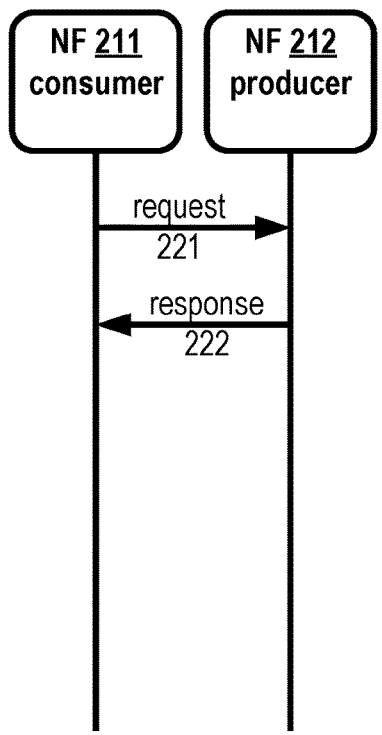
FIG. 2A, FIG. 2B, FIG. 2C, and FIG. 2D illustrate various examples of a framework for a service-based architecture within a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interlace, for example, may be divided into an NG user plane interlace (NG-U) and an NG control plane interlace (NG-C). The NG-U interlace may provide delivery of user plane data between the base stations and the one or more user plane network functions 155B. The NG-C interlace may be used for control signaling between the base stations and the one or more control plane network functions 155A. The NG-C interface may provide, for example, NG interlace management, UE context management, UE mobility management, transport of NAS messages, paging, PDU session management, and configuration transfer and/or warning message transmission. In some cases, the NG-C interlace may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
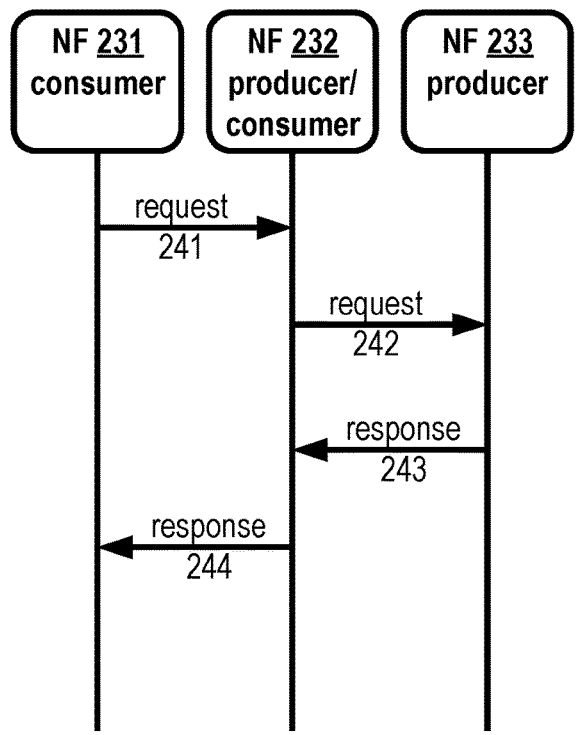

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
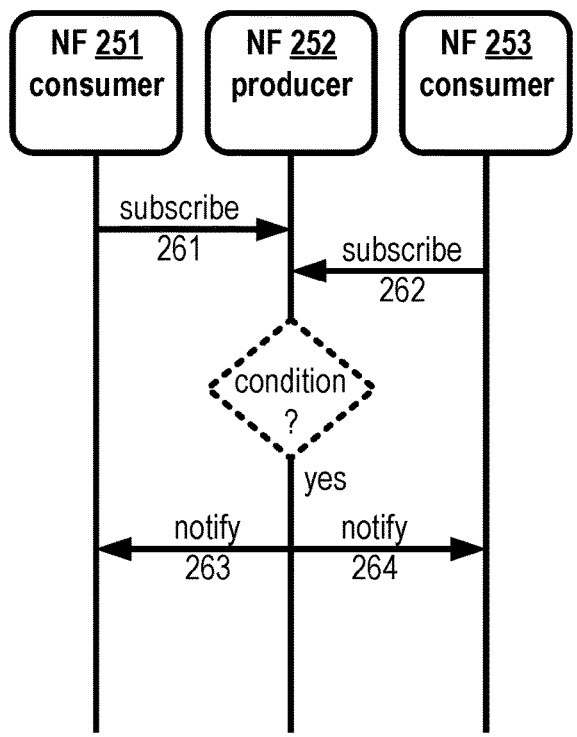

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
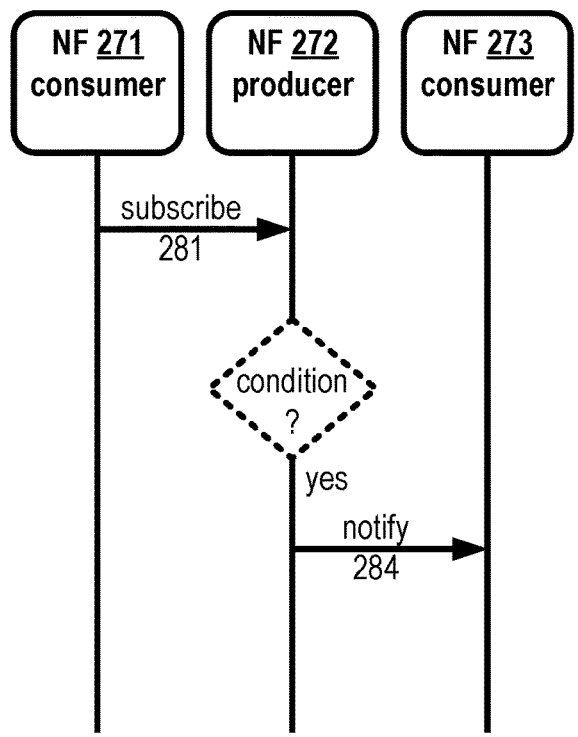

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interlace between PCF 320 and the core network generally may correspond to an N7 interface between PCF 320 and SMF 314, an N30 interlace between PCF 320 and NEF 340, etc.

The UPF 305 may serve as a gateway for user plane traffic between AN 302 and DN 308. The UE 301 may connect to UPF 305 via a Uu interface and an N3 interlace (also described as NG-U interlace). The UPF 305 may connect to DN 308 via an N6 interface. The UPF 305 may connect to one or more other UPFs (not shown) via an N9 interlace. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interlace. The UPF 305 may handle any number of PDU sessions associated with any number of UEs (via any number of ANs). For purposes of handling the one or more PDU sessions, UPF 305 may be controlled by any number of SMFs via any number of corresponding N4 interlaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
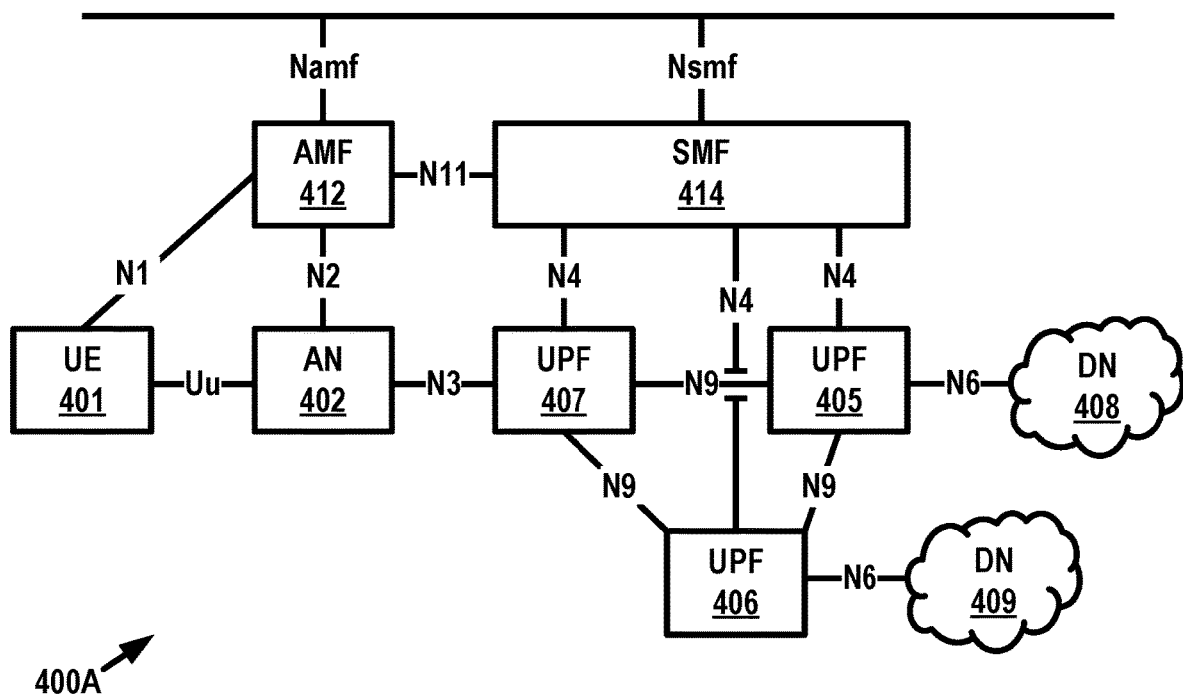
FIG. 4A and FIG. 4B illustrate examples of core network architecture with multiple user plane functions and untrusted access.
Figure 4B:
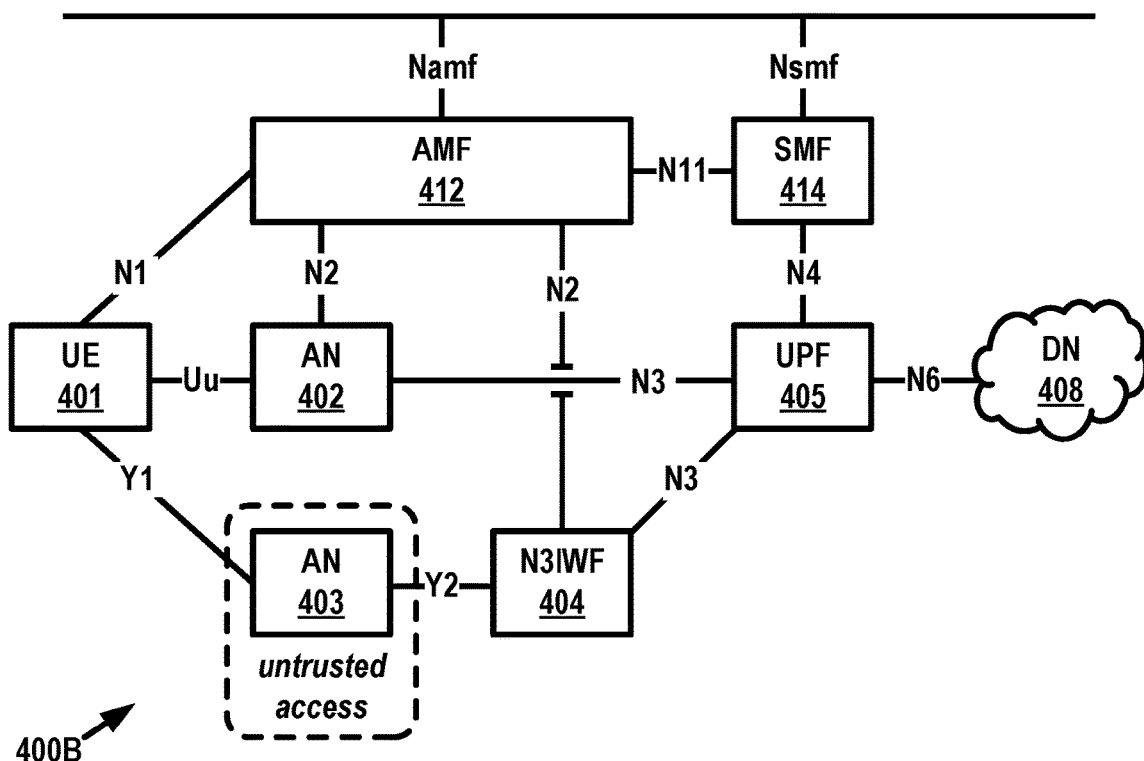
Figure 5:
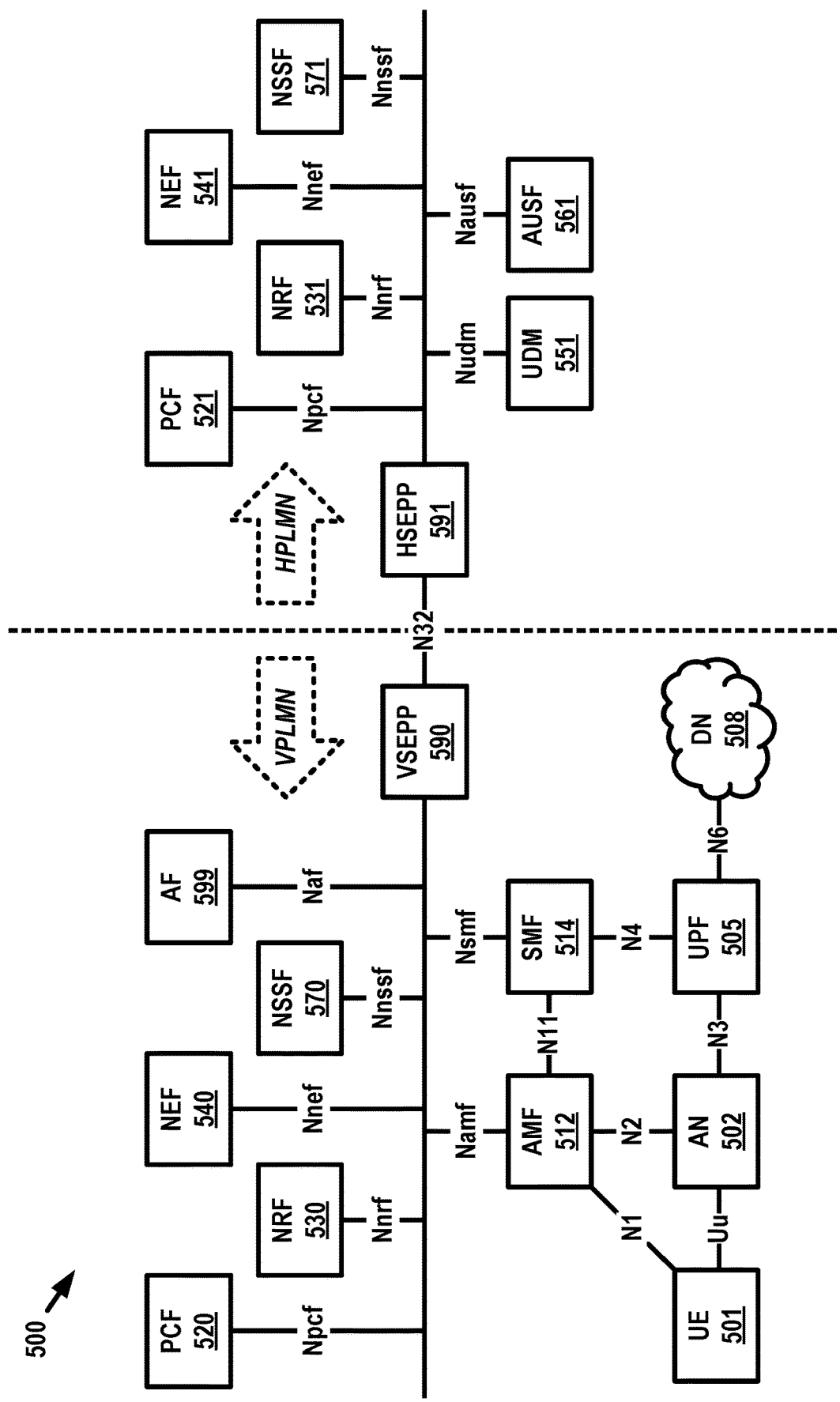
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interlace connecting respective security edge protection proxies (SEPPs). In FIG. 5, the respective SEPPs are depicted as a VSEPP 590 and an HSEPP 591.

The VSEPP 590 and the HSEPP 591 communicate via an N32 interlace for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interlace may run parallel to the N32 interlace, crossing the frontier between the VPLMN and the HPLMN to carry user plane data. One or more SMFs of the respective PLMNs may communicate via the N32 interlace to coordinate session management for UE 501. The SMFs may control their respective UPFs on either side of the frontier.

Figure 6:
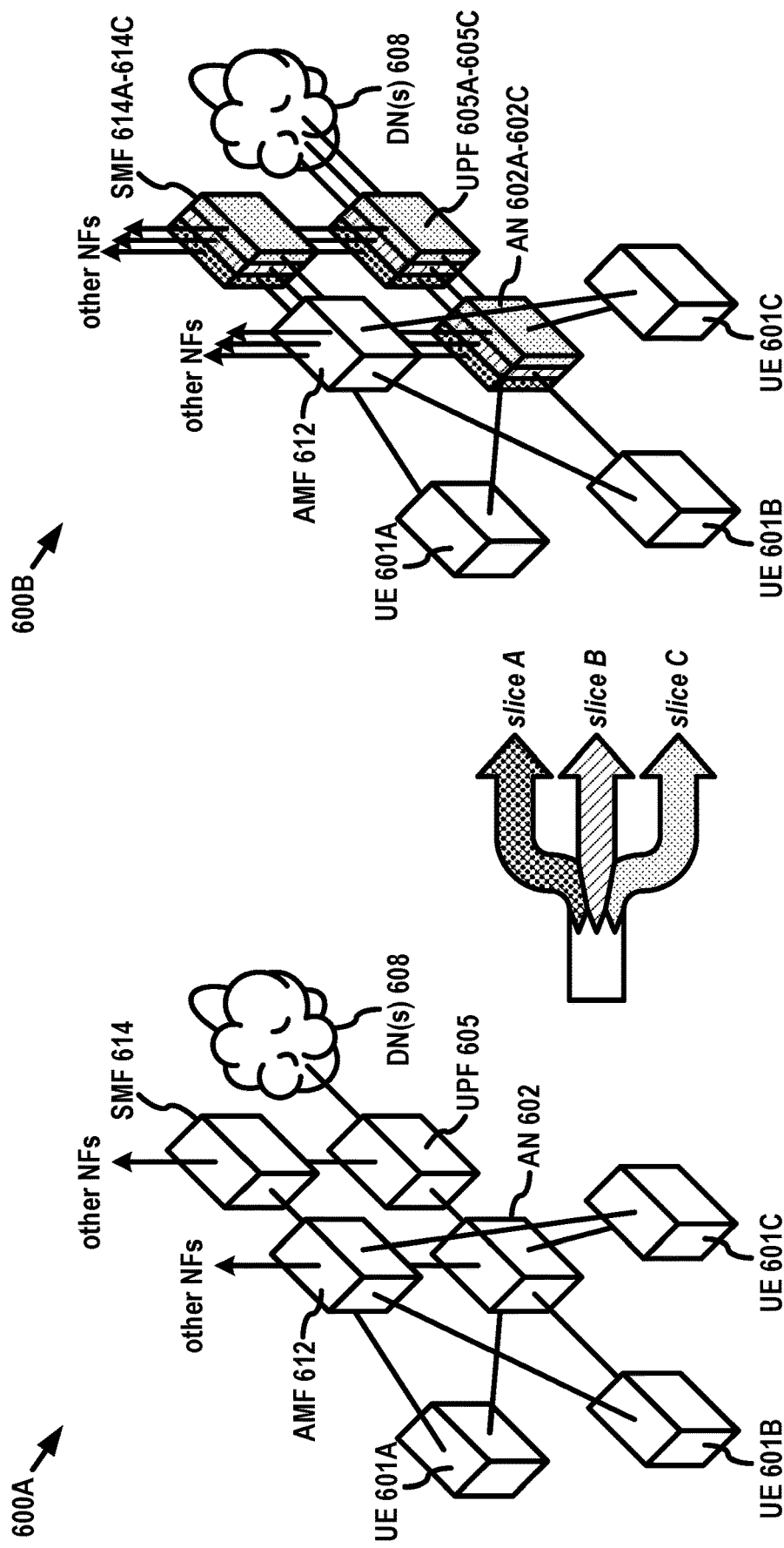
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
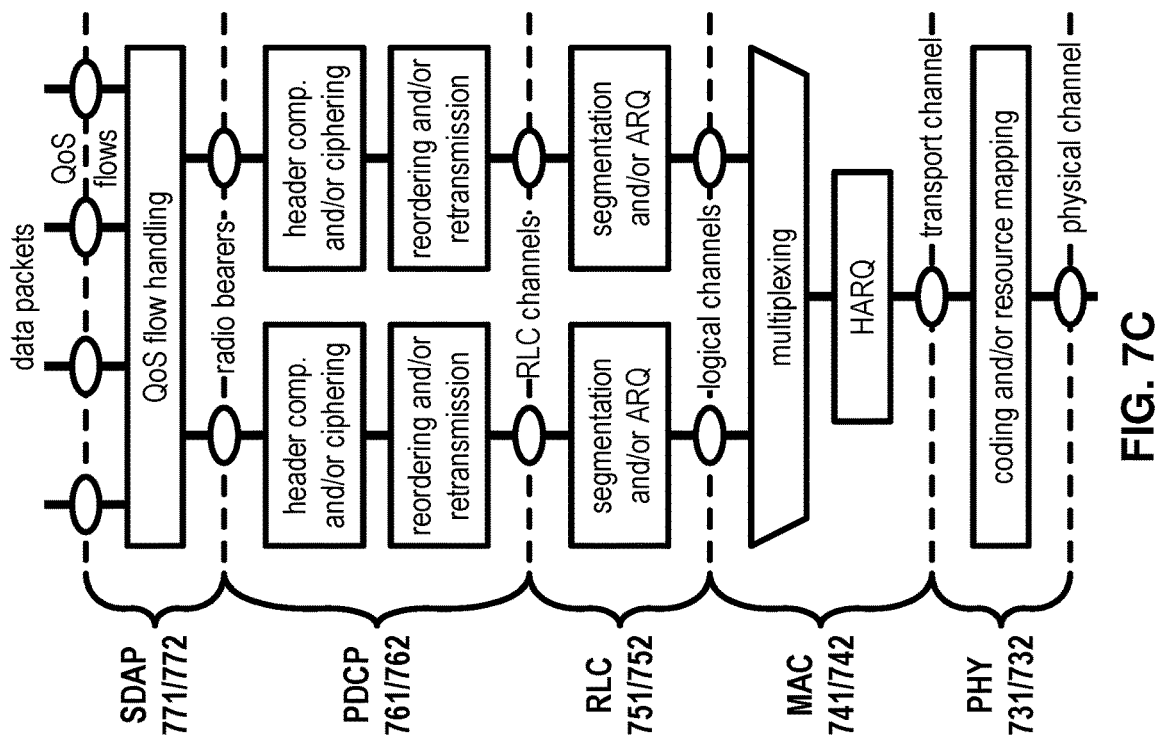
FIG. 7A, FIG. 7B, and FIG. 7C illustrate a user plane protocol stack, a control plane protocol stack, and services provided between protocol layers of the user plane protocol stack.
Figure 7A:
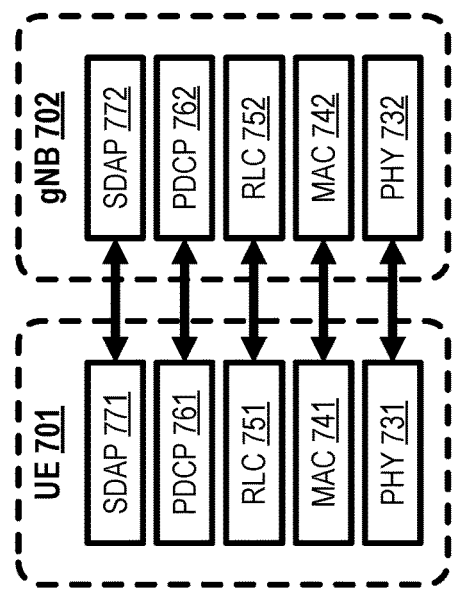
Figure 7B:
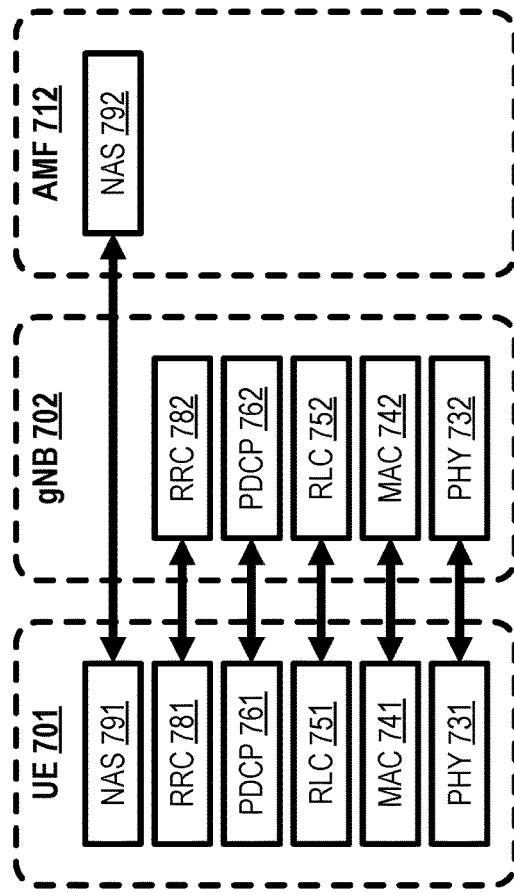

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
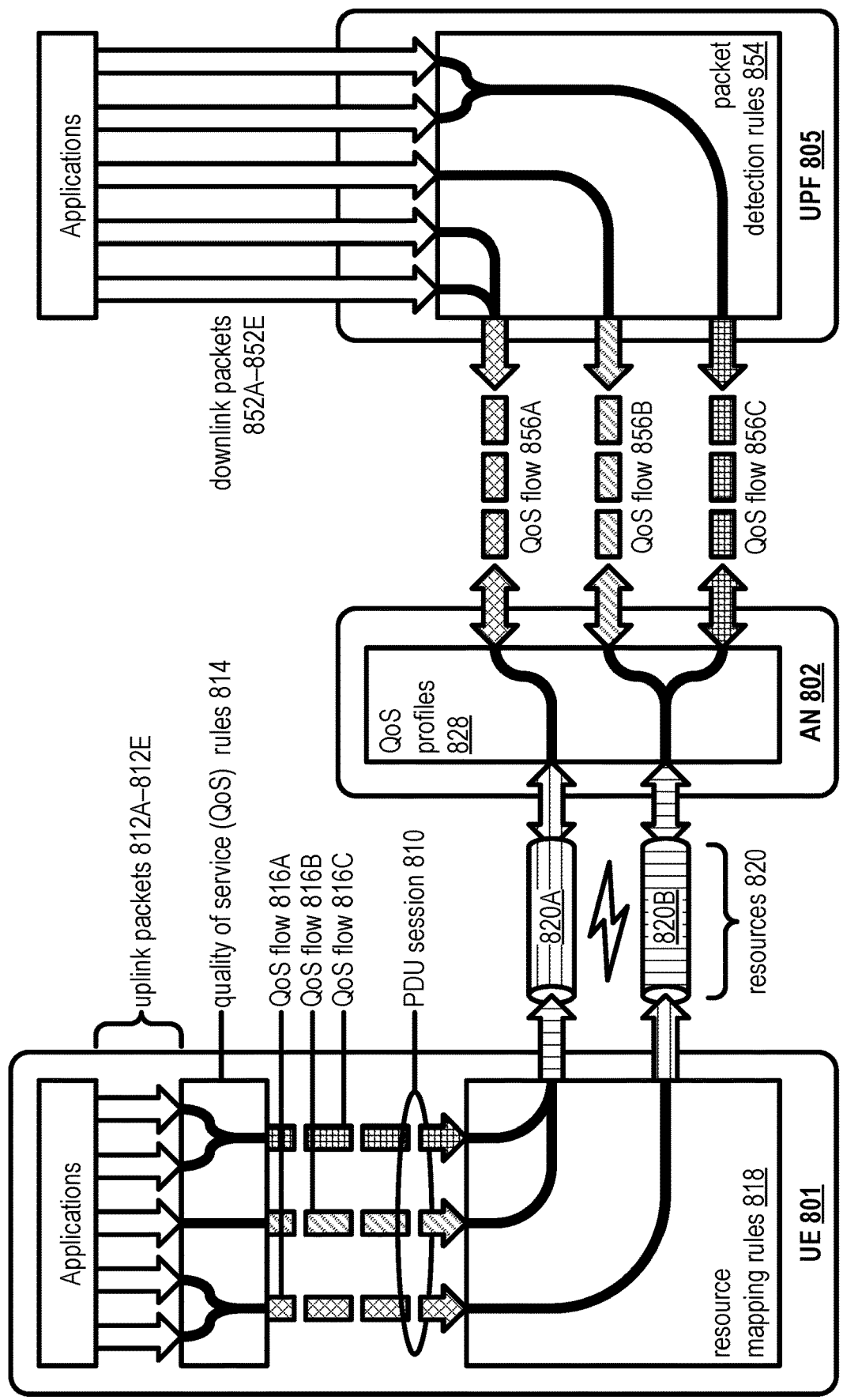
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
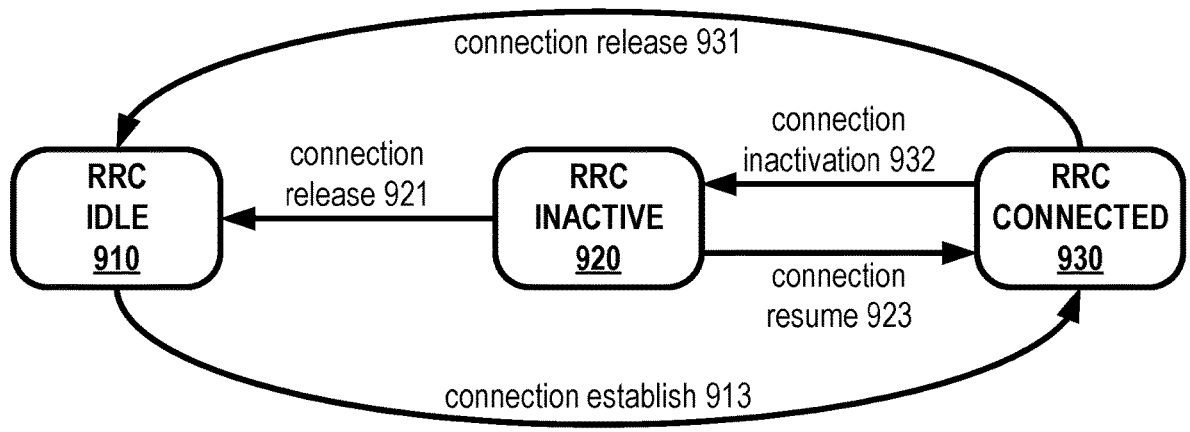
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
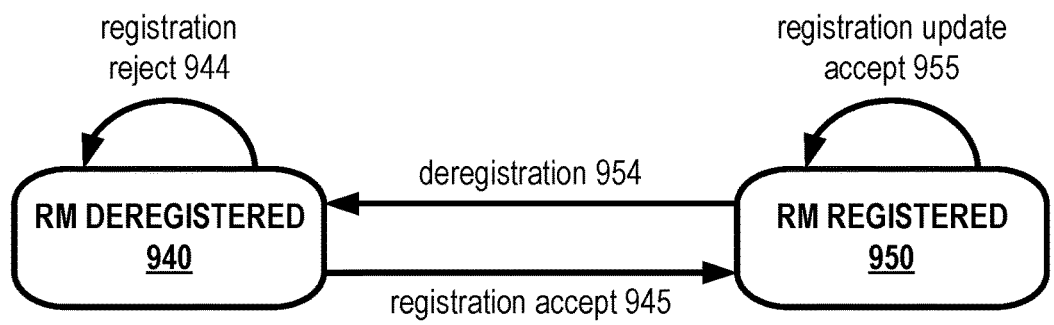

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
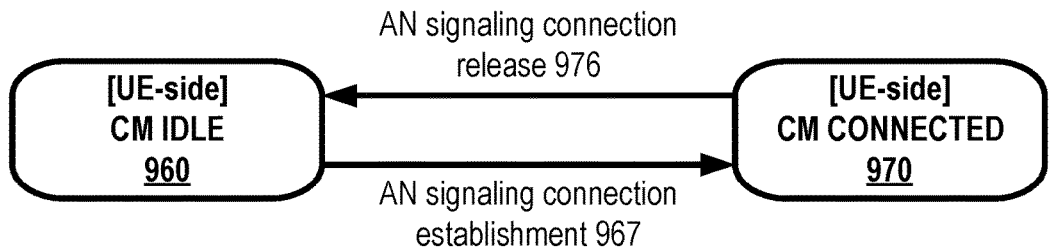

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
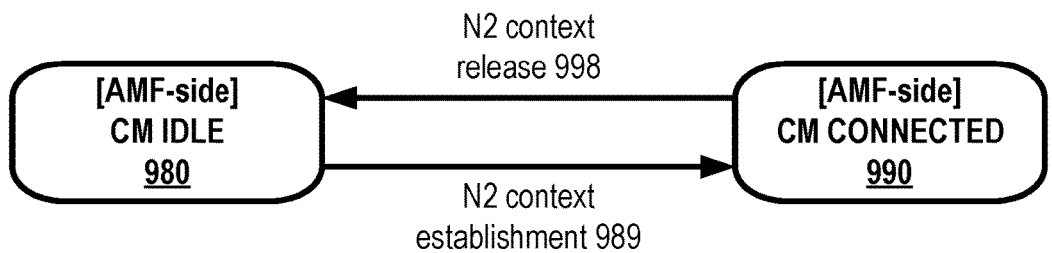

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
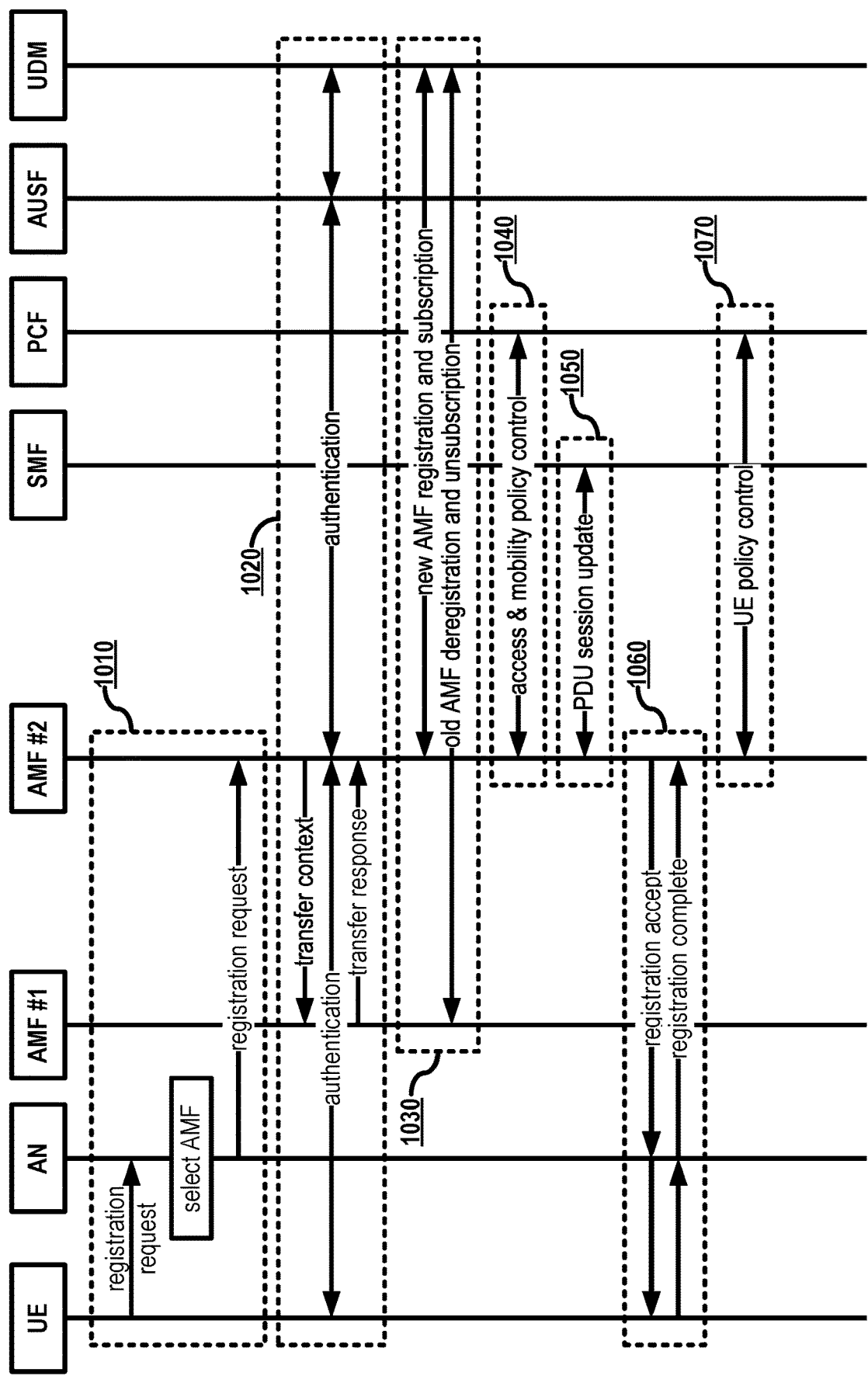
FIG. 10 illustrates an example of a registration procedure for a wireless device.
Figure 11:
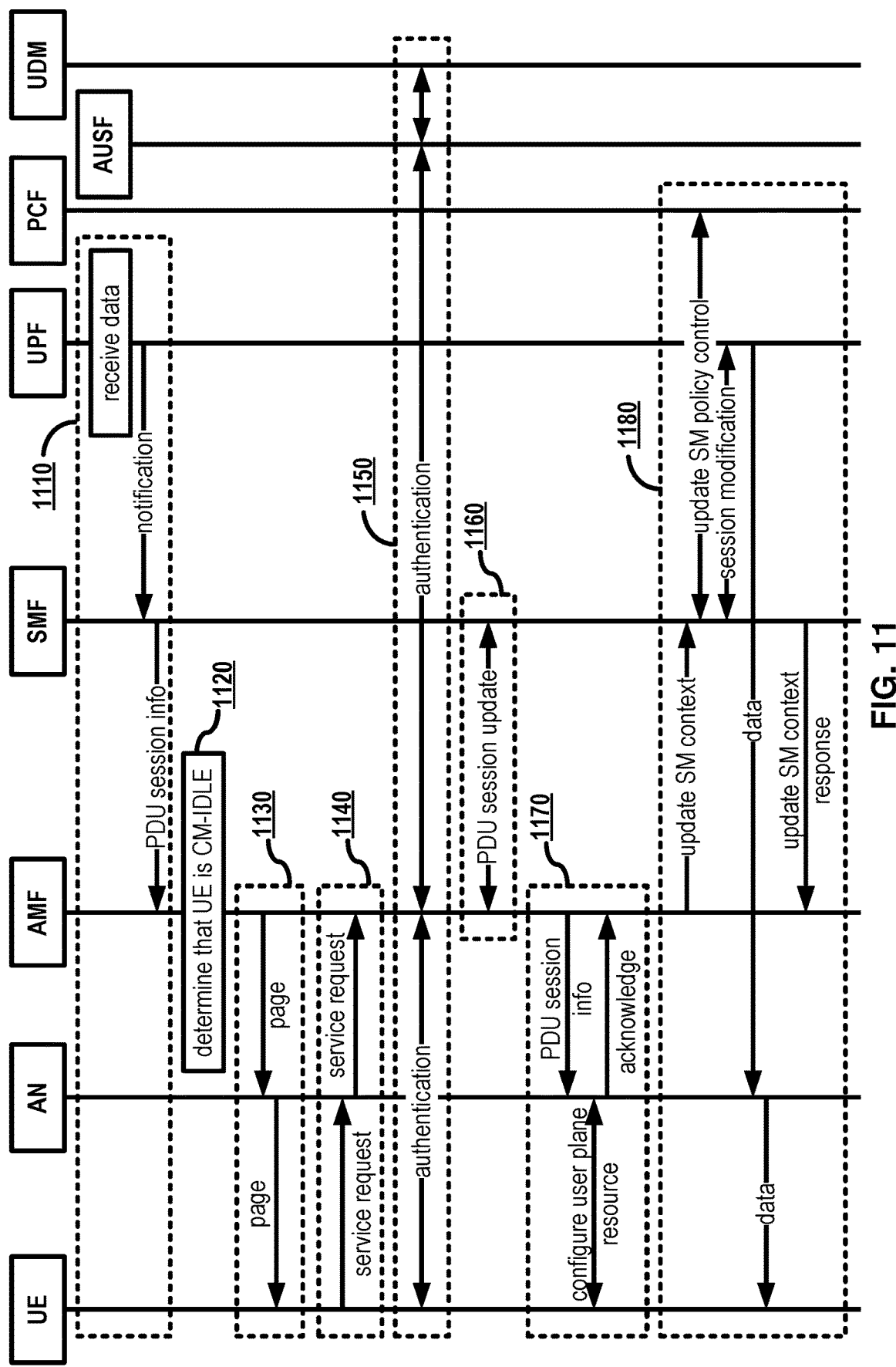
FIG. 11 illustrates an example of a service request procedure for a wireless device.
Figure 12:
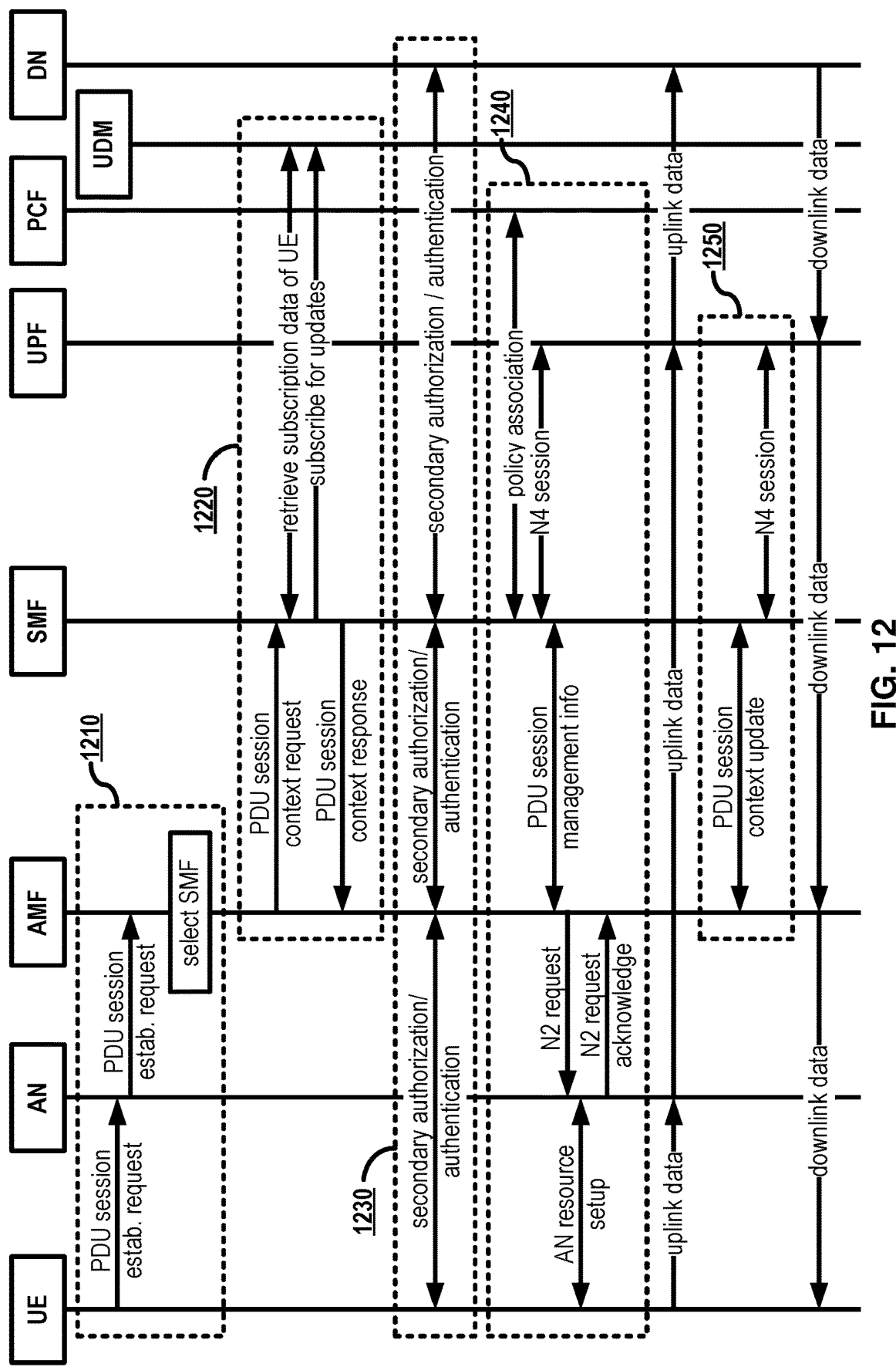
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_PDUSession_CreateSMContext Response and/or a Nsmf_PDUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_PDUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
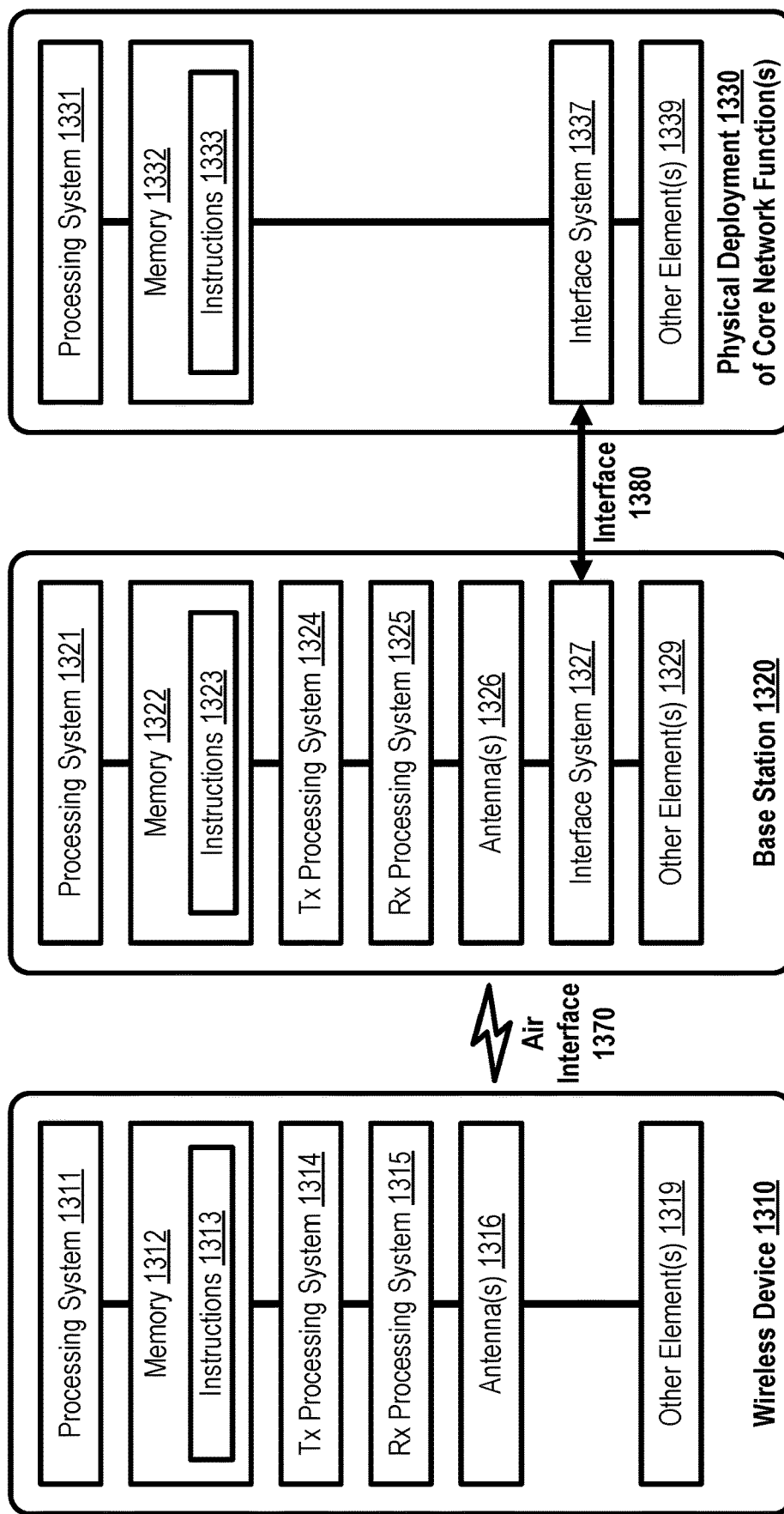
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interlace 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15:
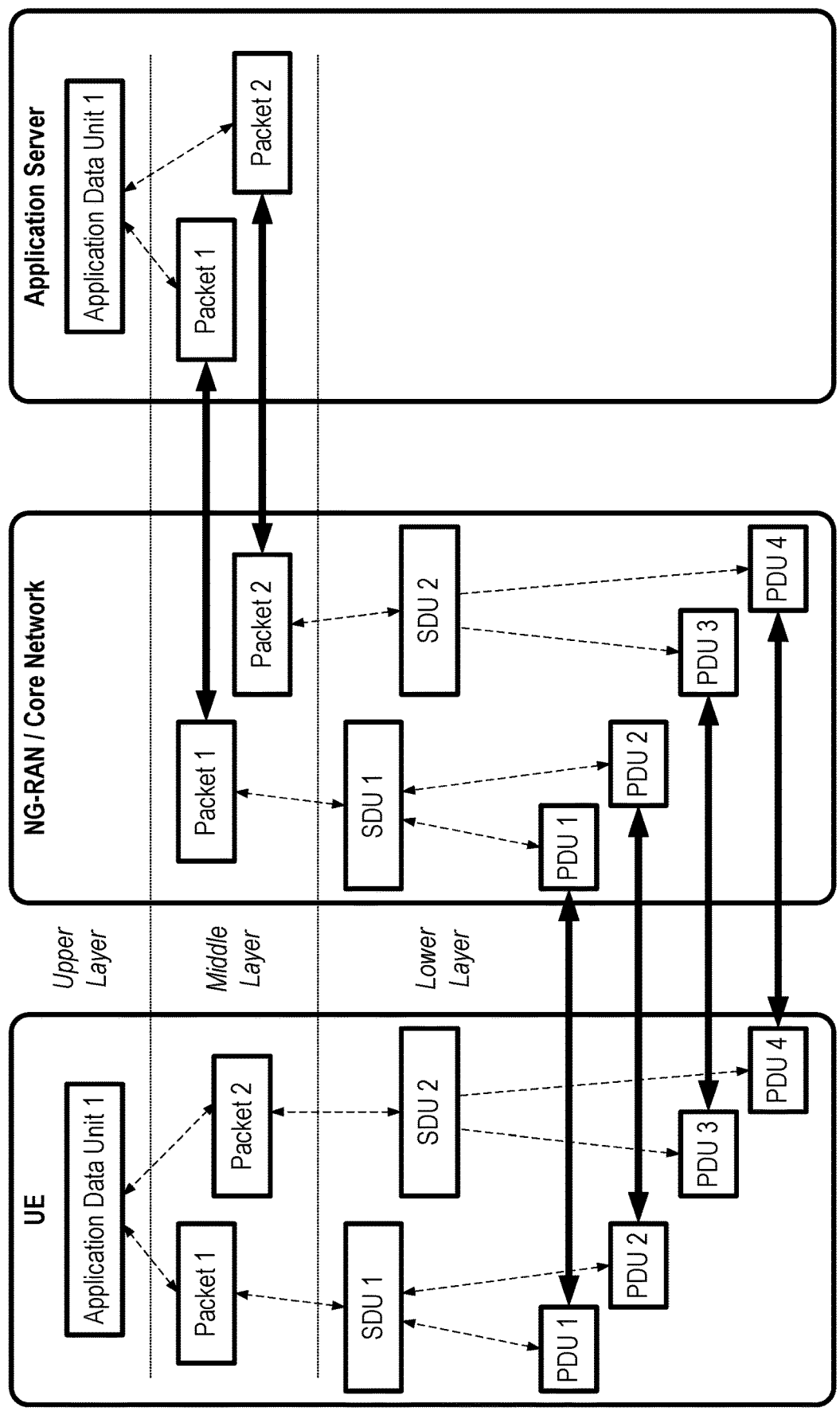
FIG. 15 is a diagram of an aspect of an example embodiment of the present disclosure.

An example embodiment depicted in FIG. 15 illustrates how an application data unit (ADU) is delivered from a sender to a receiver. The ADU may comprise, for example, a picture file, a video frame, text file and so on. For example, the ADU may comprise a data unit generated by one or more protocols (e.g., RTP, DASH, TCP, UDP, etc.). The ADU may, for example, be generated and/or created by a first instance of a particular application, for use and/or enjoyment by a second instance of the application, or for processing by an application server of the application. A middle layer may be responsible for packaging and/or formatting the ADU for the delivery from the sender to the receiver. For example, the middle layer may provide functionality of one or more protocols (e.g., IP, etc.). After formatting the ADU into one or more packets based on the one or more protocols, the middle layer may forward the one or more packets to a lower layer. The one or more packets for the ADU may be a PDU set for the ADU. A packet of the one or more packets may be a PDU. The lower layer may provide functionality of forwarding the one or more packets, for example, over a particular interface, from one node to another. The second instance of the application may be located at the other node.

As depicted in FIG. 15, for example, the upper layer (e.g., an application) in the UE may generate ADU 1. The upper layer in the UE may deliver the ADU 1 to the middle layer of the UE. For the delivered ADU 1, the middle layer of the UE may process the ADU 1 and may package the ADU 1 into one or more packets, based on the one or more protocols. For example, the one or more packets may comprise a packet 1 and/or a packet 2. For example, if IP protocol is used, the ADU 1 may be processed into one or more IP packets. Each IP packet may comprise at least a portion of the ADU 1.

The middle layer may deliver the generated one or more packets to the lower layer. The lower layer may be Access Stratum (AS). For example, a SDAP entity of the AS layer may receive the packet 1 and/or packet 2 from the middle layer, as SDU 1 and SDU 2. The AS layer of the UE may process and send the SDU 1 and the SDU 2. For example, a AS layer of the UE may send the SDU 1 and the SDU 2 to a AS layer of a NG-RAN. For example, a RLC entity of the AS layer of the UE may generate one or more PDUs from the SDU 1 and the SDU 2. For example, based on amount of radio resources allocated by the NG-RAN, the RLC layer of the AS layer may segment the SDU 1 into PDU 1 and PDU 2, the SDU 2 into PDU 3 and PDU 4. A MAC entity of the AS layer may receive the one or more PDUs from the RLC entity. The MAC entity may transmit the received one or more PDUs to the NG-RAN.

The various layers have different functions, such as those described above in, for example, FIG. 7C. The data that makes up the ADU 1 may be divided, subdivided, compressed, ciphered, reordered, multiplexed, encoded, etc. After the ADU 1 passes through these layers, the end result (e.g., the one or more PDUs) may be suitable for transmission. However, the PDUs may be indecipherable (literally) to the application associated with ADU 1. After transmission, described in greater detail below, the process may be reversed, and the ADU 1 may be reconstructed at the other side (e.g., the application server in FIG. 15), so that it becomes usable by the application.

Returning to FIG. 15, the MAC entity of the NG-RAN may receive the one or more PDUs sent by the UE. The received one or more PDUs may be reassembled into one or more SDUs. For example, with the received PDU 1 and PDU 2, the AS layer of the NG-RAN may reassemble the SDU 1. For example, with the received PDU 3 and PDU 4, the AS layer of the NG-RAN may reassemble the SDU 2. The packet 1 of the SDU 1 and the packet 2 of the SDU 2 may be delivered from the NG-RAN to core network (e.g., UPF). The core network may send the packet 1 and the packet 2 toward the receiver (e.g., an application server associated with the ADU) via internet. After receiving the packet 1 and packet 2, the middle layer of the application server may recover the ADU 1 and deliver the ADU 1 to upper layer. The upper layer may perform application specific processing using the received ADU 1.

In existing technologies, one or more protocol entities and/or one or more layers may be agnostic to differentiated characteristics of differentiated applications. In existing technologies, one or more protocol entities and/or one or more layers may be agnostic to differentiated characteristics of one or more types of ADU for an application. For example, the AS layer may not consider different characteristic of different applications. For example, the AS layer may not consider the difference and/or similarity and/or relationship among one or more ADUs of an application. For example, a data unit in lower layers (e.g., Packet 1, SDU 1, PDU 2 in FIG. 15) may be associated with a portion of an ADU associated with a particular application (e.g., ADU 1 in FIG. 15). But within the lower layers, the data unit may not be recognizable as being associated with a particular application data unit, or even a particular application. At lower layers, the data unit may simply be a series of ones and zeroes which is packaged for delivery. This application-agnostic approach (e.g., ADU-agnostic approach) may contribute to supporting independent enhancement of one or more layers and/or one or more entities. For example, by not tying operation of the AS layer to a certain application characteristic, the AS layer may evolve without requiring change of behavior of one or more applications. Due to this application-agnostic approach, the AS layer may support introduction of new later-developed applications. However, as new advanced use cases emerge and QoS requirements of applications are tightened to provide users with enhanced experience, the application-agnostic approach by the AS layer may fail to support efficient use of radio resources and network resources, as will be discussed in greater detail below.

Figure 16:
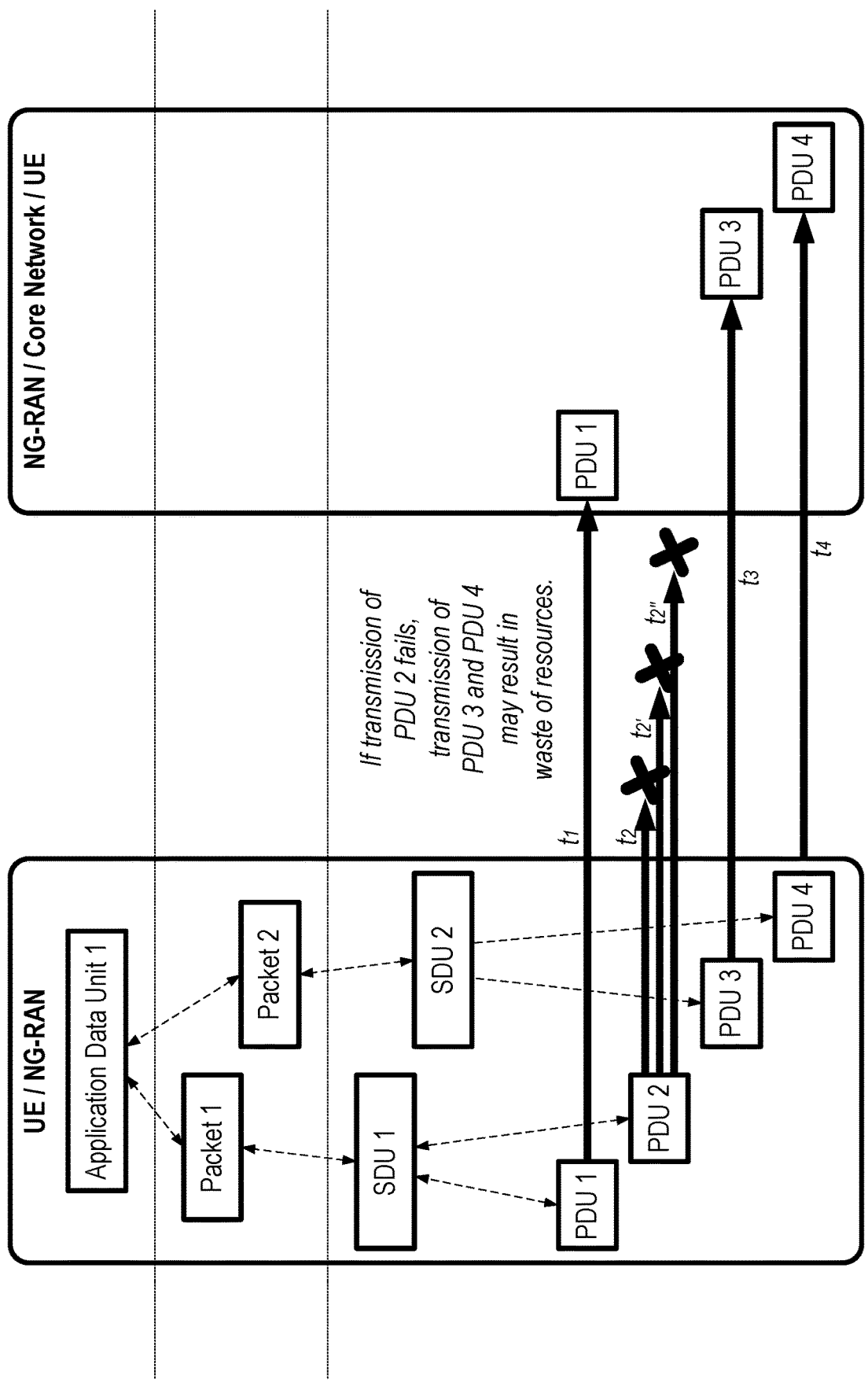
FIG. 16 is a diagram of an aspect of an example embodiment of the present disclosure.

FIG. 16 illustrates an example of data delivery where one or more PDUs are not delivered from UE to NG-RAN. For one or more generated PDUs (e.g., PDU 1, PDU 2, PDU 3, PDU 4), an RLC entity of a lower layer and/or a MAC entity of a lower layer may transmit the one or more PDUs. When transmission of a PDU fails, the RLC and/or MAC entity may perform re-transmission of the PDU. For example, if the RLC entity of a sender receives from a RLC entity of the receiver, a negative acknowledgement for the one or more PDUs, the RLC entity of the sender may perform re-transmission of the one or more PDUs. For example, if the MAC entity of the sender receives negative HARQ acknowledgement for a HARQ process from the receiver, the MAC entity of the sender may perform HARQ re-transmission for the HARQ process.

In the example of FIG. 16, at time t=t1, the RLC entity of the sender may transmit the PDU 1 and may receive acknowledgement for the PDU 1. At time t=t2, the RLC entity may transmit next PDU, which is PDU 2. After detecting that the transmission of the PDU 2 fails, the RLC entity may perform retransmission of the PDU 2 at time t=t2' and t=t2". After several failed transmission of the PDU 2, the RLC entity may stop transmission of the PDU 2 and may start transmission of PDU 3 at t=t3, PDU 4 at t=t4. For the received PDUs (e.g., PDU 1, PDU 3 and PDU 4), the receiver may perform assembly of one or more SDUs, using the received one or more PDUs. The receiver may deliver the one or more assembled SDUs to a next hop (e.g., UPF, NG-RAN, UE, internet router, upper layer).

As FIG. 15 shows, for delivery of a ADU from a sender to a receiver, all PDUs associated with the ADU may need to be delivered from the UE to the NG-RAN. If one of the PDUs are not successfully delivered, the ADU may not be recovered. For example, in the example of FIG. 16, the ADU 1 are associated with PDU 1, PDU 2, PDU 3 and PDU 4. In the example, because the PDU 2 is not successfully delivered from the UE to the NG-RAN, the NG-RAN may not be able to reassemble the SDU 1 (e.g., packet 1). In the example, because the PDU 3 and the PDU 4 are successfully delivered from the UE to the NG-RAN, the NG-RAN may be able to reassemble the SDU 2 (e.g., packet 2). The NG-RAN may forward the packet 2 of the SDU 2 to the application server, via core network. Because the packet 1 is not received, the application server cannot recover ADU 1 with the received packet 2.

However, as the example of FIG. 16 illustrates, the inefficient operation of the existing technologies causes the sender to keep sending PDUs that are unusable by the application. For example, at t=t", the RLC entity of the sender may realize the failure of transmission of PDU 2. Because of the failure, the ADU 1 associated with the PDU 2 cannot be recovered by the application. But the RLC entity of the sender may initiate the transmission of the PDU 3 and PDU 4 associated with the ADU 1. Even if the PDU 3 and PDU 4 are successfully transferred, the missing PDU 2 makes the PDU 3 and PDU 4 of less use, because the application server may not be able to use the ADU 1. Thus, the operation of the existing technologies causes waste of valuable radio resources and network resources.

One possible method of addressing this problem may be to not transmit other associated PDUs for an ADU, when at least one PDU for the ADU is not successfully transmitted. However, this may bring another challenge as illustrated in the example FIG. 17.

Figure 17:
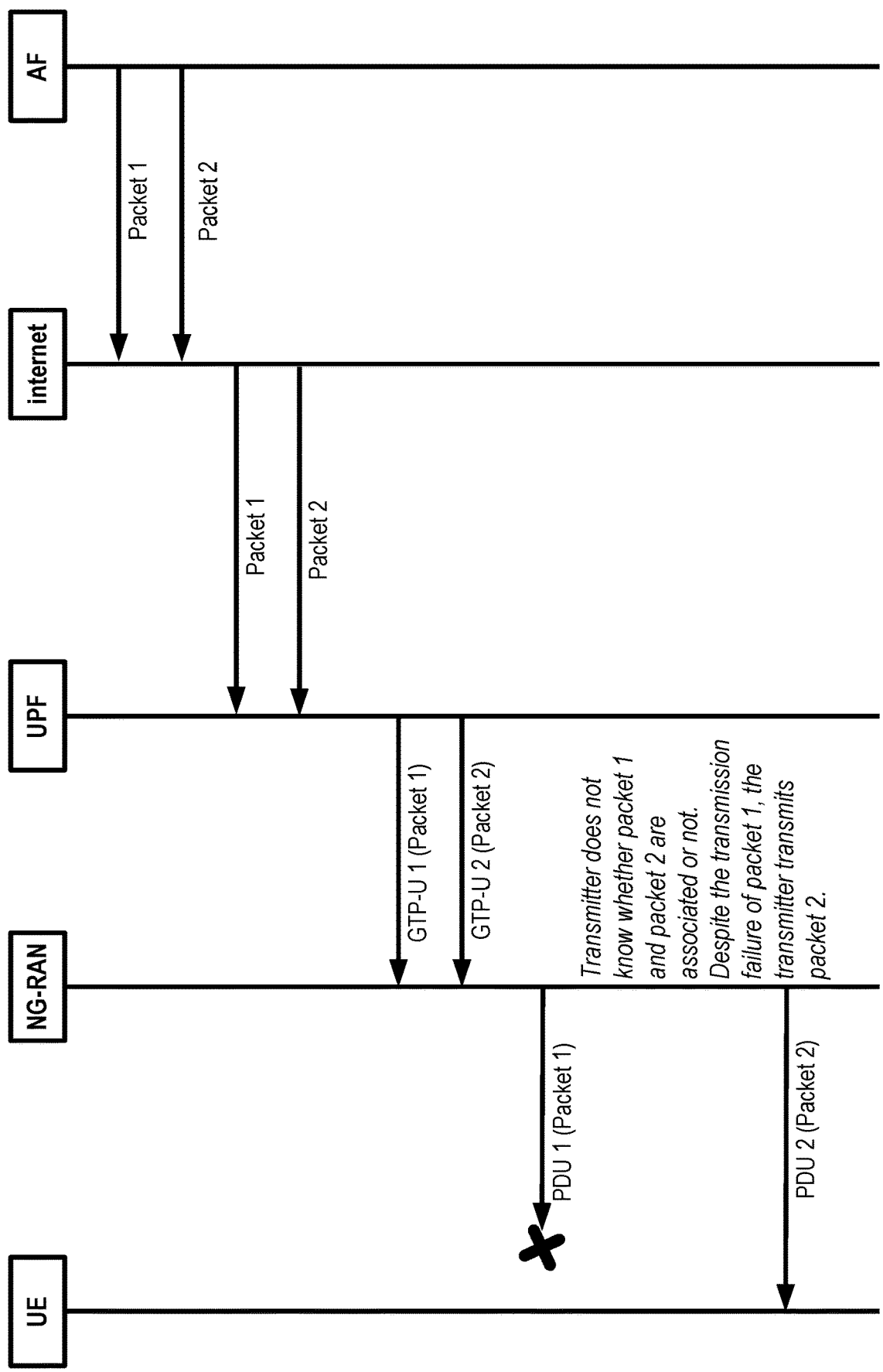
FIG. 17 is a diagram of an aspect of an example embodiment of the present disclosure.

As illustrated in the FIG. 17, application function (AF) where an application is running may generates an ADU. The ADU may be packaged into one or more IP packets (e.g., IP Packet 1 and IP Packet 2) and the AF may send the one or more IP packets toward a UE. These packets may be routed via Internet and may arrive at a UPF serving the UE. The UPF may encapsulate the arrived one or more IP packets into GTP-U packets and may send the GTP-U packets to a NG-RAN. The NG-RAN may extract the one or more IP packets from the received GTP-U packets. The NG-RAN may initiate the transmission of the one or more IP Packets. The NG-RAN may generate one or more PDUs, using the one or more IP Packets. For example, PDU 1 may be associated with the IP Packet 1 and PDU 2 may be associated with the IP Packet 2. The NG-RAN may transmit PDU 1 to the UE. If the radio condition temporarily deteriorates, e.g., when the UE may pass through a tunnel, the transmission of the PDU 1 may fail. After that, the NG-RAN may initiate the transmission of next PDU, e.g., PDU 2. The transmission of the PDU 2 may succeed. Because the PDU 1 and the PDU 2 are associated with the same ADU, for the application to recover the ADU, the receiver may require reception of both PDU 1 and PDU 2. If transmission fails for the PDU 1, the PDU 2 may not be used for the reassembly of the ADU. If transmission fails for the PDU 1, the success or failure of transmission PDU 2 may not differ to the operation of the application. However, the NG-RAN may not know whether the PDU 1 and PDU 2 are associated with the same ADU or not. As a result, the NG-RAN may waste radio resources, by transmitting the PDU 2. Example embodiments of the present disclosure improve system efficiency by enhancement in operation of a network and/or a UE. In an example embodiment, based on interaction between a network and an application function, the network may determine whether enhanced processing can be applied or not (e.g., ADU-aware handling of lower-layer data units). The network may perform identification of associated one or more ADUs for one or more incoming packets. The network may support information distribution based on the identification of associated one or more ADUs for one or more incoming packets. For example, a network function (e.g., UPF) may send, to another network node (e.g., NG-RAN), an indication that a received or incoming packet is one of one or more packets associated with a data unit (e.g., ADU) of a data flow for a wireless device. In an example embodiment, the indication is within a GTP header. In other example embodiments, different network nodes may communicate configuration and/or assistance information for determining whether a packet is associated with a data unit of a data flow of a wireless device. This may reduce waste of radio and/or network resources by supporting one or more network nodes to perform advanced handling for the incoming one or more packets. This may support enhanced QoS experience to a user.

In the specification, a term of a NG-RAN may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like.

In the specification, a term of an AMF may be interpreted as a core network device, which may comprise at least one of a mobility management function/entity, an access management function, and/or the like. In the specification a term of an SMF may be interpreted as a core network device, which may comprise at least one of a session management function/entity, a serving gateway, a PDN gateway, and/or the like.

In the specification, a term of a core network node may be interpreted as a core network device, which may comprise at least one of an AMF, a SMF, a NSSF, a UPF, a NRF a UDM, a PCF and/or the like. A term of core network may be interpreted as a core network node. In the specification, a term of an access node may be interpreted as a base station, which may comprise a NG-RAN, and/or the like. In the specification, a term of a network node may be interpreted as a core network node and/or an access node and/or a UE and/or the like.

In the specification, a term of an AF (application function) may be interpreted as a AS (application server), which may host and/or run one or more applications.

In the specification, a term ADU may be interpreted as a unit of data that is exchanged among one or more hosts serving an application. In an example, an application (e.g., an internet browser, an instant messaging application, a video-player application, etc.) may be running on a first host (e.g., a smartphone, computer, application server, etc.) and the same application may be running on a second host (e.g., another smartphone, computer, application server, etc.). The application on a first host may generate application data (e.g., a picture file, a text message, etc.) comprising one or more ADUs. For the delivery of the application data from the first host to the second host, the application of the first host may deliver the application data to a first protocol entity (e.g., a HTTP entity, etc.). To deliver the application data to the second host, the first protocol entity of the first host may process the application data, and generate one or more first-type protocol data units (e.g., HTTP request messages, HTTP response messages, etc.).

The first protocol entity may deliver the one or more first-type protocol data units to a first-type access protocol layer (e.g., LTE access layer, NR access layer, WIFI access layer, etc.). The first-type access protocol layer of the first host may process the one or more first-type protocol data units, may generate one or more first-type access protocol data units (e.g., SDAP PDUs, PDCP PDUs, RLC PDUs, MAC PDUs, etc.). The first-type access protocol layer of the first host may transmit the one or more first-type access protocol data units. A first-type access protocol layer of a third host (e.g., NG-RAN, UE, etc.) may receive the one or more first-type access protocol data units. The third host may reassemble the one or more first-type protocol data units, may deliver the one or more first-type protocol data units to a second-type access protocol layer (e.g., LTE access layer, NR access layer, WIFI access layer, Ethernet layer, ATM layer, GTP layer, etc.) of the third host.

The second-type access protocol layer of the third host may process the one or more first-type protocol data units, may generate one or more second-type access protocol data units (e.g., Ethernet Frames, ATM cells, LTE access layer PDUs, NR access layer PDUs, WIFI access layer packets, etc.). The second-type access protocol layer of the third host may transmit the one or more second-type access protocol data units. The second-type access protocol layer of the second host may receive the one or more second-type access protocol data units. The second-type access protocol layer of the second host may reassemble the one or more first-type protocol data units, using the one or more second-type access protocol data units. The second-type access protocol layer of the second host may deliver the reassembled one or more first-type protocol data units to the first-type protocol entity of the second host. The first-type protocol entity of the second host may reassemble the application data, using the one or more first-type protocol data units. The first-type protocol entity of the second host may deliver the application data to the application of the second host.

In an example, there may be one or more protocol entities (e.g., TCP entity, UDP entity, RTP entity, etc.) between the application and the access protocol layers. In above description, for simple illustration purpose, only one protocol entity (e.g., the first-type protocol entity) is described. In an example, there may be one or more protocol entities (e.g., a second-type protocol entity, a third-type protocol entity, and so on) between the first-type protocol entity and the access protocol layer. Similarly, in one example, there may be one or more hosts (e.g., NG-RANs, UPFs, internet routers, etc.) between the first host and the second host. In above description, for simple illustration purpose, only one host (e.g., the third host) is described. In an example, there may be additional one or more hosts (e.g., a fourth host (e.g., UPF), a fifth host (e.g., internet router) and so on) between the third host and the second host. In an example, a pair of hosts may use same or different types of the access protocol layer. For example, for communication between the third host and the fourth host, a third-type access protocol layer (e.g., optic fiber, satellite, etc.) may be used.

In an example, an ADU may be interpreted as the application data. In an example, an ADU may be interpreted as the first-type protocol data unit. In an example, an ADU may be interpreted as the second-type protocol data unit and so on. In an example, an ADU may be interpreted as a unit of data of a protocol and/or as a unit of data of a layer. In an example, the first host and the second host may keep one or more context for the protocol and/or the layer. For example, the application of the first host may communicate with the application of the second host. The application of the first host may have a context for the second host. The application of the second host may have a context for the first host. Accordingly, the application data may be an ADU. For example, the first-type protocol entity of the first host may communicate with the first-type protocol entity of the second host. The first-type protocol entity of the first host may have a context for the second host. The first-type protocol of the second host may have a context for the first host. Accordingly, the first-type protocol data unit may be an ADU. For example, the first-type access protocol layer of the first host may not communicate with the second-type access protocol layer of the second host. The first-type access protocol entity of the first host may not have a context for second-type access protocol of the second host. The second-type access protocol layer of the second host may not have a context for the first-type access protocol of the first host. Accordingly, the first-type access protocol data unit may not be an ADU. Accordingly, the second-type access protocol data unit may not be an ADU.

In the specification, a term of a service data flow may be interpreted as a set of data units exchanged among the one or more hosts. For example, a first service data flow may be interpreted as a set of one or more data units from a second host to a first host. For example, a second service data flow may be interpreted as a set of one or more data units from a third host to the first host. For example, one or more data units of a service data flow may share one or more attributes (e.g., same source IP address, same destination IP address, same UDP port, etc.).

In the specification, ADU-aware delivery may be interpreted as a mechanism and/or a processing by one or more network nodes. For example, the mechanism and/or the processing may be to handle one or more protocol data units, based on information of one or more ADUs associated with the one or more protocol data units. For example, the mechanism and/or the processing may be to identify information associated with one or more ADUs for the one or more protocol data units. For example, the mechanism and/or the processing may be to configure one or more network nodes, to use information of one or more associated ADUs for one or more protocol data units.

Figure 18:
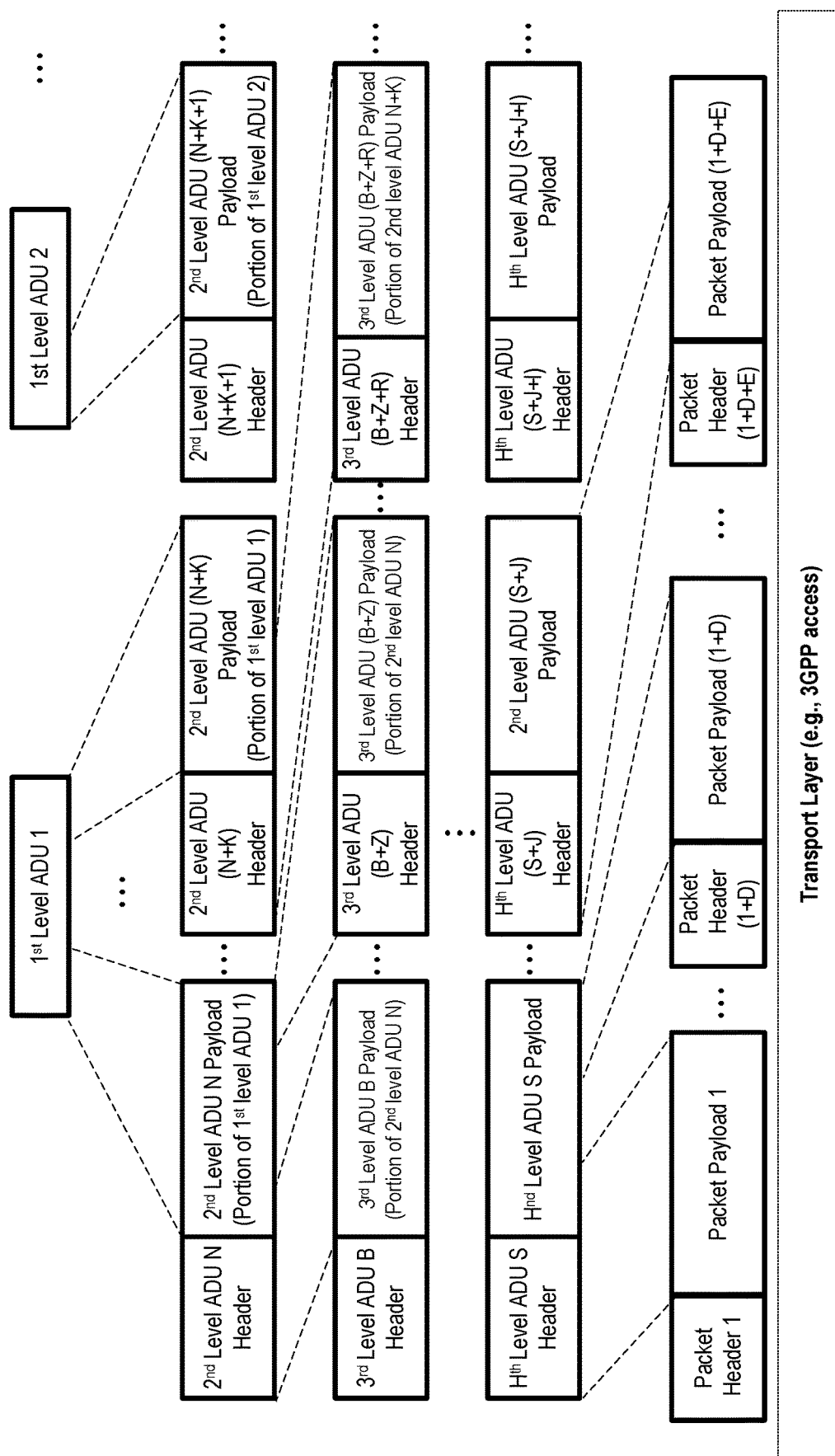
FIG. 18 is a diagram of an aspect of an example embodiment of the present disclosure.

FIG. 18 may illustrate one example of one or more ADUs and/or packets. For example, a host may comprise one or more level of protocol/application entities. One entity (e.g., a first entity) of the one or more protocol/application entities may receive one or more data units from one entity (e.g., a second entity) of the one or more protocol/application entities. One entity (e.g., a first entity) of the one or more protocol/application entities may send one or more data units to one entity (e.g., a third entity) of the one or more protocol/application entities.

In an example, $1^{st}$ level protocol/application entity may generate one or more $1^{st}$ level ADUs. The $1^{st}$ level protocol/application entity may send the one or more $1^{st}$ level ADUs, to $2^{nd}$ level protocol/application entity. The $2^{nd}$ level protocol/application entity may generate one or more $2^{nd}$ level ADUs. The one or more $2^{nd}$ level ADUs may comprise one or more $2^{nd}$ level ADU headers and/or one or more $2^{nd}$ level ADU payloads. The one or more $2^{nd}$ level ADU payloads may comprise at least a portion of the one or more $1^{st}$ level ADUs. The portion of the one or more $1^{st}$ level ADUs may comprise one or more bytes of the one or more $1^{st}$ level ADUs. The $2^{nd}$ level protocol/application entity may deliver the one or more $2^{nd}$ level ADUs to a next level ADU protocol/application entity (e.g., $3^{rd}$ level ADU protocol/application entity).

The $3^{rd}$ level protocol/application entity may receive one or more $2^{nd}$ level ADUs from the $2^{nd}$ level protocol/application entity. The $3^{rd}$ level protocol/application entity may generate one or more $3^{rd}$ level ADUs. The one or more $3^{rd}$ level ADUs may comprise one or more $3^{rd}$ level ADU headers and/or one or more $3^{rd}$ level ADU payloads. The one or more $3^{rd}$ level ADU payloads may comprise at least a portion of the one or more $2^{nd}$ level ADUs. The portion of the one or more $2^{nd}$ level ADUs may comprise one or more bytes of the one or more $2^{nd}$ level ADUs. The $3^{rd}$ level protocol/application entity may deliver the one or more $3^{rd}$ level ADUs to a next level ADU protocol/application entity (e.g., $4^{th}$ level ADU protocol/application entity).

Above operation may be repeated, depending on a number of protocol/application entities. Depending on a number of protocol/application entities, $2^{nd}$ level protocol/application entity and/or $3^{rd}$ level protocol/application entity may not be used.

In an example, a packet protocol entity (e.g., IP protocol entity) may receive one or more $H^{th}$ level ADUs from the $H^{th}$ level protocol/application entity. The packet protocol entity may generate one or more packets. The one or more packets may comprise one or more packet ADU headers and/or one or more packet payloads. The one or more packet payloads may comprise at least a portion of the one or more $H^{th}$ level ADUs. The portion of the one or more $H^{th}$ level ADUs may comprise one or more bytes of the one or more $H^{th}$ level ADUs. The packet protocol entity may deliver the one or more packets to an access layer (e.g., internet, 3GPP protocol stack, LTE access layer, NR access layer, WIFI access layer). In an example, the packet protocol entity may be interpreted as one of the protocol/application entities.

In an example, the $1^{st}$ level/application entity may be an application (e.g., a video application). The $2^{nd}$ level protocol/application entity may be HTTP protocol entity. The $3^{rd}$ level protocol/application entity may be a RTP protocol entity. A $4^{th}$ level protocol/application entity may be a UDP protocol entity. A $5^{th}$ level protocol/application entity and/or a packet protocol entity may be an IP protocol entity.

Figure 19:
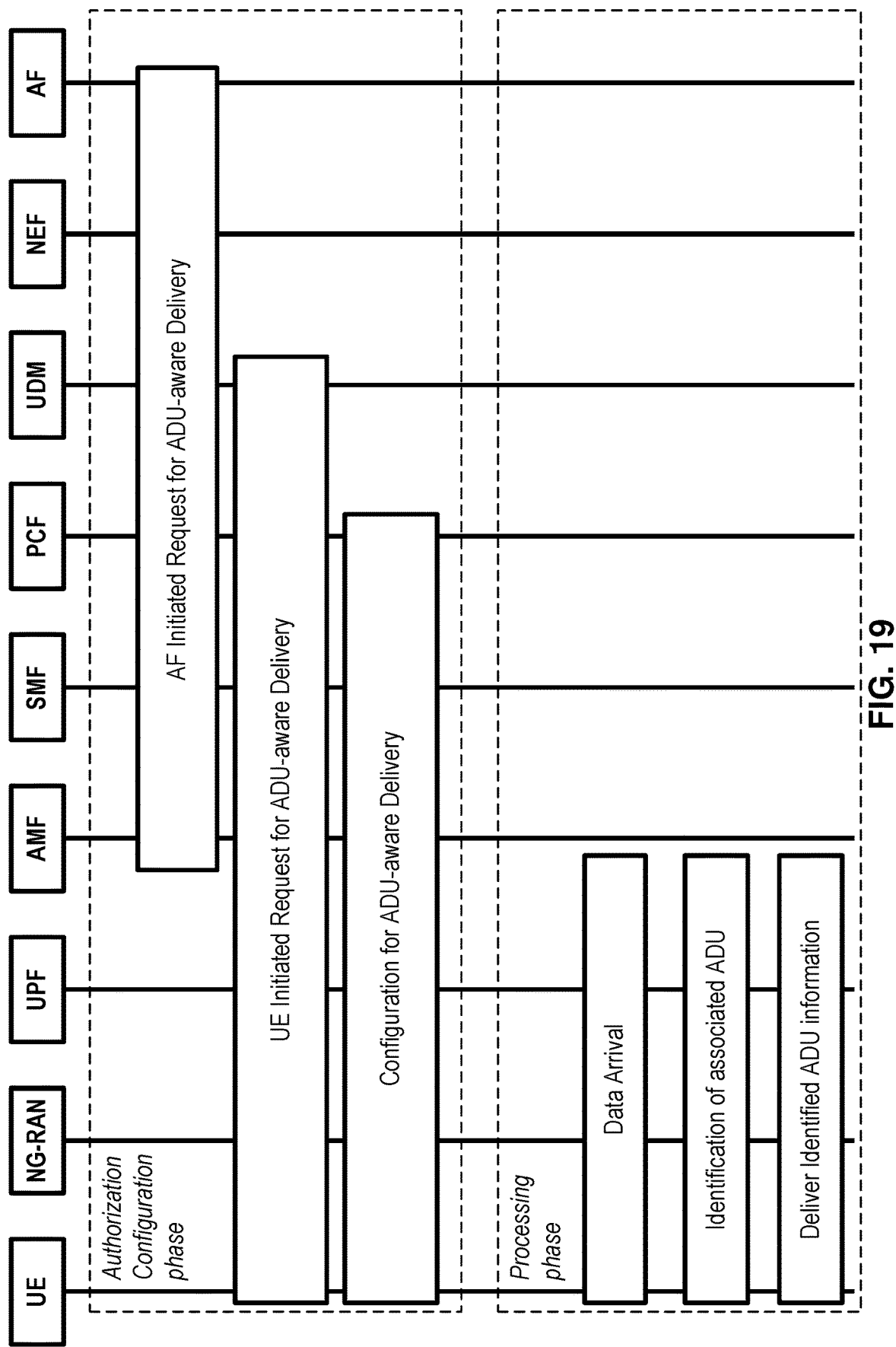
FIG. 19 is a diagram of an aspect of an example embodiment of the present disclosure.

FIG. 19 may depict example embodiments of the present disclosure. In an example, an AF may perform signaling with a core network to request activation of ADU-aware delivery. In an example, a UE may perform signaling with the core network to request activation of ADU-aware delivery. In an example, based on the request for activation of ADU-aware delivery, one or more network nodes may perform one or more procedures to configure one or more network nodes to support ADU-aware delivery. In an example, based on the configuration for the ADU-aware delivery, the one or more network nodes may perform identification of one or more associated ADUs for the one or more incoming packets. In an example, based on the identification of the one or more associated ADUs for the one or more incoming packets, the one or more network nodes perform delivery of ADU-related information.

Figure 20:
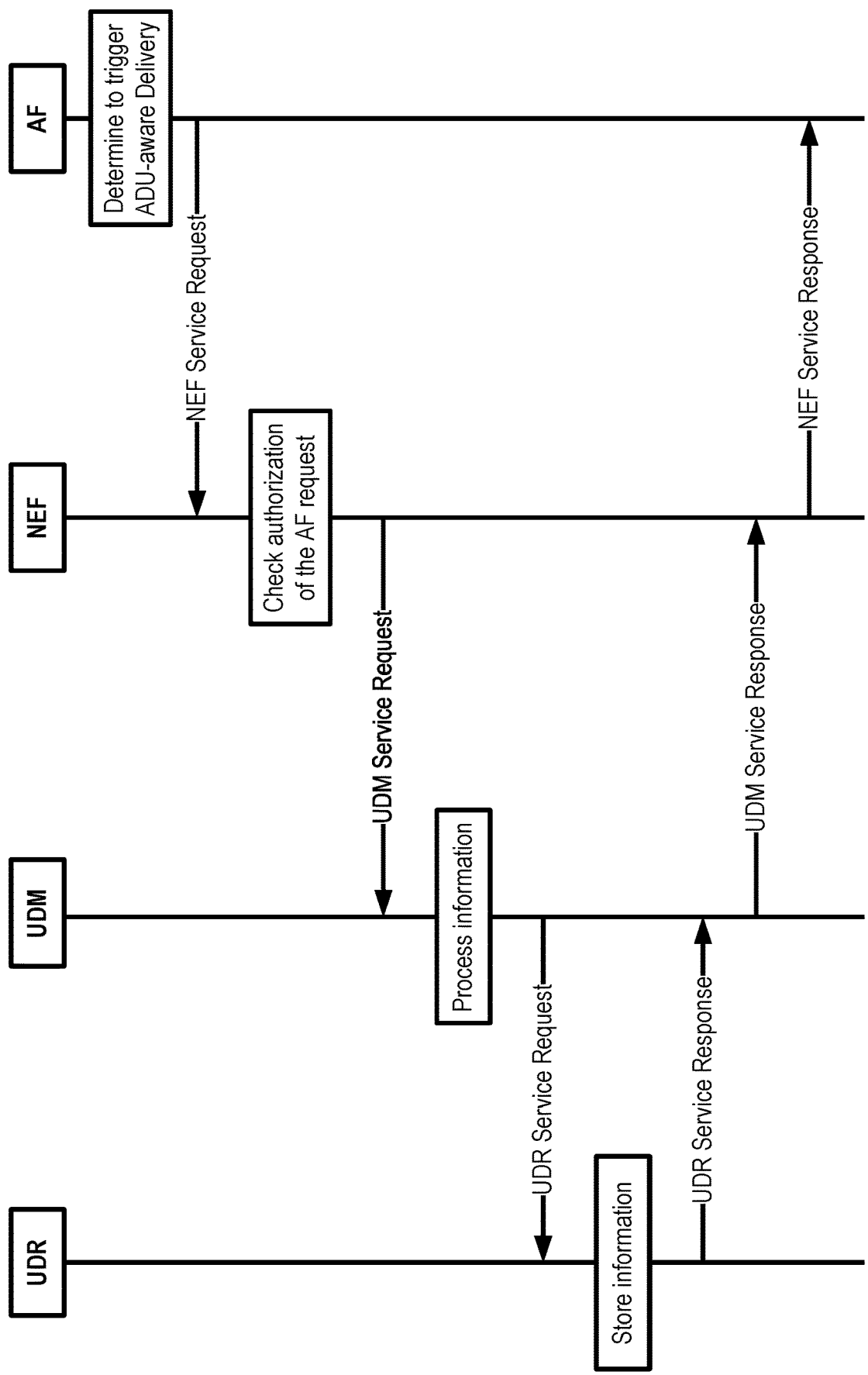
FIG. 20 is a diagram of an aspect of an example embodiment of the present disclosure.

FIG. 20 may depict one example embodiment of the present disclosure.

In an example, an AF may determine that ADU-aware delivery by a network is needed. For example, to reduce unnecessary delivery of packets, the AF may determine to request the network to activate ADU-aware delivery. Based on the determination, the AF may invoke a NEF service request from a first network node. For example, the first network node may be a NEF and/or the like. The invoked NEF service may be Nnef_ParameterProvision_Create and/or Nnef_ServiceParameter_Create and/or Nnef_ApplyPolicy_Create and/or the like. The NEF service request may comprise at least one of following:

Target UE or group of UE information: This may indicate a target UE or a group of UE to which the ADU-aware delivery applies. Individual UE can be identified by GPSI, or an IP address/Prefix or a MAC address. Groups of UEs can be identified by an External Group Identifiers. Instead of identifiers of target UE or a group of UEs, any UE using the service identified by the Service Description can be targeted.

ADU service request information: This may comprise information related to the ADU-aware delivery.

Expected UE Behaviour parameters: This may comprise information related to potential mobility of a UE.

Network Configuration parameters information: This may comprise information related to communication availability and/or reachability of a UE.

External Group Id and 5G VN group data: This may comprise information related to a group of UEs belonging to a group.

Service Description information: This may be information to identify a service. This may comprise DNN and/or S-NSSAI and/or an AF-Service-Identifier or an Application Identifier. This may indicate an AF that send the request for ADU-aware delivery and/or an application to which the ADU-aware delivery applies and/or a service data flow.

Service Parameters information: Service Parameters information are the service specific information which needs to be provisioned in a network and/or a UE for the service identified by the Service Description.

In an example, the ADU service request information may comprise at least one of following:

Request for activation of ADU-aware delivery: This may indicate that the AF requests the network to provide ADU-aware delivery service.

Capability of the AF for ADU-aware delivery: This may indicate the capability of the AF. For example, this may indicate which mechanisms are supported by the AF, to indicate ADU related information.

ADU identification assistance information: This may indicate how the AF can deliver information on the associated ADU information for a packet. This may indicate one or more fields of a ADU that may be used to determine ADU information associated with the packet.

Information of S-NSSAI: This may indicate a network slice where the ADU-aware delivery is applied.

Information of DNN: This may indicate a network where the ADU-aware delivery is applied.

In an example, the ADU identification assistance information (e.g., information of ADU identification) may comprise information regarding how a network node can identify an ADU-related information for a packet. In an example, the ADU identification assistance information may comprise information of how to determine whether one or more packets are associated with a same ADU or not. In an example, the ADU identification assistance information may comprise information of how to determine whether a packet and a preceding packet is associated with a same ADU or not. For example, the ADU identification assistance information may indicate one or more fields of a ADU and/or of a packet. For example, the ADU identification assistance information may indicate one or more values for one or more fields of an ADU and/or a packet. For example, the ADU identification assistance information may comprise information on:

how to detect and/or identity and/or classify one or more ADUs associated with one or more packets.

which one or more fields of one or more ADUs to use to detect and/or identity and/or classify one or more packets.

one or more values for one or more fields of one or more ADUs to use to detect and/or identity and/or classify one or more packets.

how to detect and/or identity associated ADU for a packet.

how to detect and/or identity an identity of associated ADU for a packet.

how to detect relationship among one or more packets.

how to determine which one or more packets are associated in regards to ADUs.

how to determine where one or more packets comprises one or more portions of a ADU.

how to determine where one or more packets comprises one or more portions of different ADUs.

one or more protocols/applications used in a packet.

one or more filter information to identify and/or classify one or more packets in a service data flow.

one or more packet detection rule to identify and/or classify one or more packets in a service data flow.

Figure 30:
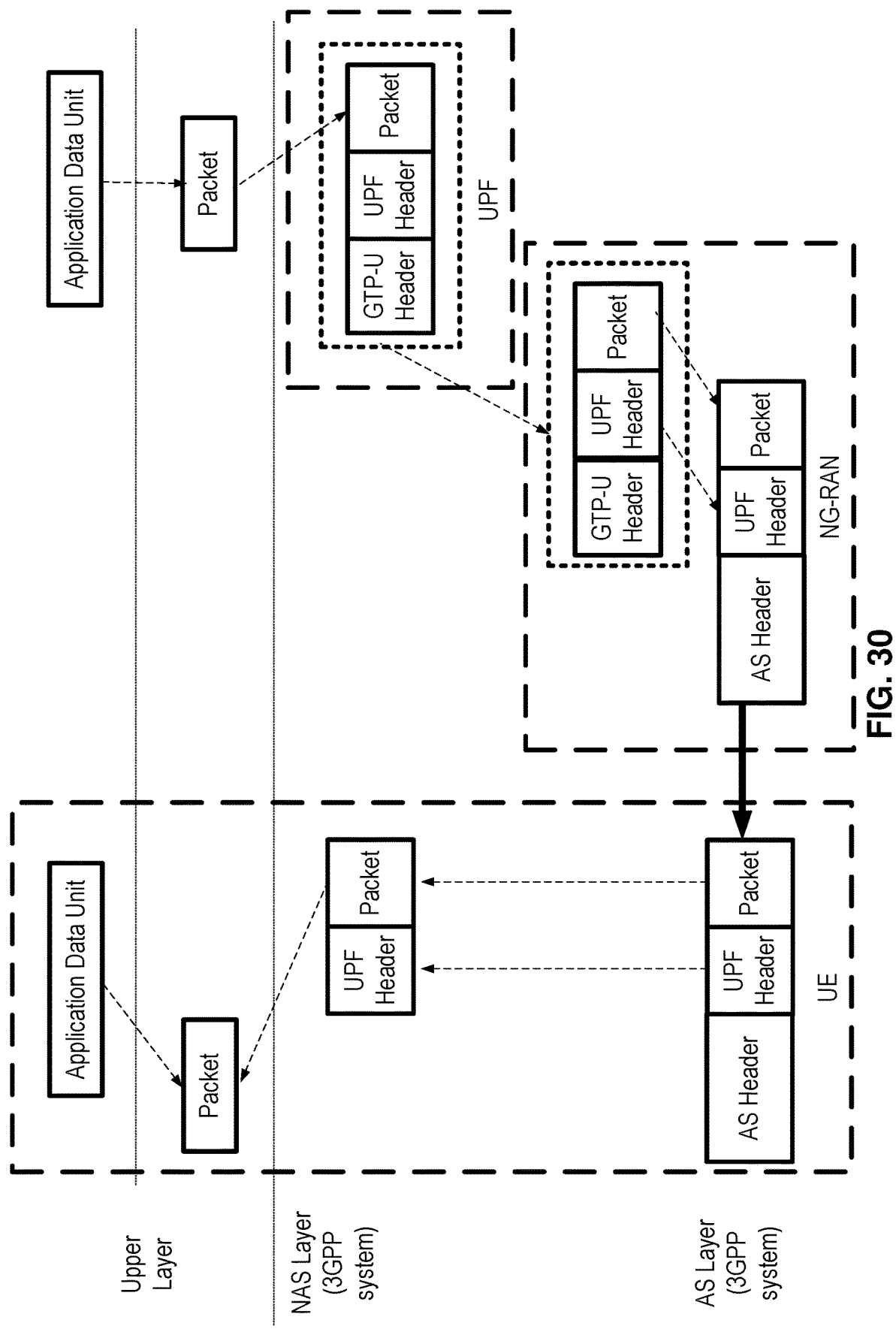
FIG. 30 is a diagram of an aspect of an example embodiment of the present disclosure.

In an example, one or more packets may be one or more IP packets. For example, the one or more packets may be of same service data flow and/or different service data flow. The one or more packets may comprise a first packet and a second packet a third packet. For example, ADU identification assistance information may indicate to use one or more fields in the one or more packets. For example, the ADU identification assistance information may indicate a DSCP field of an IP protocol. FIG. 30 may illustrate one example. The first packet may comprise a first ADU. The second packet may comprise the first ADU. The third packet may comprise a second ADU. For example, the DSCP field of the first packet may be set to value 1. For example, the DSCP field of the second packet may be set to value 1. For example, the DSCP field of the third packet may be set to value 2. By observing the difference in values of the DSCP fields of the first packet and the third packet, a network node may determine that the first packet and the third packet are related to different ADUs. By observing the difference in values of the DSCP fields of the first packet and the second packet, a network node may determine that the first packet and the second packet are related to a same ADU. ADU-related information may comprise the determined information.

Figure 31:
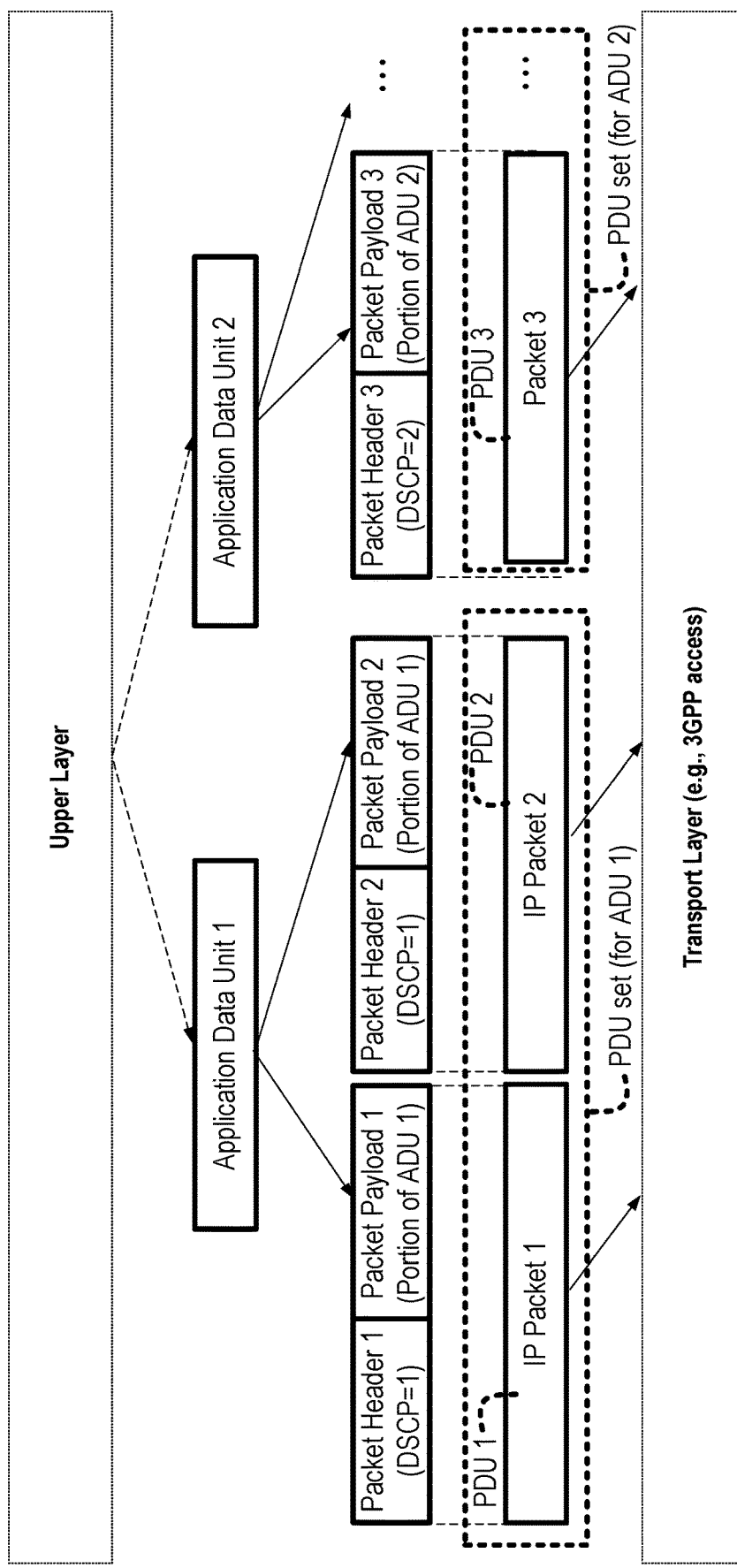
FIG. 31 is a diagram of an aspect of an example embodiment of the present disclosure.

In an example, one or more packets may be one or more IP packets. For example, the one or more packets may be of same service data flow and/or different service data flow. The one or more packets may comprise a first packet and a second packet a third packet. For example, the ADU identification assistance information may indicate to use one or more specific fields in the one or more ADUs. FIG. 31 may illustrate one example. The first packet may comprise a first ADU. The second packet may comprise the first ADU. The third packet may comprise a second ADU. For example, the ADU identification assistance information may indicate timestamp field of ADUs. For example, the ADU identification assistance information may indicate timestamp field of RTP protocols. For example, one or more ADUs may be one or more RTP protocol packets. The one or more RTP protocol packets may comprise one or more timestamp fields. For example, the timestamp field of the first packet may be set to value 1. For example, the timestamp field of the second packet may be set to value 1. For example, the timestamp field of the third packet may be set to value 2. By observing the match in values of the timestamp fields in the first packet and in the second packet, a network node may determine that the first packet and the second packet are related to same ADU. By observing the mismatch in values of the timestamp fields in the first packet and in the third packet, the network node may determine that the first packet and the third packet are related to different ADUs.

In an example, for the invoked NEF service request, the first network node (e.g., NEF and/or the like) may determine whether the invoked NEF service request from the AF is authorized or not. If the invoked NEF service request from the AF is authorized, the first network node (e.g., NEF and/or the like) may invoke a UDM service request from a second network node. For example, the second network node may be a UDM and/or the like. For example, the invoked UDM service may be Nudm_Parameter Provision_Create and/or Nudm_ServiceSpecificAuthorization_Create and/or the like.

In an example, the invoked UDM service request may comprise:

ADU service request information: This may comprise information related to the ADU-aware delivery.

Expected UE Behaviour parameters: This may comprise information related to potential mobility of a UE.

Network Configuration parameters: This may comprise information related to communication availability and/or reachability of a UE.

External Group Id and 5G VN group data: This may comprise information related to a group of UEs belonging to a group.

Service Description: This may be information to identify a service. This may comprise DNN and/or S-NSSAI and/or an AF-Service-Identifier or an Application Identifier. This may indicate an AF that send the request for ADU-aware delivery and/or an application to which the ADU-aware delivery applies and/or a service data flow to which the ADU-aware delivery applies.

Service Parameters: Service Parameters are the service specific information which needs to be provisioned in a network and/or a UE for the service identified by the Service Description.

In an example, for the invoked UDM service request, the second network node may process information conveyed by the UDM service request. Based on the processing result, the second network node may invoke a UDR service request from a third network node. For example, the UDM may process the received ADU service request information into Packet Flow Descriptions and/or AF traffic influence request information and/or session management subscription data and/or the like. For example, the third network node may be a UDR and/or the like. For example, the invoked UDR service may be Nudr_DM_Create and/or the like.

In an example, the invoked UDR service request may comprise at least one of following:

Packet Flow Descriptions (PFDs): This may indicate information of description of a service flow and/or a packet flow.

AF traffic influence request information: This may include information of traffic steering in relation to a service data Service specific information.

Access and Mobility Subscription data: This may include information related to the handling of access and mobility of a UE.

UE context in SMF data: This may include information related to the UE context in a SMF serving the UE.

Session Management Subscription data: This may include information related to packet data session handling.

Group Data: This may include information of a group.

Service Description.

ADU service request information: This may comprise information related to the ADU-aware delivery.

In an example, for the invoked UDR service request, the third network node may store the information delivered with the invoked UDR service request. If the third network node stores the information, the third network node may respond to the second network node with a UDR service response.

In an example, if the second network node receives a UDR service response from the third network node, the second network node may send response to the first network node with a UDM service response.

In an example, if the first network node receives a UDM service response from the second network node, the first network node may send response to the AF with a NEF service response. The NEF service response may indicate that the request from the AF is successfully processed.

Figure 21:
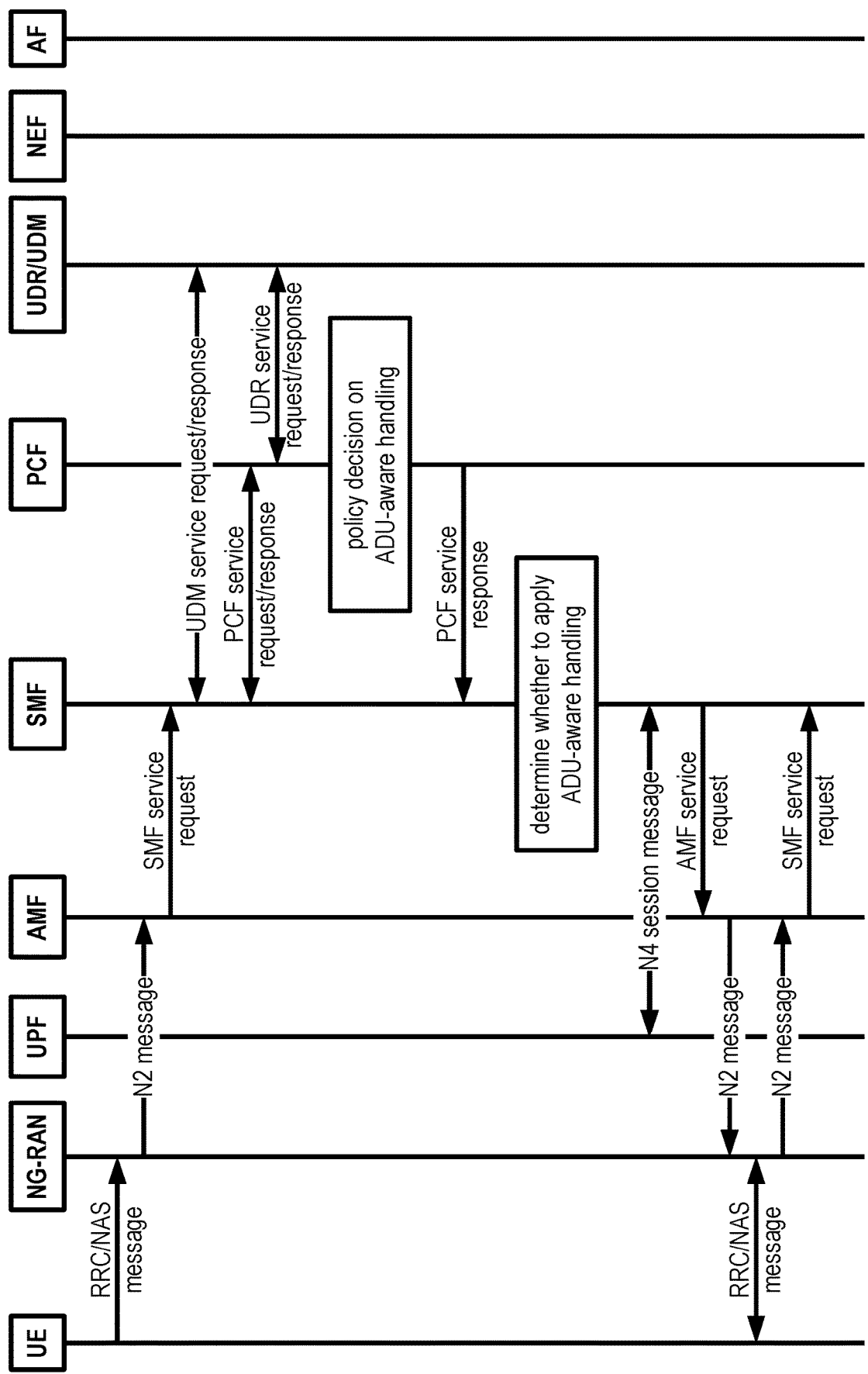
FIG. 21 is a diagram of an aspect of an example embodiment of the present disclosure.

FIG. 21 may depict an example embodiment of the present disclosure.

In an example, to establish a PDU session to exchange data for an application with an application function, the UE may initiate a procedure to establish a PDU session. For example, the procedure may be PDU session establishment procedure. The NAS entity of the UE may compose a first NAS message (e.g., PDU session establishment request message) and may deliver the first NAS message to a RRC entity of the UE. For example, the first NAS message may comprise information associated with ADU-aware delivery. For example, to indicate whether the UE support ADU-aware delivery or not, the first NAS message may comprise ADU-aware delivery UE Capability information. For example, to request a PDU session supporting ADU-aware delivery, the first NAS message may comprise ADU service request information (e.g., ADU-aware delivery request information). To deliver the first NAS message to a network, the RRC entity may establish a RRC connection with a NG-RAN. Over the established RRC connection, the UE may send to the NG-RAN, a RRC message comprising the first NAS message. The NG-RAN may send an N2 message (e.g., Initial UE Message) to a network node (e.g., an AMF). The N2 message may comprise the first NAS message. Based on that the first NAS message is related to a PDU session, the network node (e.g., AMF) may invoke a SMF service request (e.g., Nsmf_PDUSession_CreateSMContext request) from a SMF.

In an example, for the invoked SMF service request, the SMF may invoke a UDM service request (e.g., Nudm_SDM_Get request). By using the UDM service request, the SMF may retrieves information associated with the ADU-aware delivery for the UE. If the UDM does not have information associated with the ADU-aware delivery for the UE, the UDM may invoke a UDR service request (e.g., Nudr_DM_Query request). For the invoked UDR service request, the UDR may respond to the UDM with a UDR service response (e.g., Nudr_DM_Query response). The UDM may respond to the SMF by a UDM service response (e.g., Nudm_SDM_Get response) comprising information associated with the ADU-aware delivery.

In an example, for the invoked UDM service request, the UDM may determine whether the information related to ADU-aware delivery needs to be provided. For example, the UDM service request may comprise a S-NSSAI. For the service request, the UDM may determine whether the S-NSSAI is configured to use ADU-aware delivery. In another example, the UDM service request may include an identity (e.g., SUPI, SUCI, GPSI, IP address, etc.) of the UE. For the service request, the UDM may determine whether the UE or a group to which the UE belongs is configured to use ADU-aware delivery. In another example, the UDM service request may include a DNN. For the service request, the UDM may determine whether the DNN is configured to use ADU-aware delivery. If the UDM determine that the ADU-aware delivery needs to be used, the UDM may send a UDM service response comprising the information associated with the ADU aware delivery.

In an example, for the PDU session establishment request, the SMF may request a policy decision from a PCF. For example, the SMF may invoke a PCF service request (e.g., Npcf_SMPolicyControl_Create request). For example, the invoked PCF service request may comprise information associated with the ADU-aware delivery. For the invoked the PCF service request, the PCF may decide ADU-aware delivery policy to be applied for the PDU session. If the PCF needs to retrieve a policy-related subscription data from a UDR, the PCF may trigger a UDR service request (e.g., Nudr_DM_Query request). For the invoked UDR service request, the UDR may respond to the UDM with a UDR service response (e.g., Nudr_DM_Query response). The response from the UDR may comprise information associated with the ADU-aware delivery. Based on the information associated with the ADU-aware delivery from the SMF and/or the information associated with the ADU-aware delivery from the UDR, the PCF may determine ADU-aware delivery policy for the PDU session. The PCF may response to the SMF with a PCF service response (e.g., Npcf_SMPolicyControl_Create response). The PCF service response may comprise ADU-aware delivery policy.

In an example, for the ADU-aware delivery, the SMF may determine ADU-aware delivery associated configuration parameter for the PDU session, based on the information associated with the ADU-aware delivery from the UDM. In an example, for the ADU-aware delivery, the PCF may determine ADU-aware delivery policy for the PDU session, based on the information delivered from the UDR and/or the SMF and/or the NEF. In an example, for the ADU-aware delivery, the SMF may request the PCF to provide ADU-aware delivery policy for the PDU session. Based on the ADU-aware delivery policy, the SMF may determine ADU-aware delivery associated configuration parameter for the PDU session.

For example, ADU-aware delivery policy may comprise:
Information of ADU authorization. This may comprise information on whether to allow ADU-aware delivery for the PDU session and/or information of whether to allow ADU-aware delivery for one or more service data flows and/or information of whether to allow ADU-aware delivery for one or more applications.
Information of ADU identification.
ADU identification assistance information.
information associated with the ADU-aware delivery.

For example, ADU-aware delivery associated configuration parameter may comprise:
Information of ADU authorization.
Information of ADU identification.
ADU identification assistance information.
Information of whether to support ADU-aware delivery for the PDU session or not.
Information of whether the request for ADU-aware delivery for the PDU session is accepted or not
Parameters that the UE uses for the configuration of the PDU session for ADU-aware delivery Parameters that the UPF uses for the configuration of the PDU session for ADU-aware delivery
Parameters that the NG-RAN uses for the configuration of the PDU session for ADU-aware delivery
information associated with the ADU-aware delivery For example, information associated with the ADU-aware delivery may comprise:
ADU service request information
Target UE or group of UE information
Network Configuration parameter information
Service Description information
ADU information
Configuration for the ADU-aware delivery
ADU service request information
ADU identification assistance information
ADU-related information
ADU-aware delivery request information.

For example, the PCF service request (e.g., Npcf_SM-PolicyControl_Create request) may comprise at least one of following:
SUPI: This may indicate an identity of a UE.
PDU session ID: This may indicate an identity of a PDU session.
DNN: This may identify a network where the PDU session is connected.
S-NSSAI: This may identify a network slice where the PDU session is established over.
Address: This may comprise a IPv4 address and/or a IPv6 address.
ADU-aware delivery UE Capability: This may comprise information of whether a UE can support ADU-aware delivery and/or a list of supported methods for ADU-aware delivery.
QoS information: This may indicate a subscribed QoS information for the UE and/or a requested QoS information.
Information associated with the ADU-aware delivery.
Subscription data: This may comprise at least part of subscription data delivered from UDM.

For example, the PCF service response (e.g., Npcf_SM-PolicyControl_Create response) may comprise at least one of following:
SM Policy Association ID: This may indicate the identity of the policy information.
ADU-aware delivery policy information: This may comprise policies determined by the PCF for ADU-aware delivery.
Information associated with the ADU-aware delivery.

For example, the UDM service request (e.g., Nudm_SDM_Get request) may comprise at least one of:
NF ID: This may indicate an identity of a network function (e.g., a network node) which sends the UDM service request.
Subscription Data Type: This may indicate a type of requested subscription data.
Key: This may indicate a target for the requested subscription data type.

For example, the UDM service response (e.g., Nudm_SDM_Get response) may comprise at least one of: —Subscription Data: This may comprise a subscription data requested by the network function. This may comprise information based on ADU service request information. —Information associated with the ADU-aware delivery.

For example, the SMF service request may comprise:
SUPI: This may indicate an identity of the UE associated with the SMF service request.
DNN: This may indicate an identity of a network associated with the SMF service request.
PDU Session ID: This may indicate an identity of the PDU session.
NF ID: This may indicate an identity of a network function that triggers the SMF service request.
N1 SM container: This may comprise a NAS message sent by the UE. For example, this may comprise a PDU Session Establishment Request.
User location information: This may indicate current location of the UE.
Access Type: This may indicate which access the UE uses.
GPSI: This may indicate an identity of the UE.

In an example, for the ADU-aware delivery, based on the determined ADU-aware delivery associated configuration parameter, the SMF may send N4 session message (e.g., N4 Session Establishment Request, Packet Forwarding Control Protocol message) to a UPF. The N4 session message.
Packet detection rule: This may indicate one or more rules on how to detect and/or identity and/or classify one or more service data flows. This may further comprise one or more rules on how to determine one or more ADU-related information for one or more packets of a service data flow. For example, this may comprise ADU identification assistance information.
Packet enforcement rule: This may indicate one or more QoS parameters for one or more service data flows.
Packet reporting rules: This may indicate one or more criteria of when the UPF reports an event to SMF.
ADU-aware delivery associated configuration parameter.

In an example, the packet detection rule may provide information to identity service data flow. For example, the packet detection rule may indicate that a first service data flow corresponds to one or more packets that a source IP address is 1.1.1.1 and a destination IP address is 2.2.2.2. For example, the packet detection rule may indicate that a second data service flow corresponds to one or more packets that a source IP address is 3.3.3.3 and a destination IP address is 4.4.4.4. The UPF may receive one or more IP packets. The one or more IP packets may comprise a first IP packet, a second IP packet and a third IP packet. Based on the packet detection rule, the UPF may identity one or more service data flows for the received IP packets. If a source IP address of the first IP packet indicates 1.1.1.1 and a destination IP address of the first IP packet indicates 2.2.2.2, the UPF may determine that the first IP packet corresponds to the first service data flow. If a source IP address of the second IP packet indicates 3.3.3.3 and a destination IP address of the second IP packet indicates 4.4.4.4, the UPF may determine that the second IP packet corresponds to the second service data flow. If a source IP address of the third IP packet indicates 1.1.1.1 and a destination IP address of the third IP packet indicates 2.2.2.2, the UPF may determine that the third IP packet corresponds to the first service data flow.

In an example, the ADU-aware delivery associated configuration parameter may provide information of how perform ADU-aware delivery. In an example, the ADU-aware delivery associated configuration parameter may provide information on how to identity and/or classify and/or process one or more packets of a service data flow. In an example, the first IP packet and the third IP packet may be of the first service data flow. Based on ADU identification assistance information, the UPF may determine ADU-related information for the IP packets. For example, the ADU identification assistance information may indicate that one or more fields in a packet is associated with an identity of a ADU associated with the packet. For example, the ADU identification assistance information may indicate one or more fields in the packet. The one or more fields in the packet may be associated with an identity of a ADU associated with the packet. By checking whether a value of the one or more fields for one or more packets is same or not, the UPF may determine whether the one or more packets are associated with a same ADU or not. For example, the ADU identification assistance information may indicate that a DSCP field of an IP packet is associated with an identity of a ADU associated with the IP packet. If a DSCP field of the first IP packet indicates '0' and a DSCP field of the third IP packet indicate '1', the UPF may determine that the first IP packet and the third IP packet may associated with different ADUs. If a DSCP field of the first IP packet indicates '0' and a DSCP field of the third IP packet may indicate '0', the UPF may determine that the first IP packet and the third IP packet may associated with same ADU. For example, if the DSCP field of the first IP packet indicates '0', the UPF may determine that the identity of the ADU associated with the first IP packet is '0'. For example, if the DSCP field of the third IP packet indicates '1', the UPF may determine that the identity of the ADU associated with the third IP packet is '1'. For example, the UPF may use the indicated one or more fields of the ADU identification assistance information, for determining ADU-related information for a received packet. For example, the ADU-related information may comprise information determined by the UPF for the packet.

In an example, the UPF may determine whether one or more packets are of a same service data flow or not, based on packet detection rule. For one or more packets of a service data flow, based on the ADU identification assistance information, the UPF may determine ADU information associated with the one or more packets. For example, the ADU information associated with one or more packets may indicate an identity of an ADU associated with one or more received packets. For example, the ADU information associated with one or more packets may indicate whether one or more packets are associated with a same ADU and/or different ADUs.

In an example, similar operations may be performed by a UE and/or other NF. In other examples, based on the ADU identification assistance information, the UE and/or the other NF may determine the one or more ADU information associated with one or more packets.

In an example, for the N4 session message from the SMF, the UPF may respond to the SMF with another N4 session message (e.g., N4 Session Establishment Response).

In an example, after setting up UPF for ADU-aware delivery, the SMF may invoke an AMF service request (e.g., Namf_Communication_N1N2MessageTransfer) and/or a SMF service response (e.g., Nsmf_PDUSession_CreateSMcontext response). The AMF service request and/or the SMF service response may comprise:
 PDU Session ID: This may indicate an identifier of the PDU session.
 N2 SM Information: This may comprise information for setting up N3 interface between NG-RAN and UPF. For example, the N2 SM Information comprise ADU-aware delivery associated configuration parameter.
 N1 SM Container: This may comprise a PDU Session Establishment Accept message.
 ADU-aware delivery associated configuration parameter In an example, if the AMF receives the AMF service request and/or the SMF service response, the AMF may send a N2 message (e.g., N2 PDU Session Request) to the NG-RAN. The N2 message may comprise:
 N2 SM Information. For example, the N2 SM Information comprise ADU-aware delivery associated configuration parameter.
 NAS message: This may comprise a N1 SM Container.
 ADU-aware delivery associated configuration parameter.

In an example, if the N2 message comprises a NAS message, the NG-RAN may send the NAS message to the UE. If the NG-RAN receives the N2 message, the NG-RAN may configure one or more radio bearers for the UE. For the configuration of the one or more radio bearers for the UE, the NG-RAN may use the ADU-aware delivery associated configuration parameter. For example, the NG-RAN may configure PDCP entity and/or SDAP entity and/or RLC entity and/or MAC entity to identity and/or process ADU information associated with the packets. For example, the NG-RAN may configure PDCP entity and/or SDAP entity and/or RLC entity and/or MAC entity to include ADU information associated with one or more protocol data units. For example, the NG-RAN may configure PDCP entity and/or SDAP entity and/or RLC entity and/or MAC entity to identity and/or process ADU information associated with the protocol data units, based on ADU the identification assistance information.

In an example, after configuring one or more radio bearers and/or one or more N3 bearers for the UE, the NG-RAN may send a N2 message (e.g., N2 PDU Session Response) to the AMF. In an example, after receiving the N2 message (e.g., N2 PDU Session Response) from the NG-RAN, the AMF may respond to SMF with AMF service response and/or the SMF service request.

Figure 22:
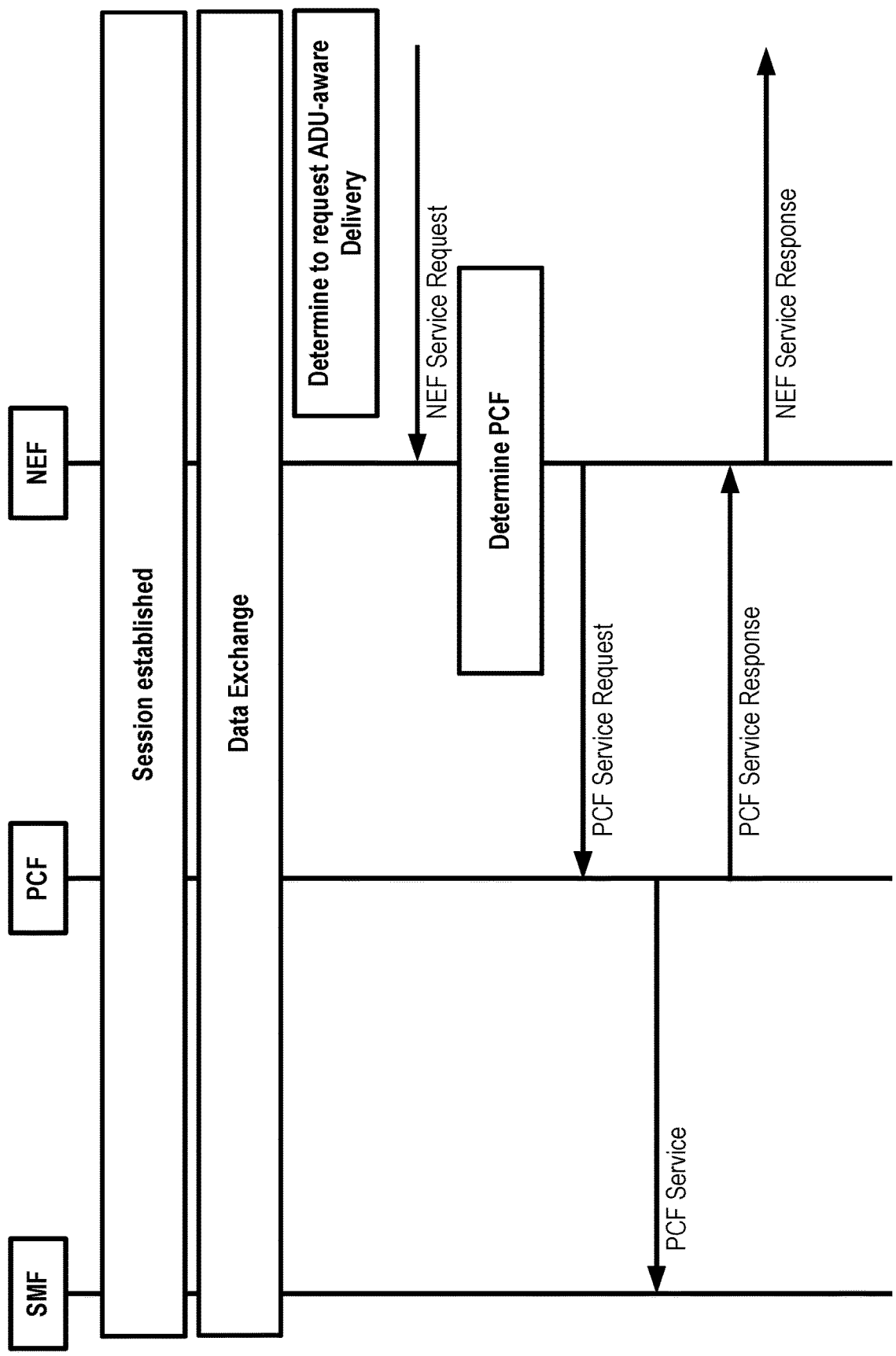
FIG. 22 is a diagram of an aspect of an example embodiment of the present disclosure.

FIG. 22 may depict one example embodiment of the present disclosure.

In an example, the UE may establish a PDU session for a data delivery. Based on the established PDU session, the UE may send a data to an AF. Based on the data received from the UE, the AF may determine that ADU-aware delivery is needed for the UE. For example, to reduce waste of network resources and/or to enhance quality of experience for an application, the AF may determine that ADU-aware delivery is needed for the UE. Based on the determination, the AF may initiate a procedure to a first network node (e.g., NEF) to request ADU-aware delivery. For example, the AF may invoke a NEF service request (e.g., Nnef_AFsessionWithQoS_Create request). The NEF service request may comprise:
 UE address: This may indicate identification information for a UE. For example, this may indicate an IP address of the UE.
 AF Identifier: This may indicate an identity of the AF.
 Flow description: This may indicate a service data flow.
 External Application Identifier: This may indicate an identity of an application
 QoS reference: This may indicate QoS parameter requested to support the application.
 DNN: This may indicate a network associated with the application.
 S-NSSAI: This may indicate a network slice associated with the application.
 ADU service request information.

In an example, for the received NEF service request, the NEF may determine whether the AF is authorized for the request. If the AF is authorized for the request, the NEF may determine a PCF associated with the NEF service request. For example, the NEF may select the PCF, based on the DNN and/or S-NSSAI and/or UE identity and/or IP address. The NEF may invoke a PCF service request (e.g., Npcf_PolicyAuthorization_Create request). The PCF service request may comprise: —UE address; —AF Identifier; —Flow description; —QoS reference; —ADU service request information.

In an example, based on the UE identity and/or IP address information of the PCF service request, the PCF may identify the UE associated with the PCF service request. For the identified UE, the PCF may determine QoS parameters and/or QoS policy for the UE, based on the information conveyed by the PCF service request. For example, based on the information conveyed by the PCF service request, the PCF may determine ADU-aware delivery policy information and/or information associated with the ADU-aware delivery. Based on the determined ADU-aware delivery policy information and/or information associated with the ADU-aware delivery, the PCF may invoke a PCF service (e.g., Npcf_SMPolicyControl_UpdateNotify) toward the SMF associated with the UE. The PCF service may comprise ADU-aware delivery policy information and/or information associated with the ADU-aware delivery. Based on the information delivered by the PCF service (e.g., Npcf_SMPolicyControl_UpdateNotify), the SMF may perform procedure to update configuration of a UPF and/or a NG-RAN and/or a UE. For example, the SMF may perform procedure as shown in the example of FIG. 20 and/or FIG. 21. In an example, in response to the PCF service request (e.g., Npcf_PolicyAuthorization_Create request), the PCF may send response to the NEF. Based on the response from the PCF, the NEF may send response to AF. For example, the NEF may trigger Nnef_AFsessionWithQoS_Create response.

Figure 23:
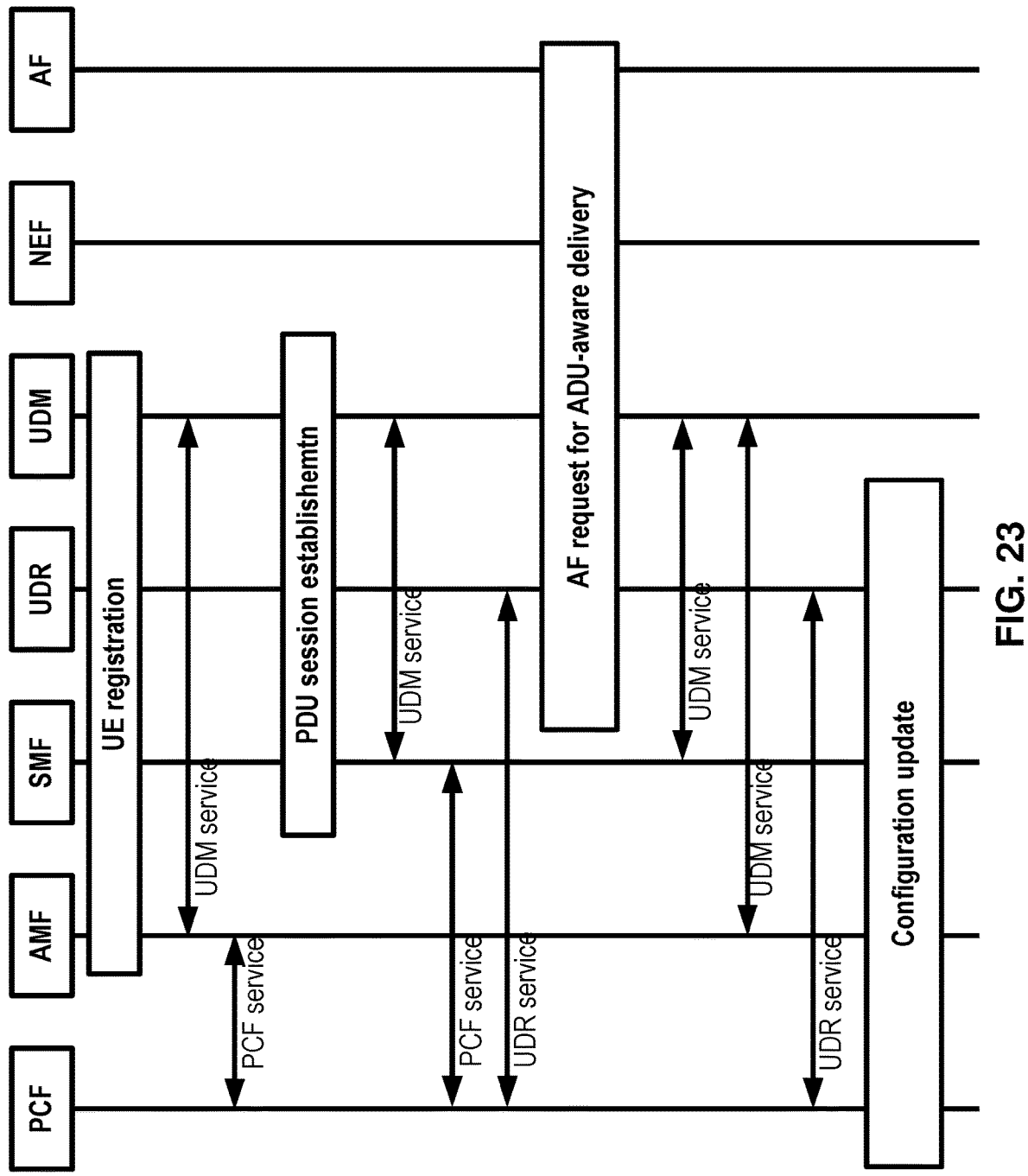
FIG. 23 is a diagram of an aspect of an example embodiment of the present disclosure.

FIG. 23 may depict an example embodiment of the present disclosure. In an example, UE may perform a registration procedure with an AMF. After the registration, an AF associated with an application running on the UE may request ADU-aware delivery from a network. To get update on whether ADU-aware delivery for the UE is required or not, the AMF may invoke a UDM service (e.g., Nudm_SDM_Subscribe). After the registration, the AF associated with the application running on the UE may request ADU-aware delivery from the network. The request from the AF may trigger a PCF to update a policy for the UE. To receive the policy updated based on the request of the AF, the AMF may invoke a PCF service (e.g., Npcf_UEPolicyControl_Create).

In an example, a UE may perform a PDU session establishment procedure with a SMF, to establish a PDU session. After the establishment of the PDU session, an AF associated with an application running on the PDU session may request ADU-aware delivery from a network. To get update on whether ADU-aware delivery for the PDU session is required or not, the SMF may invoke a UDM service (e.g., Nudm_SDM_Subscribe). After the establishment of the PDU session, the AF associated with the application running on the UE may request ADU-aware delivery from a network. The request from the AF may trigger a PCF to update a policy for the PDU session. To receive the updated policy based on the request of the AF, the SMF may invoke a PCF service (e.g., Npcf_SMPolicyControl_Create).

In an example, the PCF may need to provide to the AMF, an updated policy for the UE. The PCF may need to provide to the SMF, an updated policy for the PDU session. To determine whether to determine to update the policy or not, the PCF may invoke a UDR service (e.g., Nudr_DM_Subscribe, Nudr_DM_Notify).

In an example, the AF may determine to request a network to provide ADU-aware delivery service for the UE and/or for the PDU session and/or for a group of UEs and/or for an application and/or for a service data flow. Based on the determination, the AF may invoke a NEF service request (e.g., Nnef_AFsessionWithQoS_Create request and/or Nnef_ServiceParameter_Create and/or Nnef_ApplyPolicy_Create and/or the like). The NEF service request may comprise ADU service request information. Based on the NEF service request, the NEF may trigger a UDM service (e.g., Nudm_ParameterProvision_Create and/or Nudm_ServiceSpecificAuthorization_Create and/or the like) and/or a UDR service (e.g., Nudr_DM_Create and/or the like). The UDM service request and/or the UDR service request may comprise updated information for ADU-aware delivery. For example, the updated information for ADU-aware delivery may comprise ADU service request information. If the information associated with ADU-aware delivery is updated, the UDM and/or the UDR may determine whether there is one or more network nodes who subscribe to information update notification. For example, the one or more network nodes may be a SMF and/or a PCF and/or an AMF. The SMF may be the SMF who invoked the UDM service (e.g., Nudm_SDM_Subscribe). The AMF may be the AMF who invoked the UDM service (e.g., Nudm_SDM_Subscribe). The PCF may be the PCF who invoked the UDR service (e.g., Nudr_DM_Subscribe). Based on the determination, the UDR and/or the UDM may invoke a UDR service (Nudr_DM_Notify) and/or a UDM service (e.g., Nudm_SDM_Notification). The invoked UDR service and/or the invoked UDM service may comprise information associated with the ADU-aware delivery. Based on the invoked UDR service and/or the invoked UDM service, the AMF and/or the SMF and/or the PCF may update configuration parameter and/or may update configuration for a network node (e.g., UE and/or the UPF and/or the NG-RAN) and/or may update one or more policies.

Figure 24:
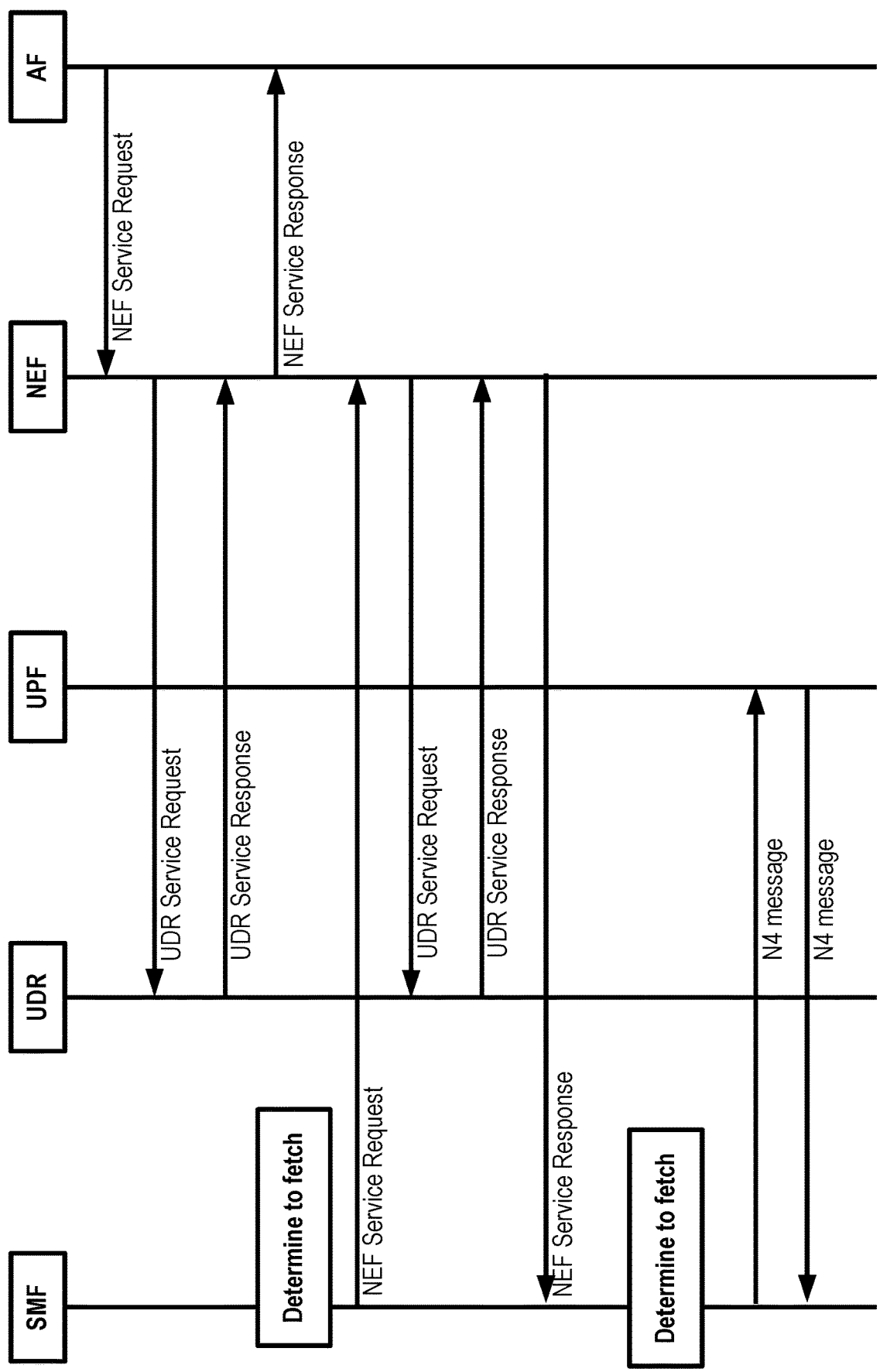
FIG. 24 is a diagram of an aspect of an example embodiment of the present disclosure.

FIG. 24 may depict an example embodiment of the present disclosure.

In an example, an AF may provision a network with information describing a service data flow. To assist the network in supporting ADU-aware delivery, the AF may further provide ADU identification assistance information. To provide the ADU identification assistance information, the AF may invoke a NEF service request (e.g., Nnef_PFDManagement_Create request). The NEF service request may comprise:

AF Identifier: This may indicate the identifier of an AF.
One or more sets of PFDs: This may indicate one or more packet filter sets to identify and/or detect and/or classify one or more service data flows. This may be used to identify and/or detect and/or classify one or more packets for one or more service data flows. This may be used to identify and/or detect and/or classify one or more packets for one or more service applications. This may be used to identify and/or detect and/or classify one or more packets associated with an AF. This may be used to identify and/or detect and/or classify one or more packets for a service data flows and/or an application and/or an AF.
ADU identification assistance information.

In an example, after the NEF receives the NEF service request, the NEF check whether the AF is authorized to perform the NEF service request. If the AF is authorized, the NEF may invoke a UDR service request (e.g., Nudr_DM_Create request). The UDR service request may comprise application identifier and/or one or more sets of PFDs and/or ADU identification assistance information. For example, the one or more sets of PFDs may comprise ADU identification assistance information. For the received UDR service request, the UDR may store the received information and the UDR may respond to the NEF with a UDR service response. After receiving the UDR service response from the UDR, the NEF may respond to the AF with NEF service response.

In an example, a SMF may invoke a NEF service (e.g., Nnef_PFDManagement_Fetch). For example, the SMF may receive an application identifier during PDU session establishment procedure and/or during PDU session modification procedure. For example, the SMF may receive the application identifier from a PCF if the PCF sends a policy information to the SMF. For example, the SMF may receive the application identifier from a UDM if the SMF receives subscription information from the UDM. If the SMF does not have an associated information for the application identifier, the SMF may invoke a NEF service request (e.g., Nnef_PFDManagement_Fetch request). For example, the NEF service request may comprise the application identifier. For the invoked NEF service, if one or more PFDs for the application identifier is not available, the NEF may invoke a UDR service request (e.g., Nudr_DM_Query request) from UDR. For the invoked UDR service request, the UDR may respond with a UDR service response (e.g., Nudr_DM_Query response). The UDR service response may comprise the application identifier and/or one or more PFDs. For the invoked NEF service request, the NEF may respond to the SMF with a NEF service response (e.g., Nnef_PFDManagement_Fetch response). The NEF service response may comprise one or more PFDs. In an example, if information associated with the ADU-aware delivery is available, the one or more PFDs may further comprise information associated with the ADU-aware delivery. In an example, based on the received one or more PFDs, if the one or more PFDs comprise information associated with the ADU-aware delivery, the SMF may perform procedure to update configuration of a UPF and/or a NG-RAN and/or a UE. For example, the SMF may perform procedure as shown in the example of FIG. 20 and/or FIG. 21, to configure the UPF and/or the NG-RAN and/or the UE to support ADU-aware delivery. The SMF may send a N4 message to the UPF. The N4 message may comprise information associated with the ADU-aware delivery. Based on the information delivered from the SMF, the UPF may determine associated ADU information for a packet.

Figure 25:
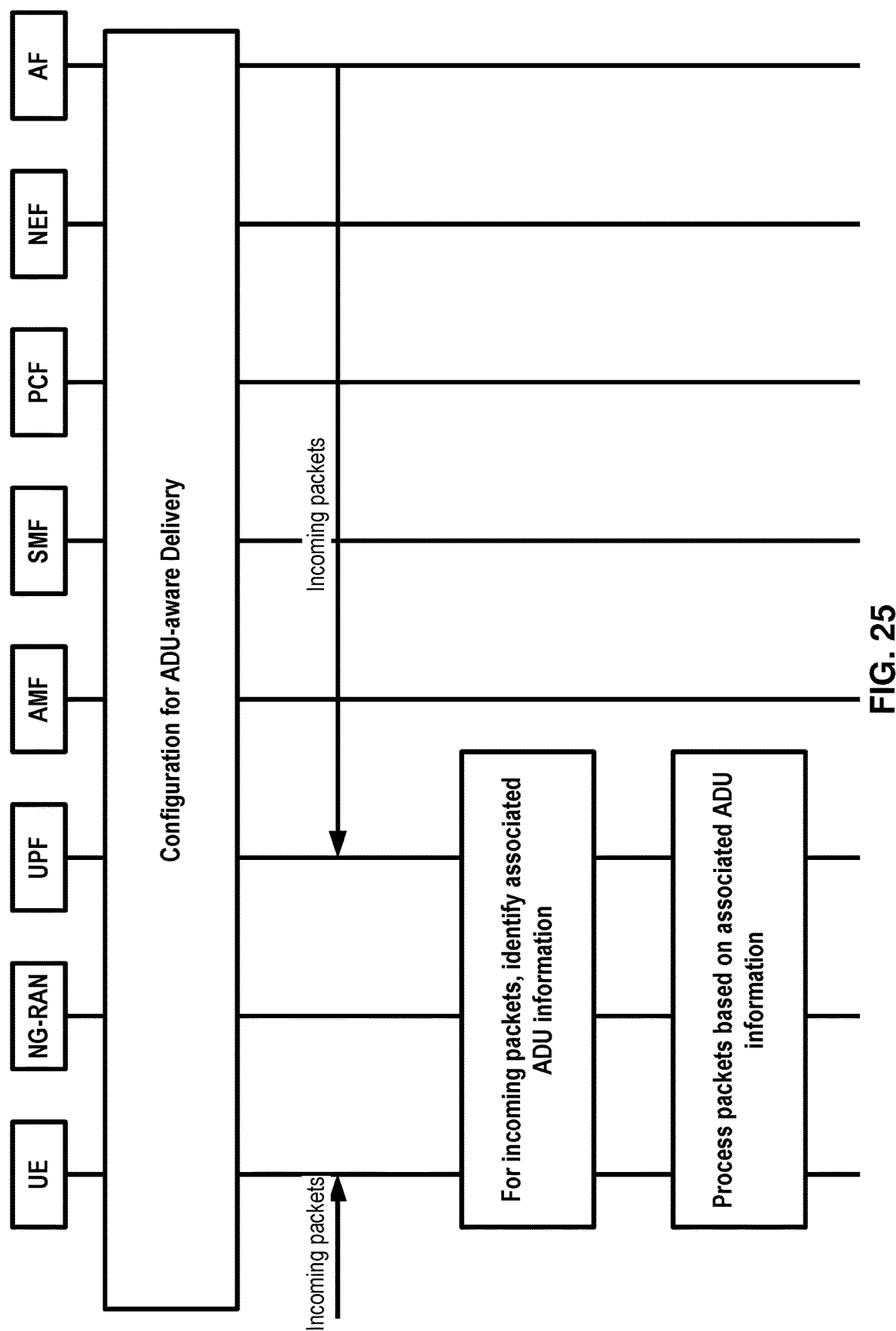
FIG. 25 is a diagram of an aspect of an example embodiment of the present disclosure.

FIG. 25 may depict an example embodiment of the present disclosure.

In an example, a network may configure one or more network nodes for ADU-aware delivery. The examples of FIG. 19, FIG. 20, FIG. 21, FIG. 22, FIG. 23, FIG. 24 may be used, to deliver ADU-aware delivery associated configuration parameter to one or more network nodes.

In an example, one or more incoming packets sent by an AF may arrive at a UPF. For example, one or more packets may be generated by an application of a UE. The UPF and a NG-RAN and/or the UE may detect and/or identity and/or classify the one or more packets, based on the ADU-aware delivery associated configuration parameter. The UPF and the NG-RAN and/or the UE may process the one or more packets, based on the ADU-aware delivery associated configuration parameter. The UPF and the NG-RAN and/or the UE may send information associated with ADU for one or more packets.

Figure 26:
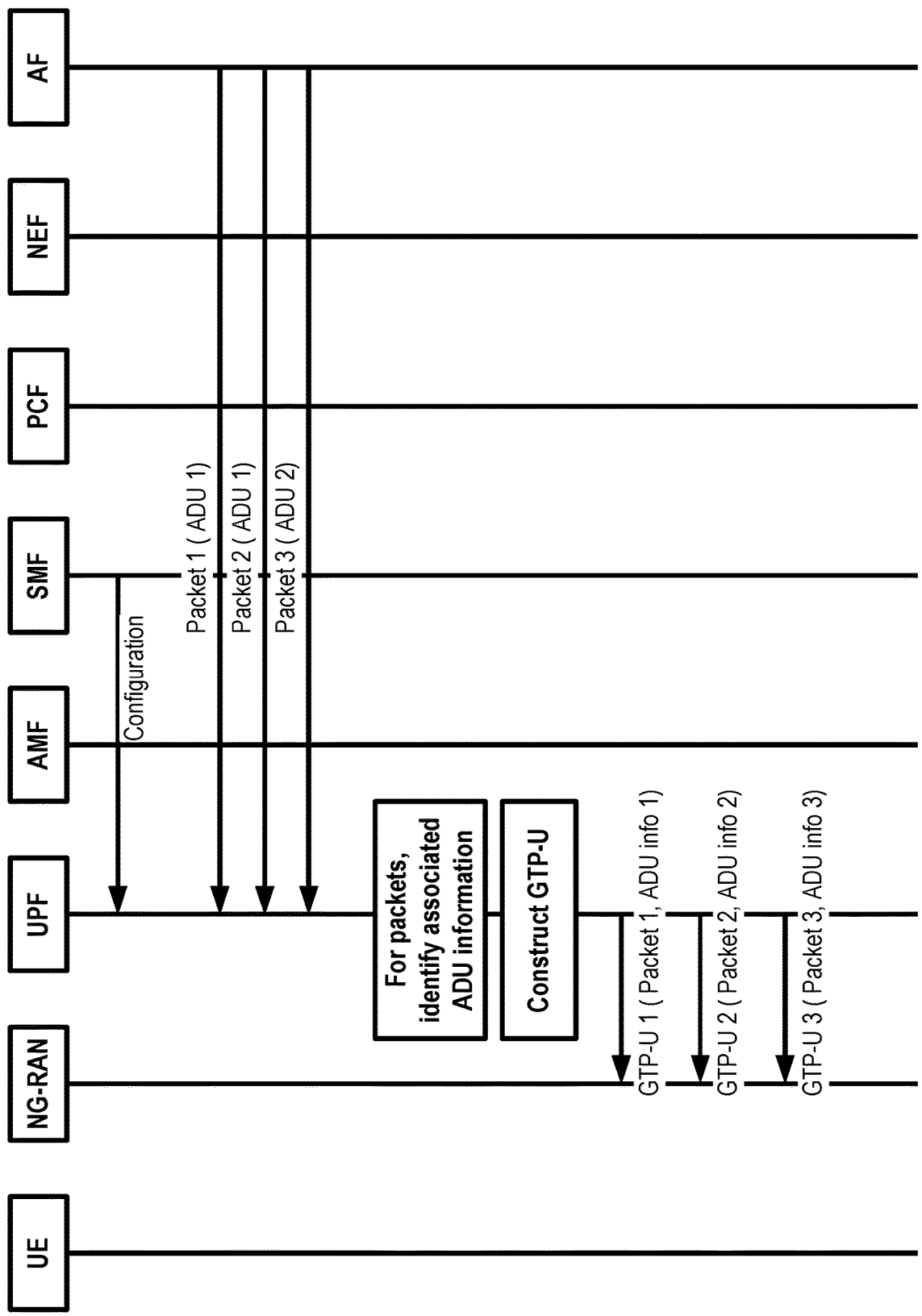
FIG. 26 is a diagram of an aspect of an example embodiment of the present disclosure.

FIG. 26 may depict an example embodiment of the present disclosure.

In an example, for one or more packets sent by an AF, a UPF may detect and/or identity and/or classify the packets, based on ADU-aware delivery associated configuration parameter. For example, the UPF may receive one or more packets comprising a first packet and/or a second packet and/or a third packet. Based on ADU-aware delivery associated configuration parameter, the UPF may determine that the first packet and the second packet are associated with a first ADU. Based on ADU-aware delivery associated configuration parameter, the UPF may determine that the third packet are associated with a second ADU. The UPF may determine that the first packet and the second packet are associated. The UPF may determine that the first packet and the third packet are not associated. The UPF may determine that the second packet and the third packet are not associated. The UPF may determine that the first packet and the third packet are not associated with a same ADU. The UPF may determine that the first packet and the second packet are associated with a same ADU. For example, the UPF may use the examples of FIG. 19 and/or FIG. 20.

In an example, for one or more incoming packets sent by an AF, a UPF may detect and/or identity and/or classify the packets, based on ADU-aware delivery associated configuration parameter. For example, the UPF may receive one or more packets comprising a first packet and/or a second packet and/or a third packet. Based on ADU-aware delivery associated configuration parameter, the UPF may determine that the first packet and the second packet are associated with a first ADU. Based on ADU-aware delivery associated configuration parameter, the UPF may determine that the third packet are associated with a second ADU. The UPF may determine that the first packet and the second packet are associated. The UPF may determine that the first packet and the third packet are not associated. The UPF may determine that the second packet and the third packet are not associated. The UPF may determine that the first packet and the third packet are not associated with a same ADU. The UPF may determine that the first packet and the second packet are associated with a same ADU. The UPF may determine that the identity information of the first ADU associated with the first packet. The UPF may determine that the identity information of the second ADU associated with the second packet. The UPF may determine that the identity information of the third ADU associated with third first packet. The determined information may be the ADU identification information. For example, the UPF may use the examples of FIG. 19 and/or FIG. 20.

In an example, based the determination for the one or more packets, the UPF may send the one or more GTP-U containers (e.g., GTP-U packets) to a NG-RAN. The one or more GTP-U containers may comprise a first GTP-U container and/or a second GTP-U container and/or a third GTP-U container. The one or more GTP-U containers may comprise the one or more packets and/or one or more GTP-U headers. The first GTP-U container may comprise the first packet and a first GTP-U header. The second GTP-U container may comprise the second packet and a second GTP-U header. The third GTP-U container may comprise the third packet and a third GTP-U header.

Figure 27:
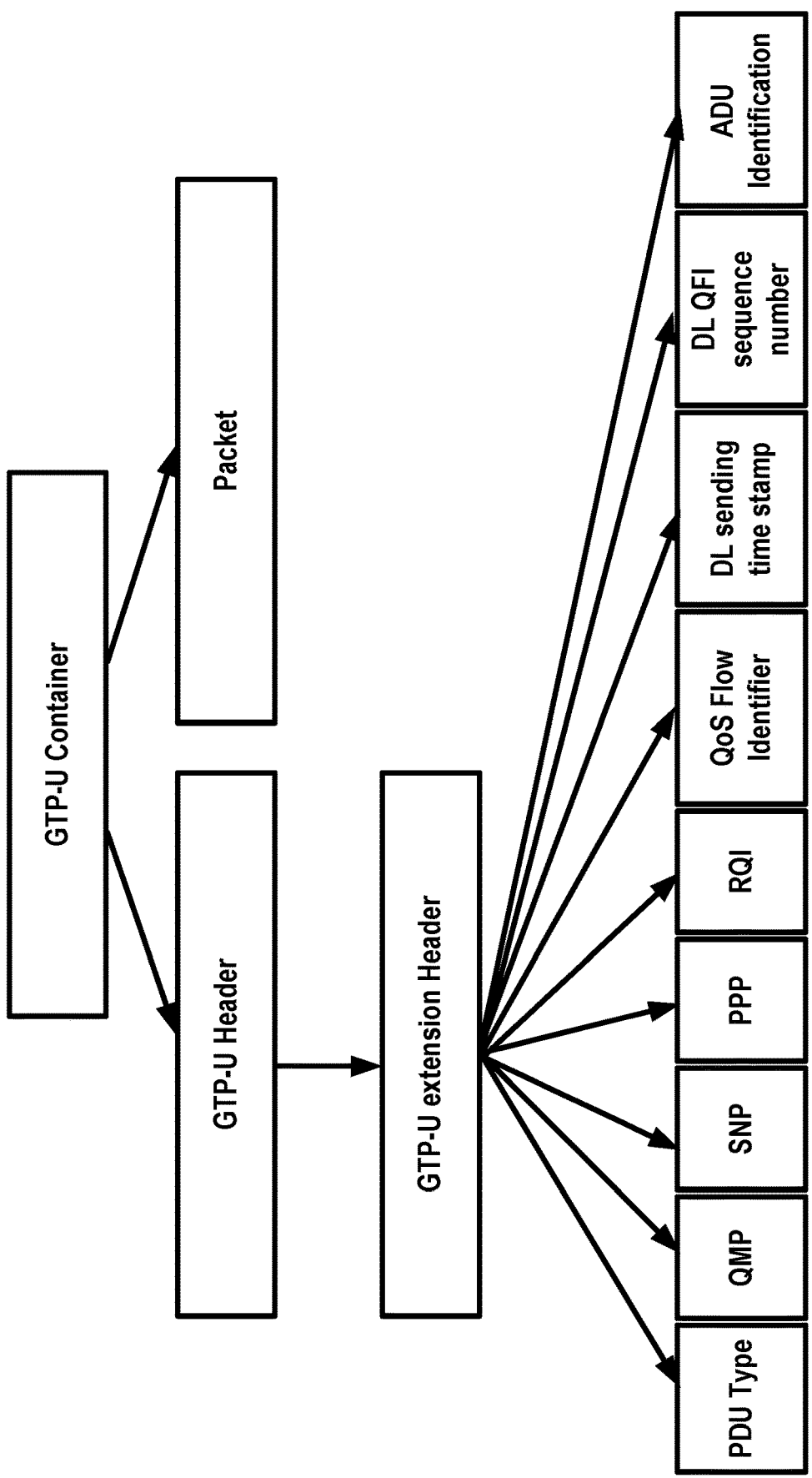
FIG. 27 is a diagram of an aspect of an example embodiment of the present disclosure.

In an example, one or more GTP-U headers may comprise one or more extension headers. For example, FIG. 27 may illustrate one example of GTP-U container.

In an example, the one or more extension headers may comprise:
PDU Type: This may indicate structure of a GTP-U container and/or a GTP-U header and/or GTP-U extension header and/or UP frame.
QoS Monitoring Packet: This may indicate whether the packet in the GTP-U container is used for QoS monitoring or not.

Sequence Number Presence: This may indicate whether DL QFI Sequence Number exists in the GTP-U container.

Paging Policy Presence: This may indicate the presence of PPI in the GTP-U container.

Reflective QoS Indicator: This may indicate whether reflective QoS is activated or not.

QoS Flow Identifier: This may indicate an identity of a QoS flow associated with a packet in the GTP-U container.

Paging Policy Indicator: This may indicate the paging policy indicator.

DL Sending Time Stamp: This may indicate when the UPF sends the GTP-U container

DL QFI Sequence Number: This may indicate a sequence number assigned by the UPF for the QoS flow.

ADU Identification information: This may indicate information associated with ADU-aware delivery. For example, this may comprise ADU-related information associated with the packet in the GTP-U Container. For example, this may indicate which one or more packets are associated with a same ADU. For example, this may indicate which one or more packets are associated with different ADU. For example, this may indicate the identity associated with a ADU associated with the packet.

For example, the first GTP-U header may comprise a first ADU identification information. The first ADU identification information may indicate that associated ADU identity of the first packet may be 1. For example, the second GTP-U header may comprise a second ADU identification information. The second ADU identification information may indicate that associated ADU identity of the second packet may be 1. For example, the third GTP-U header may comprise a third ADU identification information. The third ADU identification information may indicate that associated ADU identity of the third packet may be 2. Based on the ADU identification information of the one or more GTP-U headers, the NG-RAN may determine that the first packet and the second packet is associated with a same ADU. Based on the ADU identification information of the one or more GTP-U headers, the NG-RAN may determine that the first packet and the third packet is associated with different ADUs.

In another example, a SMF may determine for a NG-RAN to perform identification of associated ADU for a packet. For example, the SMF may determine for a UPF not to perform identification of associated ADU for the packet. Based on the determination, the SMF may configure the UPF not to perform identification of ADU for the packet. Based on the determination, the SMF may configure the NG-RAN to perform identification of ADU for the packet. After the configuration, if one or more packets arrive at the UPF, the UPF may send one or more GTP-U containers comprising the one or more packets. The GTP-U containers may not comprise ADU identification information. If the NG-RAN receives the one or more GTP-U containers, the NG-RAN may perform identification of ADU associated with the one or more packets. The one or more GTP-U containers may comprise a first packet and/or a second packet and/or a third packet. For example, based on ADU-aware delivery associated configuration parameter, the NG-RAN may determine that the first packet and the second packet are associated with a first ADU. Based on ADU-aware delivery associated configuration parameter, the NG-RAN may determine that the third packet are associated with a second ADU. The NG-RAN may determine that the first packet and the second packet are associated. The NG-RAN may determine that the first packet and the third packet are not associated. The NG-RAN may determine that the second packet and the third packet are not associated. The NG-RAN may determine that the first packet and the third packet are not associated with a same ADU. The NG-RAN may determine that the first packet and the second packet are associated with a same ADU. For example, the NG-RAN may use the examples of FIG. 19 and of FIG. 20.

Figure 28:
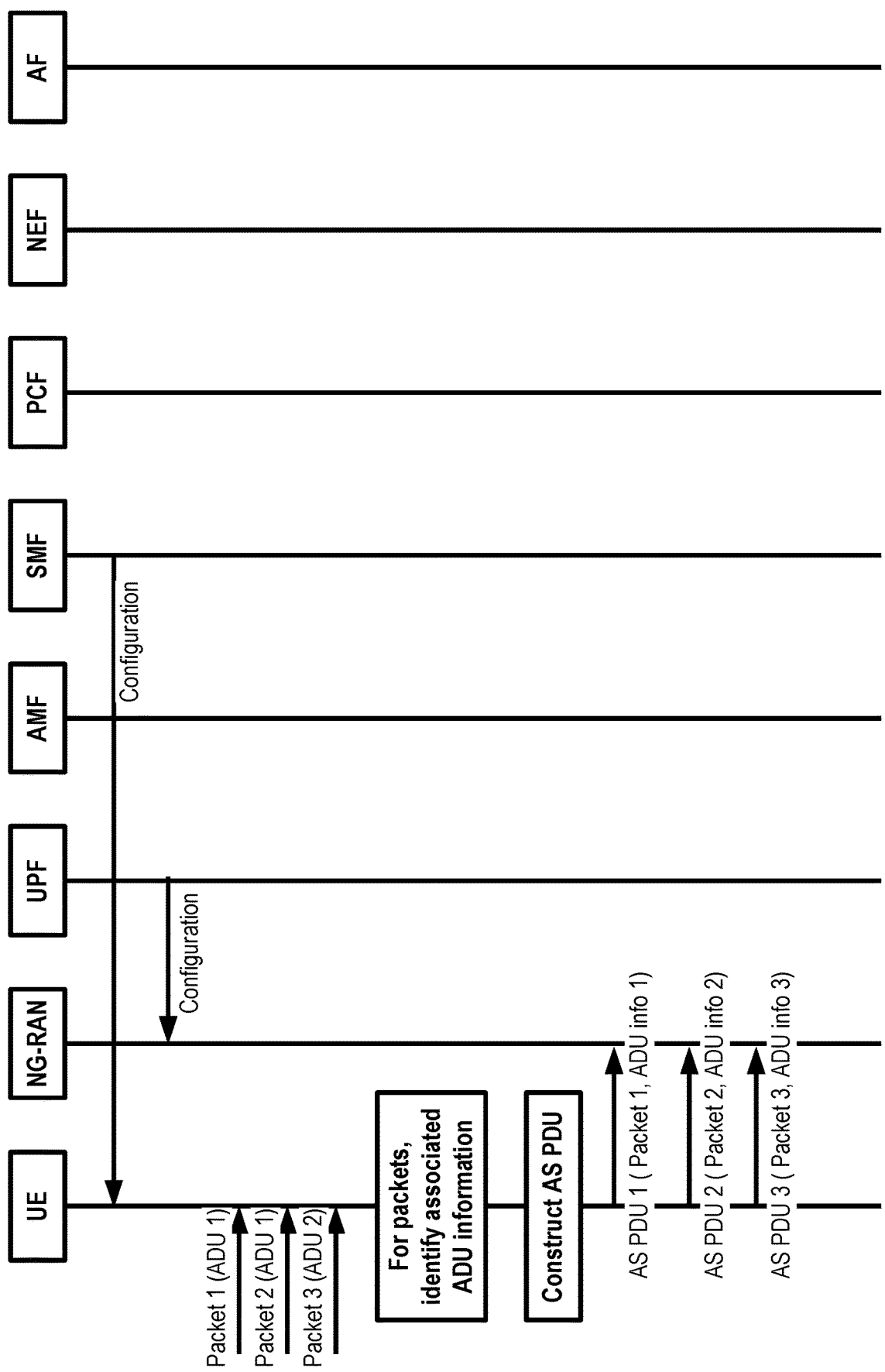
FIG. 28 is a diagram of an aspect of an example embodiment of the present disclosure.

FIG. 28 may depict an example embodiment of the present disclosure.

In an example, based on ADU-aware delivery associated configuration parameter, a transmitter (e.g., a UE and/or a NG-RAN) may perform identification of ADU for one or more packets received from an upper layer (e.g., an application of the UE and/or a UPF). For example, SDAP entity and/or PDCP entity of the transmitter may receive one or more packets from upper layer. The one or more packets may comprise a first packet and/or a second packet and/or a third packet. For example, based on ADU-aware delivery associated configuration parameter, the transmitter may determine that the first packet and the second packet are associated with a first ADU. Based on ADU-aware delivery associated configuration parameter, the transmitter may determine that the third packet are associated with a second ADU. The transmitter may determine that the first packet and the second packet are associated. The transmitter may determine that the first packet and the third packet are not associated. The transmitter may determine that the second packet and the third packet are not associated. The transmitter may determine that the first packet and the third packet are not associated with a same ADU. The transmitter may determine that the first packet and the second packet are associated with a same ADU. For example, the transmitter may use the examples of FIG. 19 and/or FIG. 20. After the determination, the transmitter may send one or more PDCP PDUs and/or one or more SDAP PDUs to a receiver (e.g., a NG-RAN and/or a UE). The one or more PDCP PDUs may comprise a first PDCP PDU and/or a second PDCP PDU and/or a third PDCP PDU. The one or more SDAP PDUs may comprise a first SDAP PDU and/or a second SDAP PDU and/or a third SDAP PDU. The one or more PDCP PDUs and/or one or more SDAP PDUs may comprise the ADU identification information. For example, the first PDCP PDU and/or the first SDAP PDU may comprise the first packet. The header of the first PDCP PDU and/or the first SDAP PDU may comprise information of ADU associated with the first PDCP PDU and/or the first SDAP PDU and/or the first packet. For example, the second PDCP PDU and/or the second SDAP PDU may comprise the second packet. The header of the second PDCP PDU and/or the second SDAP PDU may comprise information of ADU associated with the second PDCP PDU and/or the second SDAP PDU and/or the second packet. For example, the third PDCP PDU and/or the third SDAP PDU may comprise the third packet. The header of the third PDCP PDU and/or the third SDAP PDU may comprise information of ADU associated with the third PDCP PDU and/or the third SDAP PDU and/or the third packet. For example, if the ADU associated with the first PDCP PDU is same as the ADU associated with the second PDCP PDU, the first PDCP PDU and/or the second PDCP PDU may comprise information indicating that the first PDU and the second PDU are associated with a same ADU and/or identity information of the ADU. For example, if the ADU associated with the first PDCP PDU is different from the ADU associated with the third PDCP PDU, the first PDCP PDU and/or the third PDCP PDU may comprise information indicating that the first PDU and the third PDU are associated with different ADUs and/or identity information of the ADUs.

In another example, the receiver may receive one or more PDCP PDUs and/or one or more PDCP SDUs. The one or more PDCP PDUs may comprise the first PDCP PDU and/or the second PDCP PDU and/or the third PDCP PDU. The one or more SDAP PDUs may comprise the first SDAP PDU and/or the second SDAP PDU and/or the third SDAP PDU. The one or more PDCP PDUs and/or one or more SDAP PDUs may comprise ADU identification information. Based on the ADU identification information, a PDCP entity and/or a SDAP entity of the receiver may identity one or more ADU associated with the one or more PDCP PDUs and/or one or more SDAP PDUs. For example, the PDCP entity and/or the SDAP entity of the receiver may determine whether the first PDCP PDU and the second PDCP PDU are associated with a same ADU or not. For example, the PDCP entity and/or the SDAP entity of the receiver may determine whether the first PDCP PDU and the third PDCP PDU are associated with different ADUs or not.

FIG. 29 may depict an example embodiment of the present disclosure.

In an example, one or more PDCP PDUs may comprise ADU identification information. For example, a PDCP entity of a UE and/or a NG-RAN may determine ADU identification information, as shown in the example of FIG. 28. In FIG. 29A, the one or more PDCP PDUs may comprise:
  PDCP SN: This may indicate a sequence number of a PDCP SDU.
  MAC-I: This may indicate an information that is used to check integrity of the PDCP PDU.
  ADU identification: This may indicate the information of an ADU associated with the PDCP SDU.
  Data: This may indicate the PDCP SDU.

In an example, one or more SDAP PDUs may comprise ADU identification information. For example, a SDAP entity of a UE and/or a NG-RAN may determine ADU identification information, as shown in the example of FIG. 28. In FIG. 29B, the one or more SDAP PDUs may comprise:
  RDI (Reflective QoS flow to DRB mapping indication): This may indicate whether QoS flow to DRB mapping rule should be updated.
  RQI (Reflective QoS Indication): This may indicate whether NAS should be informed of the updated of SDF to QoS flow mapping rules.
  ADU identification: This may indicate the information of an ADU associated with the SDAP SDU.
  Data: This may indicate the SDAP SDU.

In an example, one or more RLC PDUs may comprise ADU identification information. For example, a RLC entity of a UE and/or a NG-RAN may determine ADU identification information, as shown in the example of FIG. 28. In FIG. 29C, the one or more RLC PDUs may comprise:
  D/C (data/control): This may indicate whether a RLC PDU is a control PDU or a data PDU.
  P: This may indicate whether polling is triggered or not.
  SI: This may indicate how a RLC SDU and a RLC PDU is aligned.
  SN: This may indicate a sequence number associated with a RLC PDU.
  ADU identification: This may indicate the information of an ADU associated with the SDAP SDU.
  Data: This may indicate the RLC SDU.

FIG. 30 may depict an example embodiment of the present disclosure.

In an example, the UPF may send one or more GTP-U containers to the NG-RAN. The one or more GTP-U containers may comprise a first GTP-U container and/or a second GTP-U container and/or a third GTP-U container. The one or more GTP-U container may comprise the one or more packets and/or one or more GTP-U headers and/or one or more UPF headers and/or the like. The first GTP-U container may comprise the first packet and the first GTP-U header and/or a first UPF header and/or the like. The second GTP-U container may comprise the second packet and the second GTP-U header and/or a second UPF header and/or the like. The third GTP-U container may comprise the third packet and the third GTP-U header and/or a third UPF header and/or the like.

In an example, the one or more UPF headers may comprise information of ADU identification. For example, the first UPF header may comprise information that the first packet may be associated with a first ADU. For example, the second UPF-header may comprise information that the second packet may be associated with a second ADU. For example, the third UPF-header may comprise information that the third packet may be associated with a third ADU.

In an example, the NG-RAN may receive one or more GTP-U containers. Based on the one or more GTP-U containers, the NG-RAN may send one or more PDCP PDUs and/or one or more SDAP PDUs. The one or more PDCP PDUs and/or one or more SDAP PDUs may comprise the one or more UPF headers and/or the packets. The one or more PDCP PDUs may comprise a first PDCP PDU and/or a second PDCP PDU and/or a third PDCP PDU. The one or more SDAP PDUs may comprise a first SDAP PDU and/or a second SDAP PDU and/or a third SDAP PDU. The first PDCP PDU and/or the first SDAP PDU may comprise the first UPF header. The second PDCP PDU and/or the second SDAP PDU may comprise the second UPF header. The third PDCP PDU and/or the third SDAP PDU may comprise the third UPF header. A SDAP entity and/or a PDCP entity of the UE may receive one or more PDCP PDUs and/or one or more SDAP PDUs. Based on the one or more UPF headers of one or more PDCP PDUs and/or one or more SDAP PDUs, the UE may identity one or more ADUs associated with the one or more packets of one or more PDCP PDUs and/or one or more SDAP PDUs. For example, based on the one or more UPF headers, the UE may determine that the first packet and the second packet may be associated with a same ADU. For example, based on the one or more UPF headers, the UE may determine that the first packet and the third packet may be associated with different ADUs.

In an example, a UE may receive one or more packets from upper layer. Based on ADU-aware delivery associated configuration parameter, the UE may identify one or more ADUs associated with the one or more packets. Based on the identification, the UE may send one or more PDCP PDUs and/or one or more SDAP PDUs to NG-RAN. The one or more PDCP PDUs and/or one or more SDAP PDUs may comprise the one or more UPF headers and/or the packets. The one or more PDCP PDUs may comprise a first PDCP PDU and/or a second PDCP PDU and/or a third PDCP PDU. The one or more SDAP PDUs may comprise a first SDAP PDU and/or a second SDAP PDU and/or a third SDAP PDU. The first PDCP PDU and/or the first SDAP PDU may comprise the first UPF header. The second PDCP PDU and/or the second SDAP PDU may comprise the second UPF header. The third PDCP PDU and/or the third SDAP PDU may comprise the third UPF header. A SDAP entity and/or a PDCP entity of the NG-RAN may receive one or more PDCP PDUs and/or one or more SDAP PDUs. For the received one or more PDCP PDUs and/or one or more SDAP PDUs, the NG-RAN may deliver the one or more packets and one or more UPF headers to UPF. Based on the one or more UPF headers, the UPF may identity one or more ADUs associated with the packets.

In an example, the UE or the UPF may construct the one or more UPF headers. The one or more UPF headers may not be interpreted by the NG-RAN. The UPF headers may be used to deliver and exchange directly one or more information between the UE and the UPF. For example, the UE and the UPF may exchange information of a quality of service for one or more ADUs and/or one or more application and/or one or more service data flows. For example, the UE and the UPF may exchange configuration information for one or more ADUs and/or one or more application and/or one or more service data flows.

FIG. 31 may depict an example embodiment of the present disclosure.

In an example, an application layer (e.g., an application, RTP entity, TCP entity, UDP entity, NAL entity) may generate one or more ADUs. The one or more ADUs may comprise a first ADU and/or a second ADU. The one or more ADUs may be packaged into one or more packets. A first set of one or more packets may carry a payload (data) for the first ADU. A second set of one or more packets may carry a payload for the second ADU. The first set may be a (first) packet set of one or more packet sets. The second set may be a (second) packet set of one or more packet sets. In other words, one or more packets for a ADU may be a packet set. Different packet sets may be associated with different ADUs. For example, a packet may be a PDU and/or a ADU may be a unit of information generated by application. A PDU set may be composed of one or more PDUs for a unit of information. Different PDU sets may composed of different PDUs for different units of information. For example, the one or more packets may be one or more IP packets. For example, the one or more packets may be of a same service data flow and/or different service data flows. The one or more packets may comprise a first packet and/or a second packet and/or a third packet and/or a fourth packet. The one or more packets may comprise one or more packet headers and/or one or more packet payloads. For example, the first packet may comprise at least a portion of the first ADU. For example, the second packet may comprise at least a portion of the first ADU. The first packet (e.g., the first PDU) and the second packet (e.g., the second PDU) may be associated with the first ADU, and/or carry a payload of the first ADU. Because the first packet and the second packet carry one or more portion of the same ADU, the first packet and the second packet belong to a same packet set (e.g., the first packet set), and/or the first packet and the second packet may be considered to be associated with the same packet set. In other words, because the first PDU (e.g., the first packet) and the second PDU (e.g., the second packet) comprise one or more portion of the same data unit of an application, the first PDU and the second PDU belongs to (associated with) a same PDU set (e.g., PDU set 1, first PDU set). The first PDU set may be composed of the first PDU and the second PDU. For example, the third packet may comprise at least a portion of the second ADU. For example, the fourth packet may comprise at least a portion of the second ADU. The third packet (e.g., the third PDU) and the fourth packet (e.g., the fourth PDU) may be associated with the second ADU, and/or carry a payload of the second ADU. Because the third packet and the fourth packet carry one or more portion of the same ADU, the third packet and the fourth packet belongs to a same packet set (e.g., the second packet set), and/or the third packet and the fourth packet may be considered to be associated with the same packet set. In other words, because the third PDU (e.g., the third packet) and the fourth PDU (e.g., the fourth packet) comprise one or more portion of the same data unit of an application, the third PDU and the fourth PDU belongs to (associated with) a same PDU set (e.g., PDU set 2, second PDU set). The second PDU set may be composed of the third PDU and the fourth PDU. The one or more packet headers may comprise one or more fields associated with identifying the one or more ADUs. The one or more fields associated with the one or more ADUs may indicate information used for identification of the one or more ADUs associated with one or more packets. The one or more fields associated with the one or more ADUs may indicate information to determine which one or more packets are associated with a same ADU. The one or more fields associated with the one or more ADUs may indicate information to determine which one or more packets are associated with different ADUs.

For example, the field associated with the one or more ADUs may be one of fields of IP packet. For example, DSCP field and/or TOS field of an IP packet may be one of fields associated for the identification for one or more ADUs. For example, the field (e.g., DSCP field) of the first packet may be set to 1, based on that this packet comprise a portion of the first ADU. For example, the field of the second packet may be set to 1, based on that this packet comprises a portion of the first ADU. For example, the field of the third packet may be set to 2, based on that this packet comprises a portion of the second ADU. Based on the different values for the field of the different packets, a receiver (e.g., a network node) of the packets may determine that the first packet and the second packet are associated to a same ADU. Based on the different values for the field, a receiver (e.g., a network node) of the packets may determine that the second packet and the third packet are associated to different ADUs. Based on the value for the field, the receiver (e.g., a network node) of the packet may determine that the ADU identity associated with the first packet is 1. Based on the value for the field, the receiver (e.g., a network node) of the packet may determine that the ADU identity associated with the second packet is 1. Based on the value for the field, the receiver (e.g., a network node) of the packet may determine that the ADU identity associated with the third packet is 2. The receiver may use the determined information and may include the determined information into ADU identification information and/or ADU-related information.

Figure 32:
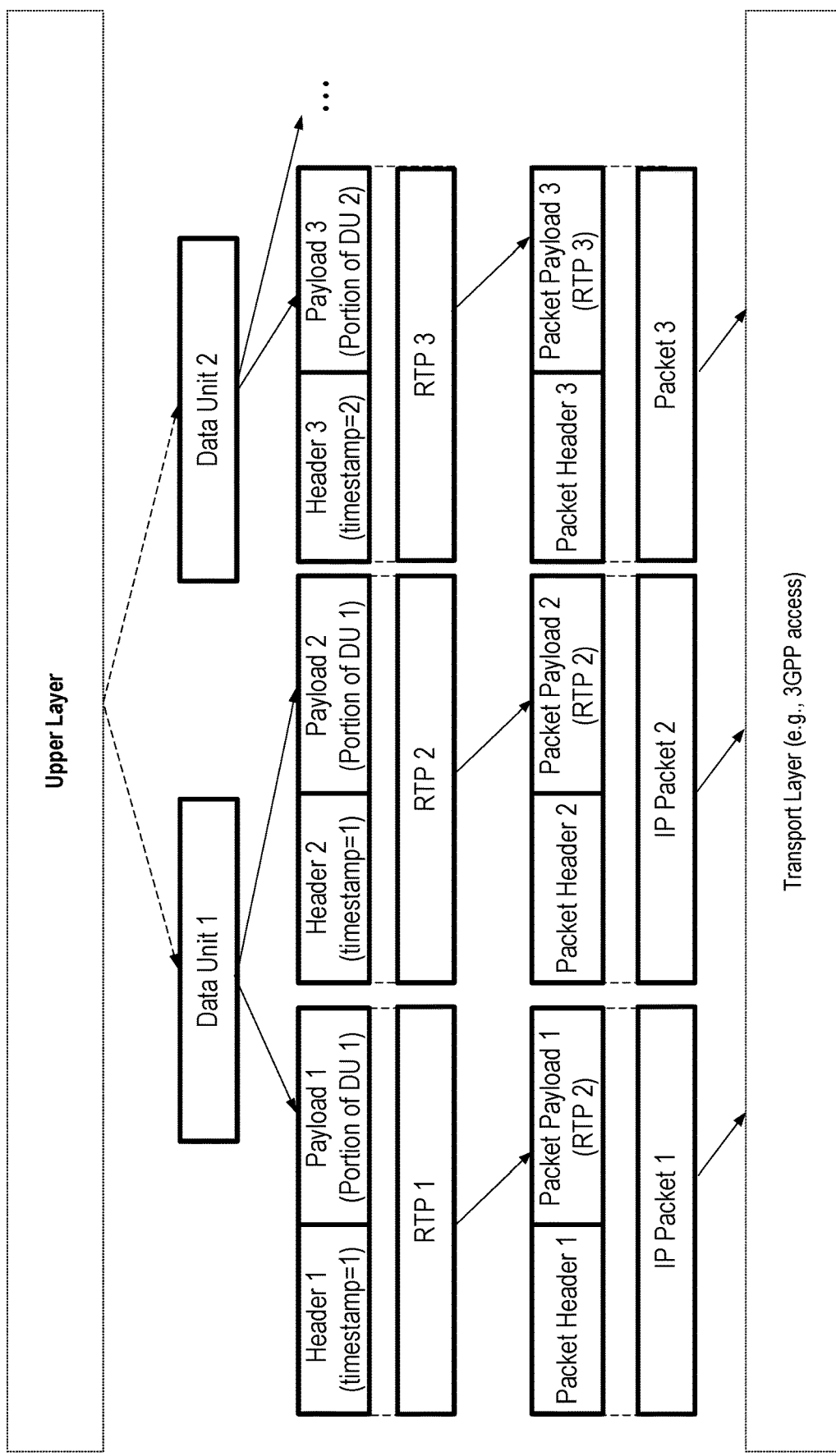
FIG. 32 is a diagram of an aspect of an example embodiment of the present disclosure.

FIG. 32 may depict an example embodiment of the present disclosure.

In an example, an application layer (e.g., an application, NAL entity) may generate one or more first-type ADUs. The one or more first-type ADUs may comprise a first first-type ADU and/or a second first-type ADU. The one or more first-type ADUs may be delivered to a protocol entity (e.g., a RTP protocol entity). The protocol entity may package the one or more first-type ADUs into one or more second-type ADUs (e.g., RTP packets). For example, the one or more first-type ADUs and/or the one or more second-type ADUs may be of a same service data flow and/or different service data flows. The one or more second-type ADUs may comprise a first second-type ADU and/or a second second-type ADU and/or a third second-type ADU and/or a fourth second-type ADU. The one or more second-type ADUs may comprise one or more second-type ADU headers and/or one or more second-type ADU payloads. For example, the first second-type ADU may comprise at least a portion of the first first-type ADU. For example, the second second-type ADU may comprise at least a portion of the first first-type ADU. For example, the third second-type ADU may comprise at least a portion of the second first-type ADU. For example, the fourth second-type ADU may comprise at least a portion of the second second-type ADU. The one or more second-type ADU headers may comprise one or more fields associated with identifying the one or more ADUs. The one or more fields associated with the one or more ADUs may indicate information used for identification of the one or more ADUs associated with one or more packets and/or one or more second-type ADUs. The one or more fields associated with the one or more ADUs may indicate information to determine which one or more packets and/or one or more second-type ADUs are associated with a same first-type ADU. The one or more fields associated with the one or more ADUs may indicate information to determine which one or more packets and/or one or more second-type ADUs are associated with different first-type ADUs.

In an example, the one or more second-type ADUs may be delivered to a packet protocol entity (e.g., IP protocol entity). The one or more second-type ADUs may be packaged into one or more packets. For example, the one or more packets may be one or more IP packets. For example, the one or more packets may be of a same service data flow and/or different service data flows. The one or more packets may comprise a first packet and/or a second packet and/or a third packet and/or a fourth packet. The one or more packets may comprise one or more packet headers and/or one or more packet payloads. For example, the first packet may comprise at least a portion of the first first-level ADU. For example, the first packet may comprise at least a portion of the first second-level ADU. For example, the second packet may comprise at least a portion of the first first-level ADU. For example, the second packet may comprise at least a portion of the second second-level ADU. For example, the third packet may comprise at least a portion of the second first-level ADU. For example, the third packet may comprise at least a portion of the third second-level ADU. For example, the fourth packet may comprise at least a portion of the second first-level ADU. For example, the fourth packet may comprise at least a portion of the fourth second-level ADU.

In an example, the field associated with the one or more ADUs may be one of fields of second-type ADUs of the one or more packets. For example, for the one or more packets, timestamp field of a RTP packet may be one of fields associated for the identification for one or more ADUs.

In an example, the field associated with the one or more ADUs (e.g., timestamp field) associated with the first packet may be set to 1, based on that this packet comprise a portion of the first ADU. For example, the field associated with the one or more ADUs (e.g., timestamp field) associated with the second packet may be set to 1, based on that this packet comprise a portion of the first ADU. For example, the field associated with the one or more ADUs (e.g., timestamp field) associated with the third packet may be set to 2, based on that this packet comprise a portion of the second ADU. For example, the field associated with the one or more ADUs (e.g., timestamp field) associated with the fourth packet may be set to 2, based on that this packet comprise a portion of the second ADU.

In an example, the receiver of the packets may use the field associated with the one or more ADUs associated with the one or more packets, to determine ADU-related information for the one or more packets. For example, based on that the field of the first packet (e.g., timestamp field) is set to 1 and that the field of the second packet is set to 1, the receiver may determine that the first packet and the second packet are associated with a same ADU. For example, based on that the field of the first packet is set to 1 and that the field of the third packet is set to 2, the receiver may determine that the first packet and the third packet are associated with a same ADU. For example, based on the field of the first packet is set to 1, the receiver may determine that the identity of the ADU associated with the first packet is 1. The receiver may use the determined information and may include the determined information into ADU identification information and/or ADU-related information.

Figure 33:
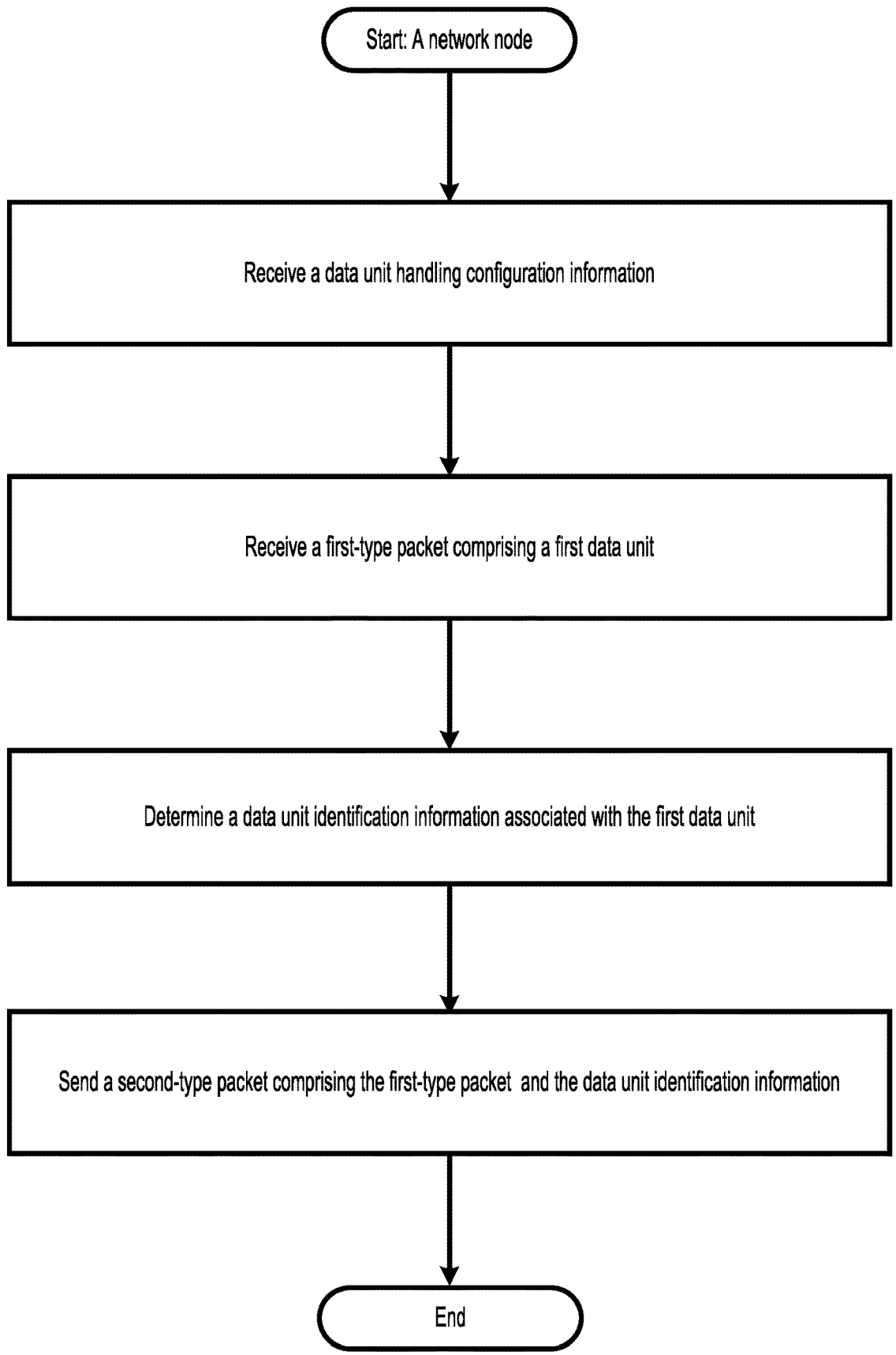
FIG. 33 is a diagram of an aspect of an example embodiment of the present disclosure.

FIG. 33 may depict an example embodiment of the present disclosure.

In an example, an upper layer (e.g., above 3GPP NAS layer) of a sender (e.g., a UE, an AF) may be comprised of one or more layers (e.g., protocol entities). For example, the one or more layers may comprise a first-level layer and/or a second-level layer. The first-level layer may generate one or more first-level ADUs. The one or more first-level ADUs may comprise a first first-level ADU and/or a second first-level ADU. The first-level layer may deliver the one or more first-level ADUs to the second-level layers. The second-level layers may process the one or more first-level ADUs and may generate one or more second-level ADUs. For example, based on the first first-level ADU, the second level layer may generate a first second-level ADU and/or a second second-level ADU. For example, based on the second first-level ADU, the second level layer may generate a third second-level ADU. Based on the one or more second-level ADUs, the sender may generate one or more packets. For example, the first packet may comprise a first second-level ADU. For example, a second packet may comprise the second second-level ADU. For example, a third packet may comprise the third second-level ADU. The one or more second-level ADUs may comprise one or more fields associated with one or more ADU identification. In an example, for identification of an ADU associated with a packet, the AF and a network may negotiate one or more fields of the ADU. Based on the one or more fields, a sender (e.g., an AF, an application) may use the one or more fields to indicate to the receiver with information of an ADU associated with a packet. Based on the one or more field, a receiver (e.g., an UPF, a UE, a NG-RAN) may use the one or more fields to identify the ADU associated with the received packet. In an example, for identification of the ADU associated with the packet, the AF may indicate to the network, the one or more fields of an ADU. For example, the one or more fields may comprise a timestamp field of a RTP header. For example, the timestamp field of the first second-level ADU may be set t=1. For example, the timestamp field of the second second-level ADU may be set t=1. For example, the timestamp field of the third second-level ADU may be set t=2. The receiver may receive one or more packets comprising the one or more second-level ADUs. The receiver may identify one or more ADUs associated with the packets. For example, the receiver may use the field negotiated with and/or indicated by the AF. For example, based on that the field (e.g., timestamp field) of the first packet is set to t=1 and that the field of the second packet is set to t=1, the receiver may determine that the first packet and the second packet may be associated with the same ADU. For example, based on that the field of the first packet is set to t=1 and that the field of the third packet is set to t=2, the receiver may determine that the first packet and the second packet may be associated with different ADUs. The determined information may be used as ADU-related information and/or ADU identification information.

In an example, a first network node (e.g., UPF, NG-RAN, UE) may receive a data unit handling configuration information (e.g., ADU-aware delivery associated configuration parameter) from a second network node (e.g., a SMF). The first network node may receive one or more first-type packets (e.g., IP packets) from an application and/or an AF. The one or more first-type packets may comprise one or more packet payloads and/or one or more packet headers (e.g., IP headers). The one and more packet payloads may comprise one or more data units (e.g., ADUs). For example, the one or more data units may comprise data of the application and/or data of the AF and/or one or more RTP frames and/or one or more video data frame and/or one or more files and/or one or more NAL frames and/or UDP datagrams and/or TCP frames and/or the like. Based on the data unit handling configuration information, for the one or more first-type packets, the first network node may determine one or more data unit identification information associated with the one or more first-type packets. For example, the one or more data unit identification information may comprise information that indicate one or more identity of the one or more data units. For example, the one or more data unit identification information may comprise information that indicate which one or more first-type packets are associated for a data unit. For example, the one or more data unit identification information may comprise information that indicate whether one or more first-type packets are associated for different data units. For the one or more first-type packets, the first network node may send one or more second-type packets. The one or more second-type packets may comprise one or more first-type packets and/or one or more data unit identification information associated with the one or more first-type packets.

In an example, a first network node (e.g., UPF, NG-RAN, UE) may receive a data unit handling configuration information (e.g., ADU-aware delivery associated configuration parameter) from a third network node (e.g., a SMF). The third network node may construct the data unit handling configuration information based on information delivered from a fourth network node (e.g., a PCF, a UDM, a NEF, an AF). The data unit handling configuration information may comprise information associated with identifying one or more data units associated with one or more first-type packets.

In an example, the first network node may receive one or more first-type packets (e.g., IP packets) from an application and/or an AF. The one or more first-type packets may be for a same application and/or a service data flow. The one or more first-type packets may comprise one or more packet payloads and/or one or more packet headers (e.g., IP headers). The one and more packet payloads may comprise one or more data units (e.g., ADUs). For example, the one or more data units may comprise data of the application and/or data of the AF and/or one or more RTP frames and/or one or more video data frame and/or one or more files and/or one or more NAL frames and/or UDP datagrams and/or TCP frames and/or the like.

In an example, the one or more first-type packets may comprise a first first-type packet and a second first-type packet.

In an example, based on the data unit handling configuration information, for the one or more first-type packets, the first network node may determine one or more data unit identification information associated with the one or more first-type packets. For example, the one or more data unit identification information may comprise information that indicate one or more identities of the one or more data units associated with the one or more first-type packets. For example, the one or more data unit identification information may comprise information that indicate which one or more first-type packets are associated for a data unit. For example, the one or more data unit identification information may comprise information that indicate whether one or more first-type packets are associated for different data units. For example, the one or more data unit identification information may comprise information that indicate the identify of a data unit associated with a first-type packet.

For example, based on the data unit handling configuration information, the first network node may determine whether the first first-type packet and the second first-type packet are associated. For example, if a data unit associated with the first first-type packet is same as a data unit associated with the second first-type packet, the first network may determine that the first first-type packet and the second first-type packet are associated. For example, if processing of a data unit associated with the first first-type packet is dependent on availability of a data unit associated with the second first-type packet, the first first-type packet and the second first-type packet may be associated. For example, if processing of a data unit associated with the first first-type packet is dependent on availability of a data unit associated with the second first-type packet, the first first-type packet and the second first-type packet may be associated. For example, if a specific field of the first first-type packet is same as a specific field of the second first-type packet, the first first-type packet and the second first-type packet may be associated. The specific field of the first-type packet may be located in the first-type packet header and/or within the first-type packet payload. For example, the specific field may be a DSCP field of IP header and/or Option field of IP header and/or Timestamp field of RTP header and/or a field of TCP header and/or a field of UCP header and so on. The information on the specific field may be decided by a network and/or by the AF.

In an example, the data unit handling configuration information may comprise information of processing of the one or more received first-type packets. For example, the information of processing of the one or more received first-type packets may comprise information that the first network node performs for the one or more received first-type packets, based on the identified one or more data unit identification information associated with the one or more first-type packets. For example, the information of processing of the one or more received first-type packets may indicate the first network node to include the identified the one or more data unit identification information associated with the one or more first-type packets, into one or more second-type packets.

In an example, a second network node (e.g., NG-RAN) may receive a data unit handling configuration information (e.g., ADU-aware delivery associated configuration parameter) from a third network node (e.g., a SMF). The second network node may process the received one or more second-type packets, based on the received data unit handling configuration information. For the received data unit handling configuration information, the second network node may send to the third network node, an acknowledgement for the received data unit handling configuration information.

In an example, a first network device (e.g., UPF, NG-RAN, UE) may receive a message (e.g., N4 session message, N2 SM container, PDU session establishment message) comprising data unit configuration information (e.g., ADU-aware delivery associated configuration parameter)

from a second network node (e.g., a SMF). The data unit configuration information may comprise information indicating how to determine a data unit (DU) associated with a received packet, based on a content of the received packet. For example, the first network node may receive one or more packets. The one or more packets may comprise one or more data units. The one or more data units may be generated by one or more first entities. The one or more data units may be generated by one or more second entities. One or more contents of the one or more packets may comprise the one or more data units and/or one or more portions of the one or more data units.

In an example, the first network node may receive one or more first packets (e.g., IP packets) from an application server (e.g., an AF). The one or more first packets may comprise one or more packet payloads and/or one or more packet headers (e.g., IP headers). The one and more packet payloads may comprise one or more data units (e.g., DUs) and/or one or more portions of one or more data units. For example, the one or more data units may comprise data of the application and/or data of the AF and/or one or more RTP frames and/or one or more video data frame and/or one or more files and/or one or more NAL frames and/or UDP datagrams and/or TCP frames and/or the like. Based on the data unit configuration information, for the one or more first packets, the first network node may determine one or more data unit indication information of the one or more data units associated with the one or more first-type packets. For example, the one or more data unit indication information may comprise information that indicate one or more identity of the one or more data units. For example, the one or more data unit indication information may comprise information that indicate which one or more first packets are associated for a data unit. For example, the one or more data unit indication information may comprise information that indicate whether one or more first packets are associated for different data units. For example, the one or more data unit indication information may comprise information that indicate which one or more first packets are associated for a data unit.

In an example, for the one or more first packets, the first network node may send one or more second packets (e.g., GTP-U container) to an access node (e.g., NG-RAN, gNB). The one or more second packets may comprise one or more first packets and/or one or more data unit indication information associated with the one or more first packets.

In an example, the first network node (e.g., UPF, NG-RAN, UE) may receive a data unit configuration information (e.g., ADU-aware delivery associated configuration parameter) from a second network node (e.g., a SMF). The second network node may construct the data unit configuration information, based on information delivered from a fourth network node (e.g., a PCF, a UDM, a NEF, an AF). The first network node may send a message acknowledging the data unit configuration information. The data unit configuration information may comprise information associated with identifying one or more data units associated with one or more first packets. The data unit configuration information may comprise information on how to determine a data unit associated with one or more first packets.

In an example, the first network node may receive one or more third packets. The one or more third packets may comprise one or more packet payloads and/or one packet headers. The one or more packet payloads may comprise at least a portion of at least one second DU. The first network node may send one or more fourth packets to the access node. The one or more fourth packets may comprise the one or more third packets and/or one or more indication of the at least one second DU.

In an example, the data unit configuration information may comprise information that indicates whether the UPF determines the indication of the at least one first DU, based on the contents of the first packet. For example, if the data unit configuration information indicates that UPF determines the indication of the at least one first DU, the UPF may determine the indication of the at least one first DU. For example, if the data unit configuration information indicates that UPF determines the indication of the at least one first DU, the UPF may send to the access node, one or more second packets comprising the indication of the at least one first DU. For example, if the data unit configuration information does not indicate that UPF determines the indication of the at least one first DU, the UPF may not determine the indication of the at least one first DU. For example, if the data unit configuration information does not indicate that UPF determines the indication of the at least one first DU, the UPF may send to the access node, one or more second packets not comprising the indication of the at least one first DU.

In an example, the data unit configuration information may comprise information on how to determine the indication of the at least one first DU for the first packet. For example, the data unit configuration information may comprise information of one or more fields of at least the DU or the packet that are used to determine the indication of the at least one first DU for the first packet. For example, the one or more fields may comprise a DSCP field, a timestamp field and/or the like. In an example, based on the data unit configuration information, the first network node may determine the indication of the DU. For example, the indication of the DU may be a unique identifier associated with the DU. For example, the indication of the DU may be an identity information associated with the DU. For example, the indication of the DU may be an identity information that allows the DU to be distinguished from other DUs. For example, the indication of the DU may be an information that the first packet and the third packet may be of a DU. For example, the indication of the DU may be an information that the first packet and the third packet may be of different DUs. For example, the indication of the DU may be an information that the first packet and the third packet may comprise a portion of data for a DU. For example, the indication of the DU may be an information that the first packet and the third packet may comprise a portion of data for different DUs. For example, the indication of the DU may be an information that the first packet and the third packet may be associated. For example, the first packet and the third packet may be associated if the first packet and the third packet comprise at least a portion of the DU. For example, the first packet and the third packet may be associated if the one or more fields of the first packet and/or the first DU have same value as the one or more fields of the third packet and/or the second DU. In the example, the first packet and the third packet may be received from an application function. In the example, the first packet and the third packet may be of a service data flow. For example, if the first DU is different from the second DU, the indication of the at least one second DU for the third packet may be different from the indication of the at least one first DU for the first packet. For example, if the first DU is same as the first DU, the indication of the at least one second DU for the third packet may be same as the indication of the at least one first DU for the first packet.

In an example, the data unit configuration information may comprise information of the service data flow. The service data flow may comprise the one or more first packets and/or the one or more second packets. The information of the service data flow may comprise source IP address, destination IP address, source port, destination port, source MAC address, destination MAC address, etc. The information of the service data flow may indicate whether one or more packets are of the same data flow or not.

In an example, a UPF may receive from a SMF, a message comprising data unit (DU) identification configuration information indicating how to determine an identification information associated with a DU for a received packet based on a content of the received packet. The UPF may receive one or more packets from an application function. The one or more packets may comprise a first packet. The first packet may comprise a portion of at least one first DU. Based on the data unit identification configuration information, the UPF may determine, an identification information associated with the at least one first DU. Based on the determined identification information, the UPF may send to an access node, a second packet. The second packet (e.g., a GTP-U container) may comprise the first packet and/or the determined identification information associated with the first packet and/or the at least one first DU.

In an example, an access node (e.g., NG-RAN) may receive from a second network node (e.g., an SMF), a message (e.g., N2 message) comprising indication that a second packet (e.g., a GTP-U container) comprises an identification information associated with a received packet. The access node may receive from a first network node (e.g., UPF) the second packet. The second packet may comprise a first packet and/or an identification information associated with the first packet. Based on the second packet and/or the identification information, the access node may send to a wireless device a third packet. The third packet may comprise the first packet.

In an example, an fourth network node (e.g., NEF) may receive from an AF, a request message comprising data unit identification assistance information. The data unit identification assistance information may comprise information of how to identify a data unit associated with a received packet based on a content of the received packet. Based on the data unit identification assistance information, the fourth network node may determine a second network node (e.g., SMF) associated with the AF. The fourth network node may send to the second network node, the data unit identification assistance information. The fourth network node may send to the AF, a response message to the request message.

In an example, a first entity (e.g., PDCP entity, SDAP entity) may receive from a second entity (e.g., an application, a protocol entity, SDAP entity), a first packet (e.g., a SDAP PDU, IP packet, a protocol data unit, application data). The first packet may comprise at least a portion of a data unit. The first entity may determine a data unit identification information associated with the first packet. The data unit identification information may indicate an information associated with identifying the data unit. The first entity may compose one or more second packets comprising the first packet. The one or more second packets may further comprise the determined data unit identification information. The first entity may deliver the one or more second packets to a third entity (e.g., a RLC entity, a PDCP entity).

The invention claimed is:

1. A method comprising:
    receiving, by a user plane function (UPF) from a session management function (SMF), a data unit (DU) identification information for identifying a plurality of packets for one or more DUs of an application;
    receiving, by the UPF:
        a first plurality of packets, of the plurality of packets, of a first DU of the application; and
        a second plurality of packets, of the plurality of packets, of a second DU of the application; and
    sending, by the UPF to an access node and using the DU identification information:
        a first general packet radio service tunneling protocol (GTP) container comprising a first GTP header comprising a first number identifying the first plurality of packets; and
        a second GTP container comprising a second GTP header comprising a second number identifying the second plurality of packets.

2. The method of claim 1, wherein: the first GTP container further comprises a first packet of the first plurality of packets; and the second GTP container further comprises a second packet of the second plurality of packets.

3. The method of claim 2, wherein the UPF determines the first number for the first packet and the second number of the second packet, based on the DU identification information.

4. The method of claim 1, wherein the DU identification information indicates one or more header fields of one or more packets.

5. The method of claim 4, wherein the one or more header fields comprises at least a real-time transport protocol (RTP) header.

6. The method of claim 1, wherein the DU identification information indicates one or more protocols used for identifying the first number or the second number.

7. The method of claim 1, wherein a packet forwarding control protocol (PFCP) message comprises the DU identification information.

8. A user plane function (UPF) comprising one or more processors and memory storing instructions that, when executed by the one or more processors, cause the UPF to:
    receive, from a session management function (SMF), a data unit (DU) identification information for identifying a plurality of packets for one or more DUs of an application;
    receive:
        a first plurality of packets, of the plurality of packets, of a first DU of the application; and
        a second plurality of packets, of the plurality of packets, of a second DU of the application; and
    send, to an access node and using the DU identification information:
        a first general packet radio service tunneling protocol (GTP) container comprising a first GTP header comprising a first number identifying the first plurality of packets; and
        a second GTP container comprising a second GTP header comprising a second number identifying the second plurality of packets.

9. The UPF of claim 8, wherein: the first GTP container further comprises a first packet of the first plurality of packets; and the second GTP container further comprises a second packet of the second plurality of packets.

10. The UPF of claim 9, wherein the UPF determines the first number for the first packet and the second number of the second packet, based on the DU identification information.

11. The UPF of claim 8, wherein the DU identification information indicates one or more header fields of one or more packets.

12. The UPF of claim 11, wherein the one or more header fields comprises at least a real-time transport protocol (RTP) header.

13. The UPF of claim 8, wherein the DU identification information indicates one or more protocols used for identifying the first number or the second number.

14. The UPF of claim 8, wherein a packet forwarding control protocol (PFCP) message comprises the DU identification information.

15. A non-transitory computer-readable medium comprising instructions that, when executed by one or more processors, cause a user plane function (UPF) to:
receive, from a session management function (SMF), a data unit (DU) identification information for identifying a plurality of packets for one or more DUs of an application;
receive:
a first plurality of packets, of the plurality of packets, of a first DU of the application; and
a second plurality of packets, of the plurality of packets, of a second DU of the application; and
send, to an access node and using the DU identification information:
a first general packet radio service tunneling protocol (GTP) container comprising a first GTP header comprising a first number identifying the first plurality of packets; and
a second GTP container comprising a second GTP header comprising a second number identifying the second plurality of packets.

16. The computer-readable medium of claim 15, wherein: the first GTP container further comprises a first packet of the first plurality of packets; and the second GTP container further comprises a second packet of the second plurality of packets.

17. The computer-readable medium of claim 16, wherein the UPF determines the first number for the first packet and the second number of the second packet, based on the DU identification information.

18. The computer-readable medium of claim 15, wherein the DU identification information indicates one or more header fields of one or more packets.

19. The computer-readable medium of claim 18, wherein the one or more header fields comprises at least a real-time transport protocol (RTP) header.

20. The computer-readable medium of claim 15, wherein the DU identification information indicates one or more protocols used for identifying the first number or the second number.

* * * * *